US012709351B2

(12) United States Patent
Rubanovich et al.

(10) Patent No.: US 12,709,351 B2
(45) Date of Patent: Aug. 18, 2026

(54) ELECTRIC ALL-TERRAIN VEHICLE

(71) Applicant: Polaris Industries Inc., Medina, MN (US)

(72) Inventors: Boris Rubanovich, Oak Grove, MN (US); Madeline C. Rogers, Fall Creek, WI (US); Austin R. Bartz, Forest Lake, MN (US); Michael A. Hritz, Minnetonka, MN (US); Jacob L Stock, Dellwood, MN (US); Scott D. Taylor, Blaine, MN (US); John B. Pircon, Stacy, MN (US); Zacharey J. Hussong, Roseville, MN (US); Matthew B. Robinson, Hazel Green, AL (US); Yassin M. Kelay, Sugiez (CH); Ronald Zurbruegg, Spiez (CH); Robert C. Wilmot, Stacy, MN (US); Jeffrey I. Peterman, Stacy, MN (US)

(73) Assignee: Polaris Industries Inc., Medina, MN (US)

(*) Notice: Subject to any disclaimer, the term of this patent is extended or adjusted under 35 U.S.C. 154(b) by 762 days.

(21) Appl. No.: 17/946,265

(22) Filed: Sep. 16, 2022

(65) Prior Publication Data

US 2023/0093742 A1 Mar. 23, 2023

Related U.S. Application Data

(60) Provisional application No. 63/312,930, filed on Feb. 23, 2022, provisional application No. 63/245,286, filed on Sep. 17, 2021.

(51) Int. Cl.

| | |
|---|---|
| ***B62K 5/01*** | (2013.01) |
| ***B62J 7/02*** | (2006.01) |
| ***B62J 43/10*** | (2020.01) |

(52) U.S. Cl.

CPC .................................... *B62K 5/01* (2013.01); *B62J 7/02* (2013.01); *B62J 43/10* (2020.02)

(58) Field of Classification Search

CPC .... B62K 5/01; B62J 43/10; B62J 7/02; B62D 25/24

(Continued)

(56) References Cited

U.S. PATENT DOCUMENTS

| | | | |
|---|---|---|---|
| 5,510,658 | A | 4/1996 | Nakayama |
| 5,534,364 | A | 7/1996 | Watanabe et al. |

(Continued)

FOREIGN PATENT DOCUMENTS

| | | | |
|---|---|---|---|
| AU | 2017262676 | A1 | 11/2018 |
| CA | 3130333 | A1 | 4/2022 |

(Continued)

OTHER PUBLICATIONS

International Preliminary Report on Patentability received for PCT Patent Application No. PCT/US2022/076589, mailed on Jan. 3, 2023, 12 pages.

(Continued)

*Primary Examiner* — Jacob D Knutson
(74) *Attorney, Agent, or Firm* — Merchant & Gould, P.C.

(57) ABSTRACT

A utility vehicle includes an electric powertrain assembly. The electric powertrain assembly includes at least a battery and a motor for controlling torque at various ground-engaging members of the vehicle. The configuration of the electric powertrain assembly allows for increased storage on the utility vehicle.

20 Claims, 58 Drawing Sheets

(58) Field of Classification Search
USPC .......................................................... 180/233
See application file for complete search history.

(56) References Cited

U.S. PATENT DOCUMENTS

| | | | | |
|---|---|---|---|---|
| 5,561,359 | A | 10/1996 | Matsuura et al. | |
| 5,577,747 | A | 11/1996 | Ogawa et al. | |
| 5,583,751 | A | 12/1996 | Nakazawa et al. | |
| 5,647,450 | A | 7/1997 | Ogawa et al. | |
| 5,690,186 | A | 11/1997 | Sugioka et al. | |
| 5,796,175 | A | 8/1998 | Itoh et al. | |
| 6,056,177 | A * | 5/2000 | Schneider | B60R 5/04 224/539 |
| 6,094,927 | A | 8/2000 | Anazawa et al. | |
| 6,492,785 | B1 | 12/2002 | Kasten et al. | |
| 6,541,938 | B2 | 4/2003 | Okamura et al. | |
| 6,555,928 | B1 | 4/2003 | Mizuno et al. | |
| 7,017,694 | B2 | 3/2006 | Shirazawa | |
| 7,082,018 | B2 | 7/2006 | Honda | |
| 7,210,550 | B2 | 5/2007 | Yonehana et al. | |
| 7,249,644 | B2 | 7/2007 | Honda et al. | |
| 7,287,612 | B2 | 10/2007 | Tarasinski et al. | |
| 7,290,633 | B2 | 11/2007 | Kasten et al. | |
| 7,299,115 | B2 | 11/2007 | Honda | |
| 7,412,309 | B2 | 8/2008 | Honda | |
| 7,775,311 | B1 | 8/2010 | Hardy et al. | |
| 7,841,431 | B2 | 11/2010 | Zhou | |
| 7,849,945 | B2 | 12/2010 | Ross et al. | |
| 7,921,947 | B2 | 4/2011 | Horii et al. | |
| 7,962,256 | B2 | 6/2011 | Stevens et al. | |
| 8,008,800 | B2 | 8/2011 | Mackin et al. | |
| 8,127,876 | B2 | 3/2012 | Phillips | |
| 8,201,897 | B2 | 6/2012 | Bell et al. | |
| 8,256,549 | B2 | 9/2012 | Crain et al. | |
| 8,261,861 | B2 | 9/2012 | Takei | |
| 8,427,086 | B2 | 4/2013 | Vilar | |
| 8,448,696 | B2 | 5/2013 | Johnston et al. | |
| 8,469,133 | B2 | 6/2013 | Kaiser et al. | |
| 8,485,300 | B2 | 7/2013 | Hasegawa et al. | |
| 8,617,730 | B2 | 12/2013 | Tsukamoto et al. | |
| 8,647,763 | B2 | 2/2014 | Tennessen et al. | |
| 8,672,069 | B2 | 3/2014 | Cherney et al. | |
| 8,733,486 | B2 | 5/2014 | Nishiura et al. | |
| 8,758,924 | B2 | 6/2014 | Tennessen et al. | |
| 8,763,737 | B2 | 7/2014 | Kellogg | |
| 8,833,495 | B2 | 9/2014 | Iwata et al. | |
| 8,887,854 | B2 | 11/2014 | Ishikawa et al. | |
| 8,948,949 | B2 | 2/2015 | Tagawa et al. | |
| 8,955,627 | B2 | 2/2015 | Hatanaka et al. | |
| 8,973,691 | B2 | 3/2015 | Morgan et al. | |
| 9,017,846 | B2 | 4/2015 | Kawatani et al. | |
| 9,079,482 | B2 | 7/2015 | Besler et al. | |
| 9,114,803 | B2 | 8/2015 | Tagawa et al. | |
| 9,120,434 | B2 | 9/2015 | Tanahashi et al. | |
| 9,250,020 | B2 | 2/2016 | Mkstrom et al. | |
| 9,283,950 | B2 | 3/2016 | Yamamoto et al. | |
| 9,327,586 | B2 | 5/2016 | Miyashiro | |
| 9,346,421 | B2 | 5/2016 | Miyashiro | |
| 9,376,164 | B2 | 6/2016 | Tanaka et al. | |
| 9,421,872 | B2 | 8/2016 | Tsuji et al. | |
| 9,457,668 | B2 | 10/2016 | Matsuda | |
| 9,527,378 | B2 | 12/2016 | Nozaki et al. | |
| 9,533,570 | B2 | 1/2017 | Matsuda et al. | |
| 9,545,968 | B2 | 1/2017 | Miyashiro et al. | |
| 9,561,735 | B2 | 2/2017 | Nozaki | |
| 9,573,466 | B2 | 2/2017 | Noguchi | |
| 9,579,983 | B2 | 2/2017 | Inoue | |
| 9,604,632 | B2 | 3/2017 | Kitabatake et al. | |
| 9,616,759 | B2 | 4/2017 | Matsuda et al. | |
| 9,643,656 | B1 | 5/2017 | Hall et al. | |
| 9,660,236 | B2 | 5/2017 | Kondo et al. | |
| 9,694,665 | B2 | 7/2017 | Matsuda | |
| 9,771,116 | B2 | 9/2017 | Marko | |
| 9,812,685 | B2 | 11/2017 | Nozaki et al. | |
| 9,849,790 | B2 | 12/2017 | Miyashita et al. | |
| 9,868,490 | B2 | 1/2018 | Inoue | |
| 9,956,874 | B2 | 5/2018 | Velde et al. | |
| 10,011,323 | B2 | 7/2018 | Inoue | |
| 10,011,324 | B2 | 7/2018 | Inoue | |
| 10,017,169 | B1 | 7/2018 | Harvey et al. | |
| 10,020,470 | B2 | 7/2018 | Ito et al. | |
| 10,023,039 | B2 | 7/2018 | Takaki et al. | |
| 10,220,836 | B2 | 3/2019 | Honda et al. | |
| 10,259,530 | B2 | 4/2019 | Matsuda | |
| 10,270,314 | B2 | 4/2019 | Matsuda | |
| 10,322,769 | B2 | 6/2019 | Tanaka | |
| 10,407,125 | B2 | 9/2019 | Ohashi et al. | |
| 10,442,425 | B2 | 10/2019 | Miyashita et al. | |
| 10,522,845 | B2 | 12/2019 | O'Donnell et al. | |
| 10,527,111 | B2 | 1/2020 | Sparks | |
| 10,602,660 | B2 | 3/2020 | Manji et al. | |
| 10,611,425 | B2 | 4/2020 | Miyashiro et al. | |
| 10,632,840 | B2 | 4/2020 | Orimo | |
| 10,661,658 | B2 | 5/2020 | Anma et al. | |
| 10,665,908 | B2 | 5/2020 | Krull et al. | |
| 10,992,007 | B2 | 4/2021 | Kohda | |
| 11,034,226 | B2 | 6/2021 | Kochi et al. | |
| 11,208,009 | B2 | 12/2021 | Tominaga et al. | |
| 11,218,045 | B2 | 1/2022 | Yang et al. | |
| 11,267,352 | B2 | 3/2022 | Harvey | |
| 11,309,599 | B2 | 4/2022 | Yamagishi et al. | |
| 11,413,954 | B2 | 8/2022 | Matsushima et al. | |
| 11,424,503 | B2 | 8/2022 | Shinoda et al. | |
| 2006/0102395 | A1 | 5/2006 | Yamamoto et al. | |
| 2008/0035404 | A1 * | 2/2008 | Dahl | A01B 59/068 180/312 |
| 2008/0093148 | A1 | 4/2008 | Takahashi | |
| 2008/0164084 | A1 | 7/2008 | Bell et al. | |
| 2008/0210501 | A1 | 9/2008 | Clark | |
| 2009/0020348 | A1 | 1/2009 | Horii et al. | |
| 2009/0107741 | A1 | 4/2009 | Bell et al. | |
| 2009/0107749 | A1 | 4/2009 | Clark et al. | |
| 2009/0178871 | A1 * | 7/2009 | Sunsdahl | B60G 3/20 180/312 |
| 2011/0259657 | A1 | 10/2011 | Fuechtner | |
| 2011/0288705 | A1 | 11/2011 | Kawasaki et al. | |
| 2012/0083955 | A1 | 4/2012 | Noguchi | |
| 2012/0116628 | A1 | 5/2012 | Clark et al. | |
| 2013/0229072 | A1 | 9/2013 | Matsuda | |
| 2013/0264134 | A1 | 10/2013 | Matsuda | |
| 2013/0270024 | A1 | 10/2013 | Matsuda | |
| 2013/0270938 | A1 | 10/2013 | Matsuda | |
| 2013/0274983 | A1 | 10/2013 | Matsuda | |
| 2013/0277133 | A1 | 10/2013 | Matsuda | |
| 2014/0262568 | A1 | 9/2014 | Matsuda et al. | |
| 2014/0262569 | A1 | 9/2014 | Inoue et al. | |
| 2014/0339008 | A1 | 11/2014 | Matsuda | |
| 2014/0345827 | A1 | 11/2014 | Matsuda | |
| 2015/0008053 | A1 | 1/2015 | Matsuda | |
| 2015/0008061 | A1 | 1/2015 | Matsuda | |
| 2015/0244047 | A1 | 8/2015 | Straubel et al. | |
| 2016/0190526 | A1 | 6/2016 | Yamada et al. | |
| 2016/0318579 | A1 | 11/2016 | Miyashiro | |
| 2017/0029036 | A1 * | 2/2017 | Proulx | B60N 2/305 |
| 2017/0057364 | A1 | 3/2017 | Igarashi | |
| 2017/0232866 | A1 | 8/2017 | Sugizaki et al. | |
| 2017/0237379 | A1 | 8/2017 | Fukazu et al. | |
| 2017/0253273 | A1 * | 9/2017 | Kinsman | B62D 33/06 |
| 2017/0334281 | A1 | 11/2017 | Iwamitsu et al. | |
| 2017/0334434 | A1 | 11/2017 | Iwamitsu et al. | |
| 2018/0027364 | A1 | 1/2018 | Shintani et al. | |
| 2018/0086343 | A1 | 3/2018 | Crain et al. | |
| 2018/0201246 | A1 | 7/2018 | Kashiwai et al. | |
| 2018/0345817 | A1 | 12/2018 | Yamamoto et al. | |
| 2019/0288583 | A1 | 9/2019 | Tanaka | |
| 2019/0299788 | A1 | 10/2019 | Oyama et al. | |
| 2019/0299806 | A1 | 10/2019 | Oyama et al. | |
| 2019/0299808 | A1 | 10/2019 | Oyama et al. | |
| 2020/0023750 | A1 | 1/2020 | Fukami et al. | |
| 2020/0031191 | A1 | 1/2020 | Oh et al. | |
| 2020/0062132 | A1 | 2/2020 | Li | |
| 2020/0204043 | A1 | 6/2020 | Matsushima | |
| 2020/0212513 | A1 | 7/2020 | Matsuda | |
| 2020/0361301 | A1 | 11/2020 | Sakamoto et al. | |

(56) References Cited

U.S. PATENT DOCUMENTS

| | | | |
|---|---|---|---|
| 2020/0365851 | A1 | 11/2020 | Ozawa et al. |
| 2020/0398643 | A1 | 12/2020 | Miyazaki et al. |
| 2021/0001943 | A1 | 1/2021 | Ikeda et al. |
| 2021/0103292 | A1 | 4/2021 | O'Hara et al. |
| 2021/0221254 | A1 | 7/2021 | Abe |
| 2021/0242709 | A1 | 8/2021 | Lebreux |
| 2021/0284034 | A1 | 9/2021 | Klein et al. |
| 2021/0323402 | A1 | 10/2021 | Stock et al. |
| 2021/0323515 | A1 | 10/2021 | Scheuerell et al. |
| 2021/0331554 | A1 | 10/2021 | Mancini et al. |
| 2022/0024390 | A1 | 1/2022 | Johnstun et al. |
| 2022/0080818 | A1 | 3/2022 | Yamada et al. |
| 2022/0097511 | A1 | 3/2022 | Wang et al. |
| 2022/0111929 | A1 | 4/2022 | Matsushita |
| 2022/0135132 | A1 | 5/2022 | Rodriguez et al. |
| 2022/0140413 | A1 | 5/2022 | Whiteman et al. |
| 2022/0196300 | A1 | 6/2022 | Faruquee et al. |
| 2022/0203816 | A1 | 6/2022 | Lu et al. |
| 2022/0266806 | A1 | 8/2022 | King et al. |
| 2022/0266908 | A1 | 8/2022 | Kemp et al. |
| 2022/0289073 | A1 | 9/2022 | Takaki |
| 2022/0314735 | A1 | 10/2022 | Pinto et al. |
| 2022/0324288 | A1 | 10/2022 | Cohan et al. |
| 2022/0340044 | A1 | 10/2022 | Roebuck et al. |
| 2022/0355641 | A1 | 11/2022 | Cohan et al. |
| 2022/0355679 | A1 | 11/2022 | Ashraf et al. |
| 2022/0355787 | A1 | 11/2022 | Bernatchez et al. |
| 2022/0363127 | A1 | 11/2022 | Okazaki et al. |
| 2022/0363136 | A1 | 11/2022 | Bruneau et al. |
| 2022/0379730 | A1 | 12/2022 | Bernatchez |
| 2023/0226928 | A1 | 7/2023 | Barnett et al. |

FOREIGN PATENT DOCUMENTS

| | | | |
|---|---|---|---|
| CN | 1291887 | C | 12/2006 |
| CN | 101348158 | A | 1/2009 |
| CN | 100515823 | C | 7/2009 |
| CN | 102107608 | A | 6/2011 |
| CN | 107082011 | A | 8/2017 |
| CN | 110722995 | A | 1/2020 |
| CN | 211032203 | U | 7/2020 |
| CN | 213442894 | U | 6/2021 |
| CN | 214728163 | U | 11/2021 |
| CN | 113889709 | A | 1/2022 |
| EP | 2595285 | A1 | 5/2013 |
| EP | 2639941 | A1 | 9/2013 |
| EP | 2643871 | A1 | 10/2013 |
| EP | 2660096 | A1 | 11/2013 |
| EP | 2660136 | A1 | 11/2013 |
| EP | 2660137 | A1 | 11/2013 |
| EP | 2727761 | A2 | 5/2014 |
| EP | 2774831 | A1 | 9/2014 |
| EP | 2778032 | A1 | 9/2014 |
| EP | 2799318 | A1 | 11/2014 |
| EP | 2799319 | A1 | 11/2014 |
| EP | 2799321 | A1 | 11/2014 |
| EP | 2799322 | A1 | 11/2014 |
| EP | 2949495 | A1 | 12/2015 |
| EP | 3075588 | A1 | 10/2016 |
| EP | 3127739 | A1 | 2/2017 |
| EP | 3536592 | A1 | 9/2019 |
| EP | 3536596 | A1 | 9/2019 |
| EP | 3715237 | A1 | 9/2020 |
| EP | 3782835 | A1 | 2/2021 |
| EP | 3519223 | B1 | 10/2021 |
| EP | 4063174 | A1 | 9/2022 |
| EP | 4094973 | A1 | 11/2022 |
| IN | 242238 | | 5/2005 |
| IN | 201647006424 | | 7/2016 |
| IN | 201647025315 | | 9/2016 |
| IN | 202014024948 | | 1/2021 |
| IN | 202014034052 | | 2/2021 |
| IN | 202117043149 | | 12/2021 |
| IN | 202117018890 | | 1/2022 |
| IN | 202117043201 | | 1/2022 |
| IN | 202117054606 | | 4/2022 |
| IN | 202117054607 | | 4/2022 |
| IN | 202117054609 | | 4/2022 |
| IN | 202114043974 | | 5/2022 |
| IN | 202114044161 | | 5/2022 |
| IN | 202114044171 | | 5/2022 |
| JP | 2900174 | B2 | 6/1999 |
| JP | 2000-318473 | A | 11/2000 |
| JP | 2001-116090 | A | 4/2001 |
| JP | 2001-119801 | A | 4/2001 |
| JP | 2001-119802 | A | 4/2001 |
| JP | 3179508 | B2 | 6/2001 |
| JP | 2001-301476 | A | 10/2001 |
| JP | 3321547 | B2 | 9/2002 |
| JP | 2002-325301 | A | 11/2002 |
| JP | 2002-352866 | A | 12/2002 |
| JP | 2002-352867 | A | 12/2002 |
| JP | 2002-354608 | A | 12/2002 |
| JP | 3554475 | B2 | 8/2004 |
| JP | 2005-119599 | A | 5/2005 |
| JP | 3769282 | B2 | 4/2006 |
| JP | 4005594 | B2 | 11/2007 |
| JP | 2008-136275 | A | 6/2008 |
| JP | 2009-022110 | A | 1/2009 |
| JP | 4233714 | B2 | 3/2009 |
| JP | 4547554 | B2 | 9/2010 |
| JP | 4626342 | B2 | 2/2011 |
| JP | 4700403 | B2 | 6/2011 |
| JP | 2011-178348 | A | 9/2011 |
| JP | 2011-244649 | A | 12/2011 |
| JP | 4914868 | B2 | 4/2012 |
| JP | 5009096 | B2 | 8/2012 |
| JP | 2012-239344 | A | 12/2012 |
| JP | 2012-244724 | A | 12/2012 |
| JP | 2013-154858 | A | 8/2013 |
| JP | 2013-158109 | A | 8/2013 |
| JP | 5301520 | B2 | 9/2013 |
| JP | 2013-203313 | A | 10/2013 |
| JP | 5353590 | B2 | 11/2013 |
| JP | 2013-248971 | A | 12/2013 |
| JP | 5419513 | B2 | 2/2014 |
| JP | 5449279 | B2 | 3/2014 |
| JP | 2014-096909 | A | 5/2014 |
| JP | 5504034 | B2 | 5/2014 |
| JP | 5509811 | B2 | 6/2014 |
| JP | 2014-127338 | A | 7/2014 |
| JP | 5600633 | B2 | 10/2014 |
| JP | 5608604 | B2 | 10/2014 |
| JP | 2015-020694 | A | 2/2015 |
| JP | 2015-021406 | A | 2/2015 |
| JP | 2015-074435 | A | 4/2015 |
| JP | 5723589 | B2 | 5/2015 |
| JP | 2015-107728 | A | 6/2015 |
| JP | 2015-123784 | A | 7/2015 |
| JP | 2015-123852 | A | 7/2015 |
| JP | 5771663 | B2 | 9/2015 |
| JP | 5850641 | B2 | 2/2016 |
| JP | 5904808 | B2 | 4/2016 |
| JP | 2016-095960 | A | 5/2016 |
| JP | 5914204 | B2 | 5/2016 |
| JP | 5914205 | B2 | 5/2016 |
| JP | 5919760 | B2 | 5/2016 |
| JP | 2016-115518 | A | 6/2016 |
| JP | 2016-122572 | A | 7/2016 |
| JP | 5966749 | B2 | 8/2016 |
| JP | 2017-065282 | A | 4/2017 |
| JP | 2017-140990 | A | 8/2017 |
| JP | 2017-178047 | A | 10/2017 |
| JP | 2017-190071 | A | 10/2017 |
| JP | 2017-206212 | A | 11/2017 |
| JP | 2018-098825 | A | 6/2018 |
| JP | 2018-098985 | A | 6/2018 |
| JP | 2018-143018 | A | 9/2018 |
| JP | 2018-202945 | A | 12/2018 |
| JP | 6643184 | B2 | 2/2020 |
| JP | 2020-065362 | A | 4/2020 |
| JP | 2020-080591 | A | 5/2020 |
| JP | 2020-196293 | A | 12/2020 |
| JP | 2021-003934 | A | 1/2021 |

(56) References Cited

FOREIGN PATENT DOCUMENTS

| | | | |
|---|---|---|---|
| JP | 2021-027012 | A | 2/2021 |
| JP | 2021-035214 | A | 3/2021 |
| JP | 6847675 | B2 | 3/2021 |
| JP | 6911078 | B2 | 7/2021 |
| JP | 2021-114878 | A | 8/2021 |
| JP | 2021-118605 | A | 8/2021 |
| JP | 7016845 | B2 | 2/2022 |
| JP | 7021986 | B2 | 2/2022 |
| JP | 7081958 | B2 | 6/2022 |
| JP | 7149093 | B2 | 10/2022 |
| JP | 7158166 | B2 | 10/2022 |
| TW | 200925018 | A | 6/2009 |
| TW | 201726453 | A | 8/2017 |
| TW | 201932327 | A | 8/2019 |
| WO | 2007/049516 | A1 | 5/2007 |
| WO | 2009/098948 | A1 | 8/2009 |
| WO | 2010/046905 | A1 | 4/2010 |
| WO | 2012/029424 | A1 | 3/2012 |
| WO | 2012/066601 | A1 | 5/2012 |
| WO | 2012/070220 | A1 | 5/2012 |
| WO | 2012/169542 | A1 | 12/2012 |
| WO | 2013/073318 | A1 | 5/2013 |
| WO | 2013/080736 | A1 | 6/2013 |
| WO | 2013/093964 | A1 | 6/2013 |
| WO | 2013/098891 | A1 | 7/2013 |
| WO | 2014/058045 | A1 | 4/2014 |
| WO | 2015/093464 | A1 | 6/2015 |
| WO | 2015/093473 | A1 | 6/2015 |
| WO | 2015/099033 | A1 | 7/2015 |
| WO | 2017/196799 | A1 | 11/2017 |
| WO | 2018/037627 | A1 | 3/2018 |
| WO | 2020/017032 | A1 | 1/2020 |
| WO | 2021/014489 | A1 | 1/2021 |
| WO | 2021/117902 | A1 | 6/2021 |
| WO | 2021/214903 | A1 | 10/2021 |
| WO | 2021/215426 | A1 | 10/2021 |
| WO | 2021/246009 | A1 | 12/2021 |
| WO | 2022/099910 | A1 | 5/2022 |
| WO | 2023/044439 | A1 | 3/2023 |

OTHER PUBLICATIONS

European Search Report for EP Patent Application No. 24164772.6, Issued on Aug. 16, 2024, 10 pages.

* cited by examiner

ELECTRIC ALL-TERRAIN VEHICLE

CROSS-REFERENCE TO RELATED APPLICATIONS

This application claims the benefit of U.S. Provisional Patent Application No. 63/245,286, filed Sep. 17, 2021, entitled "Electric All-Terrain Vehicle" and U.S. Provisional Patent Application No. 63/312,930, filed Feb. 23, 2021, entitled "Electric All-Terrain Vehicle", the contents of which are expressly incorporated by reference herein.

FIELD OF THE DISCLOSURE

The present application relates to a powertrain for an all-terrain vehicle and, more particularly, to an electric powertrain for the all-terrain vehicle with increased storage availability.

BACKGROUND OF THE DISCLOSURE

Vehicles configured for on-road and off-road travel, such as utility vehicles and all-terrain vehicles, may have turf-mode, one-wheel drive ("1WD"), two-wheel drive ("2WD"), three-wheel drive ("3WD"), or four-wheel/all-wheel drive ("4WD" or "AWD") capabilities. Such vehicles typically include combustion-based powertrain assemblies, which include a combustion engine. However, hybrid and electric powertrains are less common among utility and all-terrain vehicles. Yet, given the societal and regulations-based emphasis on green technology and electric automobiles, a need exists for an electric utility/all-terrain vehicle.

SUMMARY OF THE DISCLOSURE

In one embodiment of the present disclosure, a utility vehicle includes a longitudinally extending frame, front and rear ground engaging members coupled to and supporting the frame, and an electric powertrain assembly supported by the frame. The utility vehicle further includes a battery supported by the frame, a steering input, a front motor positioned forward of the battery and coupled to the front ground engaging members, and a rear motor positioned rearward of the battery and coupled to the rear ground engaging members.

In another embodiment of the present disclosure, a utility vehicle includes a longitudinally extending frame and front and rear ground engaging members coupled to and supporting the frame. A storage assembly for the utility vehicle includes a main compartment having a length that is at least one-third of a length of the utility vehicle and at least one opening for accessing the storage assembly.

In a further embodiment of the present disclosure, a utility vehicle includes a longitudinally extending frame and front and rear ground engaging members coupled to and supporting the frame. A storage assembly for the utility vehicle includes a main compartment and a rear portion having a right rear compartment, a left rear compartment, and at least one door for accessing a portion of the storage assembly.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where:

FIG. 50 is a schematic view of an interface to control charging of various tools, accessories, and the like;

Figure 1:
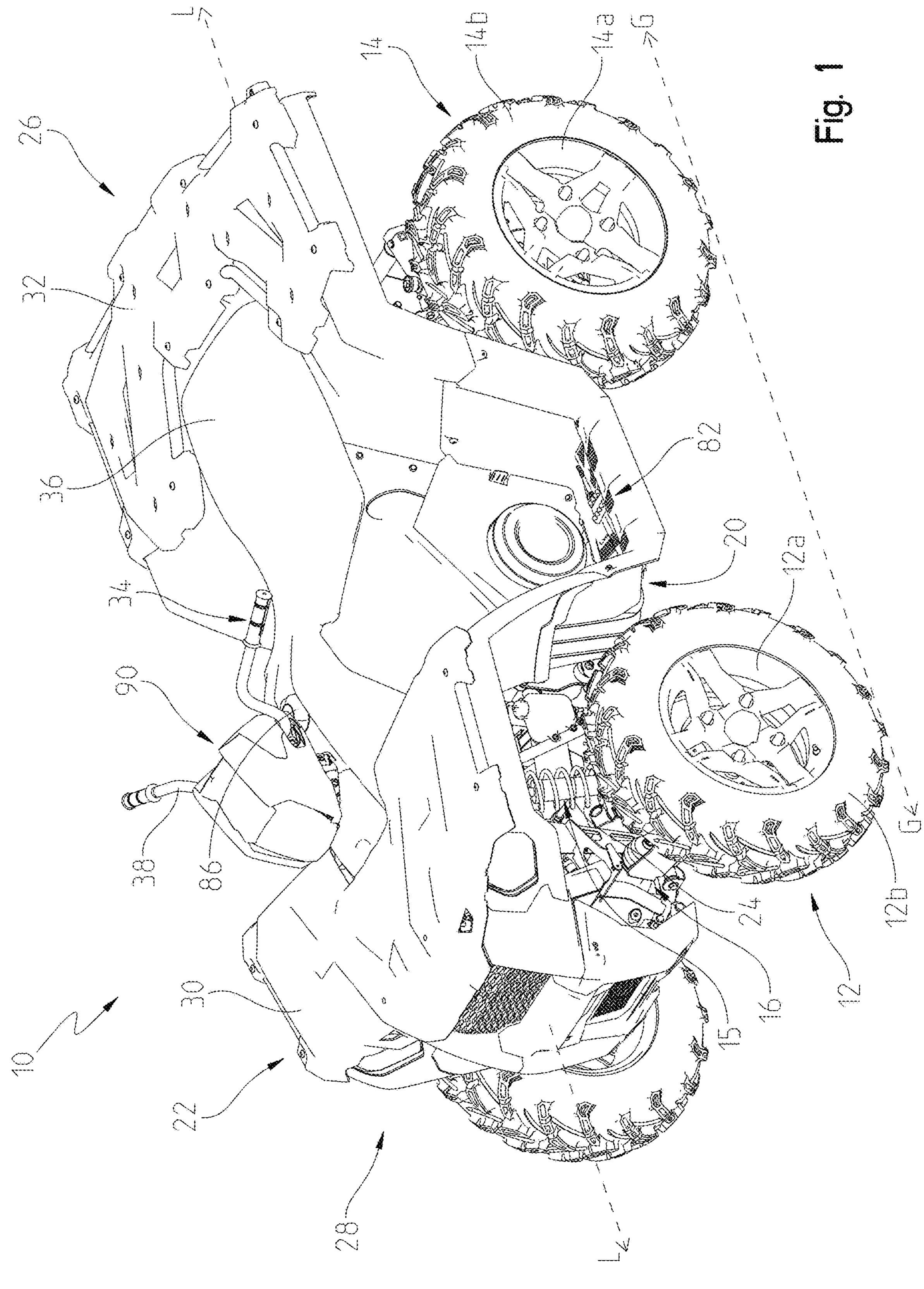
FIG. 1 is a front left perspective view of a utility vehicle of the present disclosure.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as other all-terrain vehicles, motorcycles, snowmobiles, and golf carts.

Referring to FIG. 1, an illustrative embodiment of a utility vehicle 10 is shown which is configured to traverse a variety of off-road terrains, including mud, rocks, dirt, and other trail or off-road conditions. Vehicle 10 may be referred to as a utility vehicle ("UTV"), an all-terrain vehicle ("ATV"), or a side-by-side vehicle ("SxS") and is configured for travel over various terrains or surfaces. More particularly, vehicle 10 may be configured for military, industrial, agricultural, or recreational applications.

Vehicle 10 includes a plurality of ground-engaging members, including front ground-engaging members 12 and rear ground-engaging members 14, a powertrain assembly 15, a driveline assembly 16, a frame assembly 20, a plurality of body panels 22 coupled to frame assembly 20, a front suspension assembly 24 supported by a front portion 28 of frame assembly 20, a rear suspension assembly (not shown) supported by a rear frame portion 26 of frame assembly 20, a front cargo area 30 supported by front portion 28, and a rear cargo area 32 supported by rear frame portion 26 of frame assembly 20. As shown in FIG. 1, vehicle 10 extends between front and rear ground-engaging members 12, 14 in a longitudinal direction along a longitudinal vehicle centerline L. More particularly, frame assembly 20 is supported by front and rear ground-engaging members 12, 14 on a ground surface G and frame assembly 20 extends longitudinally between front and rear frame portions 28, 26 along longitudinal centerline L.

Frame assembly 20 supports an operator area 34 which includes at least one seat 36, which may be a straddle seat, a bench seat configured to support the operator and the passenger on the same seating surface, or may be bucket seats configured to individually support the operator and passenger in a generally side-by-side arrangement, depending on the configuration and application of vehicle 10. Operator area 34 also may include various operator inputs, such as a steering input 38 (e.g., handlebars or a steering wheel), a gauge and/or display 90, a throttle or accelerator input 84, a brake pedal 82, etc.

As shown in FIGS. 2-5, frame assembly 20 includes upper longitudinal members 40 and lower longitudinal members 42. Upper longitudinal members 40 may be coupled to each other through various braces, cross-members, or brackets 44. Similarly, lower longitudinal members 42 may be coupled to each other through braces, cross-members, or brackets 46. Longitudinal members 40, 42 are configured to support components of vehicle 10; for example, upper longitudinal members 42 may support seat 36 while lower longitudinal members 42 may support components of powertrain assembly 15.

Referring to FIGS. 2-11, powertrain assembly 15 of vehicle 10 may be an electric powertrain assembly. More particularly, powertrain assembly 15 does not include an internal combustion engine and, instead, power is provided by one or more batteries operably coupled to one or more motors, as disclosed further herein. Powertrain assembly 15 includes at least one battery 50, at least one motor 52, at least one inverter 54 or motor control unit, a front differential or gearbox 56, and a rear differential or gearbox 58. Various embodiments of powertrain assembly 15 of vehicle 10 include a rear motor **52*a* and a front motor 52*b*. Rear motor 52*a* is operably coupled to rear ground-engaging members 14 through rear differential 58 and front motor 52*b* may be operably coupled to front ground-engaging members 12 through front differential 56. Front and/or rear differential(s) 56, 58 may be configured as clutch packs, planetary gear sets, bevel gear sets, helical gear sets, open differentials, limited-slip differentials, electromechanically or mechanically lockable differentials, Salisbury limited-slip differentials, positraction differentials, or any variant or combination of the above or similar mechanisms configured to transmit power or alter torque at any of ground-engaging members 12, 14. For example, a clutch may be used in combination with and/or in lieu of front or rear differential 56, 58 for decoupling front and/or rear motors 52*b*, 52*a* from ground-engaging members 12, 14**. This may contribute to increased efficiency and customized control by an operator.

Various embodiments of portions of powertrain assembly 15 may be disclosed further in U.S. patent application Ser. No. 17/232,739, filed on Apr. 16, 2021, the complete disclosure of which is expressly incorporated by reference herein. The present disclosure may be used in combination with the active agility system disclosed in U.S. Provisional Patent Application Ser. No. 63/013,272, filed Apr. 21, 2020, the complete disclosure of which is expressly incorporated by reference herein. Additionally, various aspects of vehicle 10 may be disclosed in U.S. patent application Ser. No. 17/098,185, filed on Nov. 13, 2020, the complete disclosure of which is expressly incorporated by reference herein.

Front differential 56 is operably coupled to front ground-engaging members 12 through front half shafts or axles (not shown) and rear differential 58 is operably coupled to rear ground-engaging members 14 through rear half shafts or axles (not shown). More particularly, the front half shafts are operably coupled to a wheel hub **12*a* (FIG. 1) of each front ground-engaging members 12 and the rear half shafts are operably coupled to a wheel hub 14*a* (FIG. 1) of each rear ground-engaging members 14. Front tires 12*b* generally surround front wheel hubs 12*a* and rear tires 14*b* generally surround rear wheel hubs 14*a* (FIG. 1**), however, any type of tire, track, or other propulsion member may be used.

Figure 2:
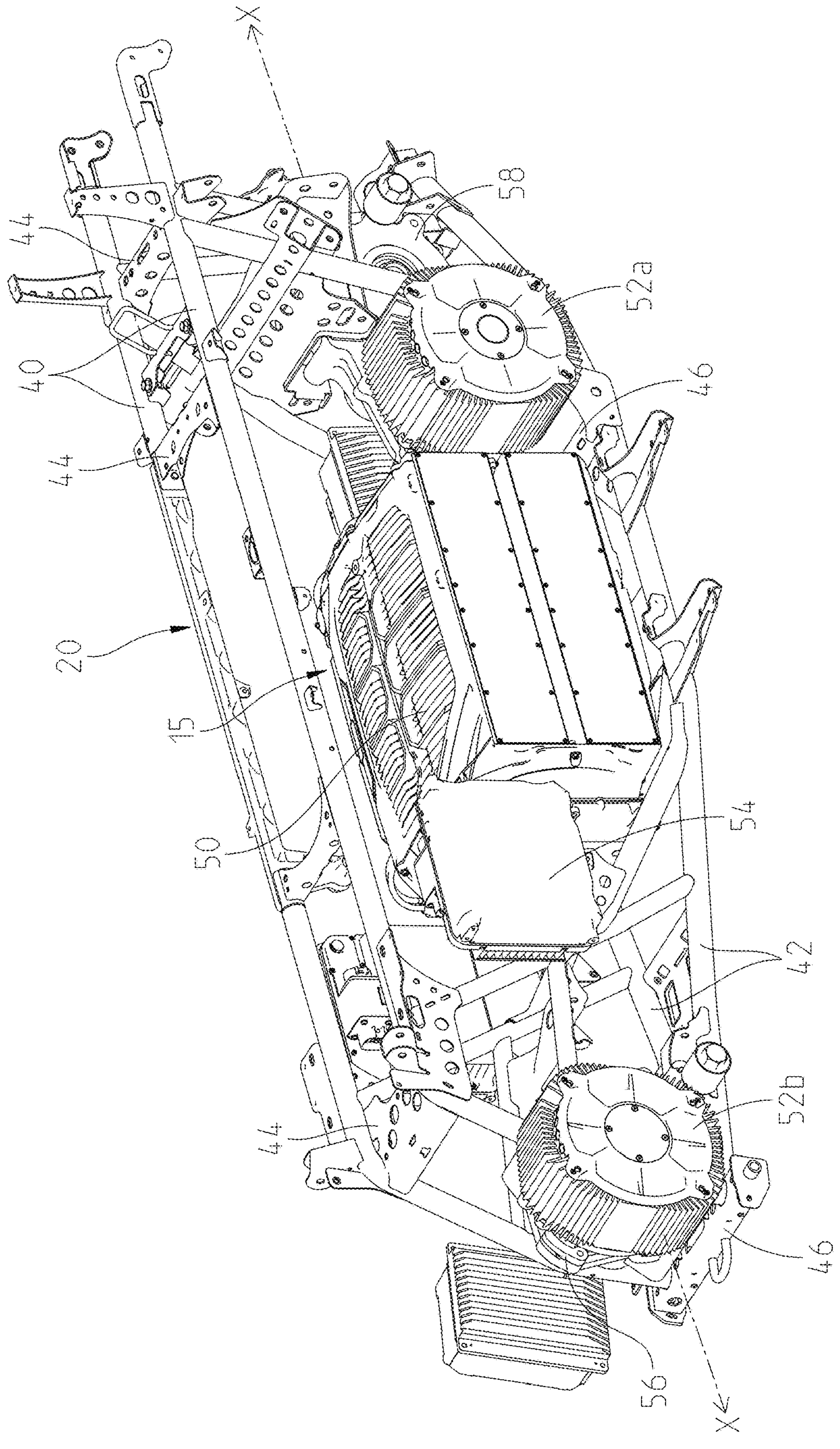
FIG. 2 is a front left perspective view of a powertrain assembly and a frame assembly of the utility vehicle of FIG. 1.
Figure 3:
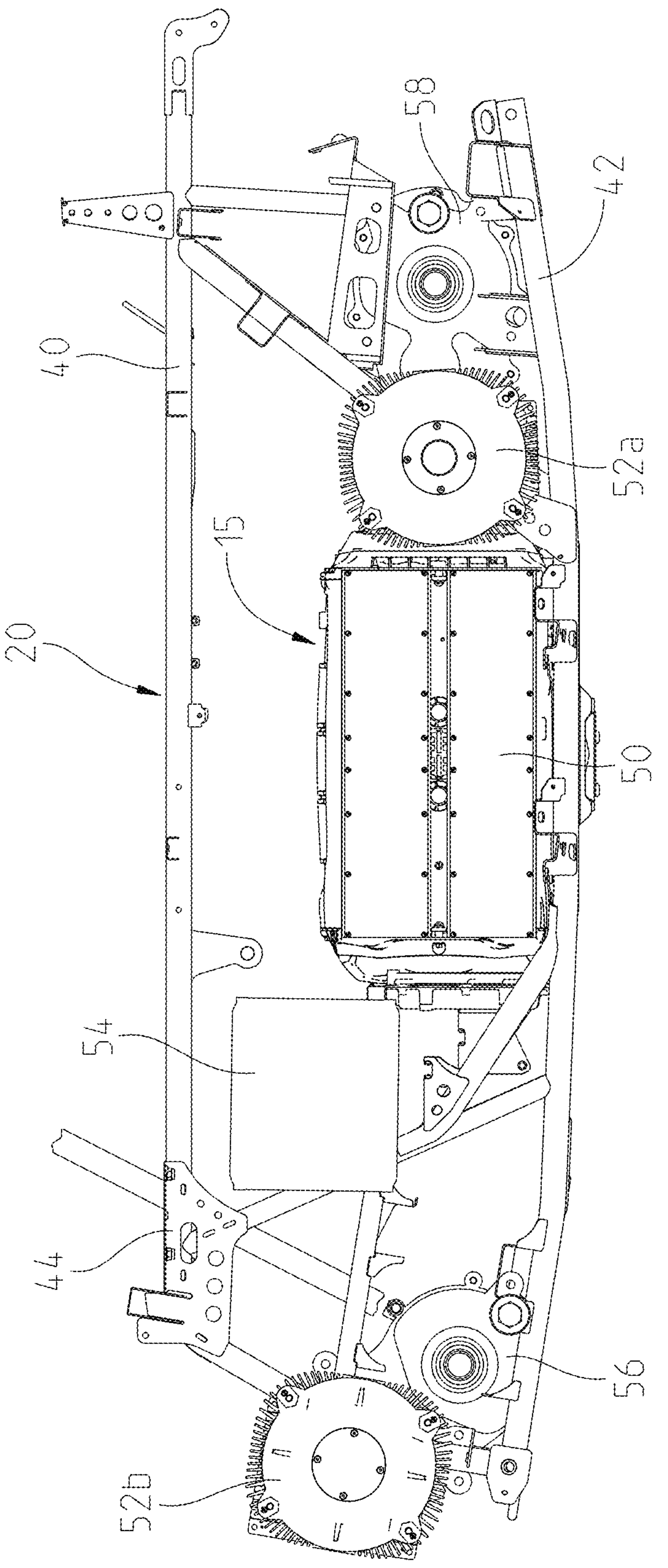
FIG. 3 is a left side view of the powertrain assembly and frame assembly of the utility vehicle of FIG. 1.
Figure 4:
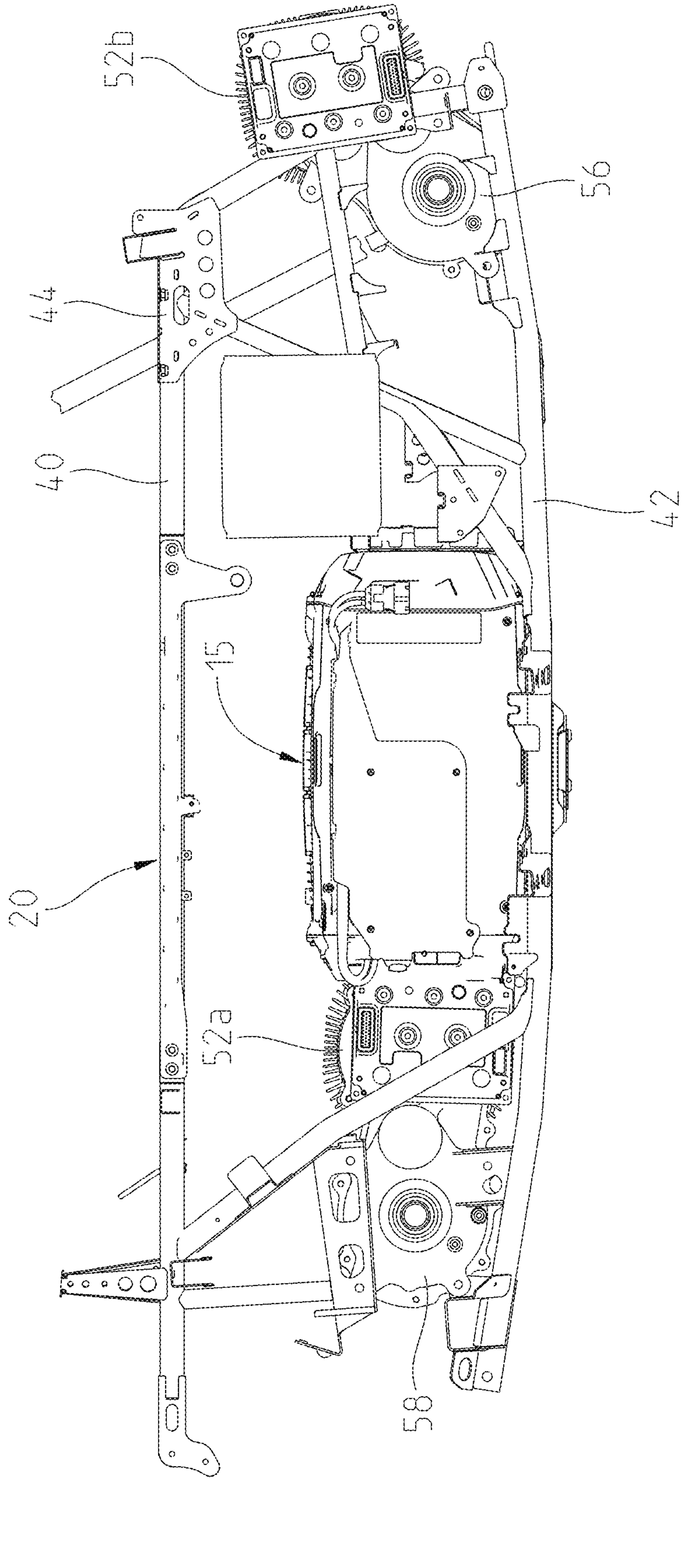
FIG. 4 is a left side view of the powertrain assembly and frame assembly of the utility vehicle of FIG. 1.
Figure 5:
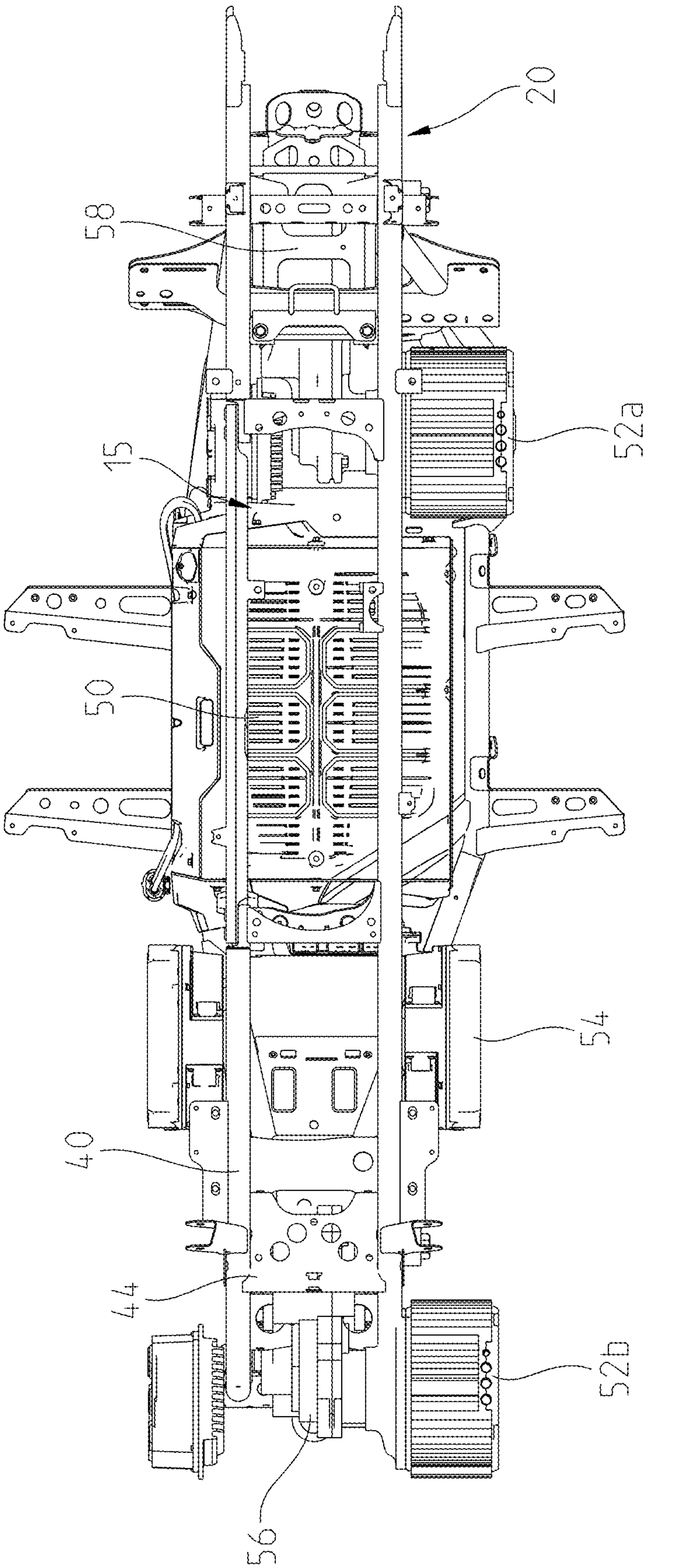
FIG. 5 is a top view of the powertrain assembly and frame assembly of the utility vehicle of FIG. 1.

In various embodiments, as best illustrated in FIGS. 1-3, at least a portion of front motor **52*b* is positioned forward of frame assembly 20. Front motor 52*b* is supported by front portion 28 of frame assembly 20 and positioned generally forward of steering 38 and front suspension assembly 24. As such, at least a centerline of front motor 52*b*, if not the entirety of front motor 52*b*, may be positioned forward of a centerline of the axis of rotation of front ground-engaging members 12. Inverter 54 may be positioned rearward of steering 38 and forward of battery 50. Further, rear motor 52*a* is positioned rearward of battery 50 and adjacent rear differential 58. Rear differential 58 extends rearwardly relative to rear motor 52*a* and is supported by frame assembly 20. At least a portion of front motor 52*b*, rear motor 52*a*, inverter 54, and battery 50 are aligned with one another in the longitudinal direction. Additionally, as illustrated in FIGS. 2-5, powertrain assembly 15 is configured such that rear and front motors 52*a*, 52*b* and rear and front differentials 58, 56 are at least partially laterally aligned, respectively. In this way, rear motor 52*a* and rear differential 58 are at least partially laterally aligned and front motor 52*b* and front differential 56 are at least partially laterally aligned. In other embodiments, rear motor 52*a* and rear differential 58 are at least partially longitudinally aligned with each other and front motor 52*b* and front differential 56** are at least partially longitudinally aligned with each other.

In the described embodiments wherein front motor **52*b* is positioned forward of and supported by front portion 28 of frame assembly 20, a winch may be supported by frame assembly 20 and positioned forward of steering 38 and front suspension assembly 24. For example, the winch may be packaged with front motor 52*b*. Front motor 52*b* may comprise a gear configured to operatively couple with the winch. An output from the winch may be operatively coupled to front differential 56. Positioning front motor 52*b* forward of frame assembly 20 allows space rearward of frame assembly 20** to be made available for additional components, for example storage assemblies, as will be described further herein.

In other embodiments, front motor **52*b* may be positioned rearwardly of the forwardmost extent of front portion 28 of frame assembly 20 and the forwardmost extent of steering 38 such that the region generally forward of steering 38 is available for storage or positioning of various other components. In these embodiments, front motor 52*b* may be positioned rearwardly of the axis of rotation of front ground-engaging members 12. For example, a radiator and/or a charger may be coupled to front portion 28 of frame 20 at least partially forward of front suspension 24 and steering 38. In these embodiments, front suspension assembly 24 may be positioned rearward of steering 38 and/or front motor 52*b*. Positioning suspension assembly 24 behind front motor 52*b* may contribute to a lower center of gravity and may increase durability of front suspension assembly 24. In the described embodiment where front motor 52***b* is positioned forward of front portion 28 of frame assembly 20, various members of steering 38 may be bent or offset to accommodate front motor 52*b*. In other embodiments, steering 38 may be configured as steer by wire, the configuration of which may allow the space needed for front motor 52*b*. In other embodiments, steering 38 may be altered or configured according to any known methods for accommodating front motor 52*b* and storage of other components. Additionally, front and rear differentials 56, 58 may be offset to accommodate this positioning within vehicle 10.

As illustrated in at least FIGS. 1-4, battery 50 is positioned low such that a majority of battery 50 is positioned below upper longitudinal members 40. Illustratively, an upper portion of battery 50 may be generally longitudinally aligned with an upper surface of front and rear differentials 56, 58 such that the vertical extent of battery 50 on vehicle 10 is approximately the same as the vertical extent of front and rear differentials 56, 58, thereby configuring such heavier components of vehicle 10 lower on frame assembly 20 to decrease the center of gravity. Battery 50 may be positioned in this way because, without an internal combustion engine and a center prop shaft extending through vehicle 10, battery 50 may be supported directly on lower longitudinal members 42. In embodiments wherein front and rear motors 52*b*, 52*a* operate independently, there is no requirement for a prop shaft extending through vehicle 10 and connecting the front and rear motors 52*b*, 52*a*. The relatively low positioning of battery 50 within vehicle 10 may be beneficial for a variety of reasons. For example, it may contribute to a lower center of gravity of vehicle 10 which aids in the stability of vehicle 10 during operation. Additionally, the centralized positioning of battery 50 allows for increased footwell space for operator area 34 and increases availability for storage space in vehicle 10.

Figure 6:
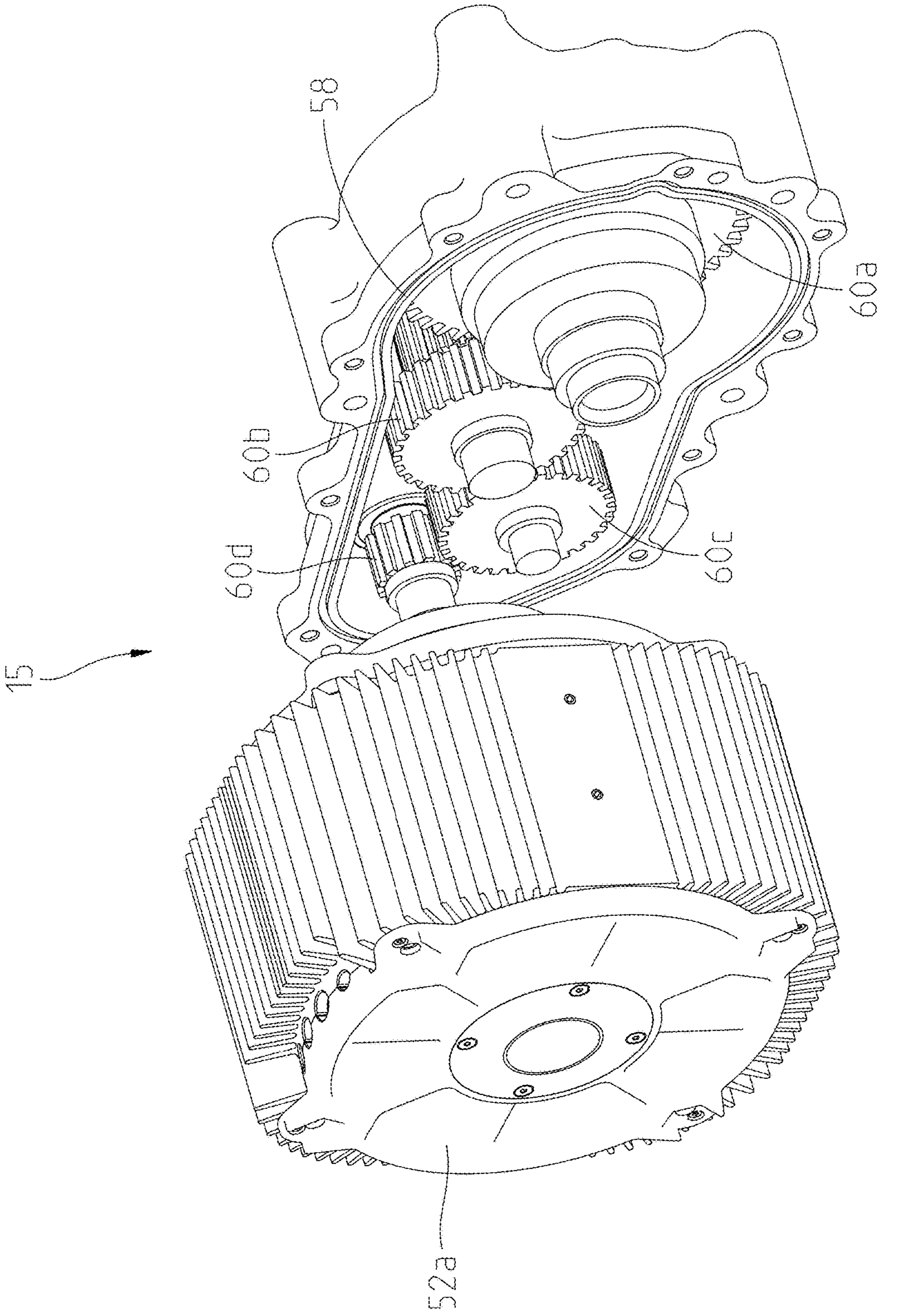
FIG. 6 is a perspective view of a portion of the powertrain assembly of the utility vehicle of FIG. 1.

FIG. 6 illustrates an embodiment of rear motor 52*a* and rear differential 58 of powertrain assembly 15. In embodiments where both front and rear motors 52*b*, 52*a* are used, the torque output is sufficient such that front and rear differential 56, 58 may each be configured as a single speed differential or gearbox. As previously described, front and rear differential 56, 58 may include varying configurations to achieve the desired gear reduction ratios. FIG. 6 illustrates the use of a helical gear set through a plurality of gears 60*a*, 60*b*, 60*c*, and 60*d* to transmit torque to front and rear ground engaging members 12, 14 (FIG. 1). The configuration of gears 60 allows for double reduction within rear differential 58 to provide a gear reduction ratio of a 5:1, for example, although a variety of gear reduction ratios are possible, such as 6:1 or 9:1. The illustrated configuration of rear differential 58 may contribute to a simplified powertrain assembly 15 and has a reduced noise output which may be at least beneficial to the operator experience. While described with reference to rear differential 58, the above described configuration may apply to front differential 56 as well. As previously described with reference to FIG. 1, other configurations may be used for front and rear differentials 56, 58 that provide the benefits described with reference to FIG. 6.

Figure 7:
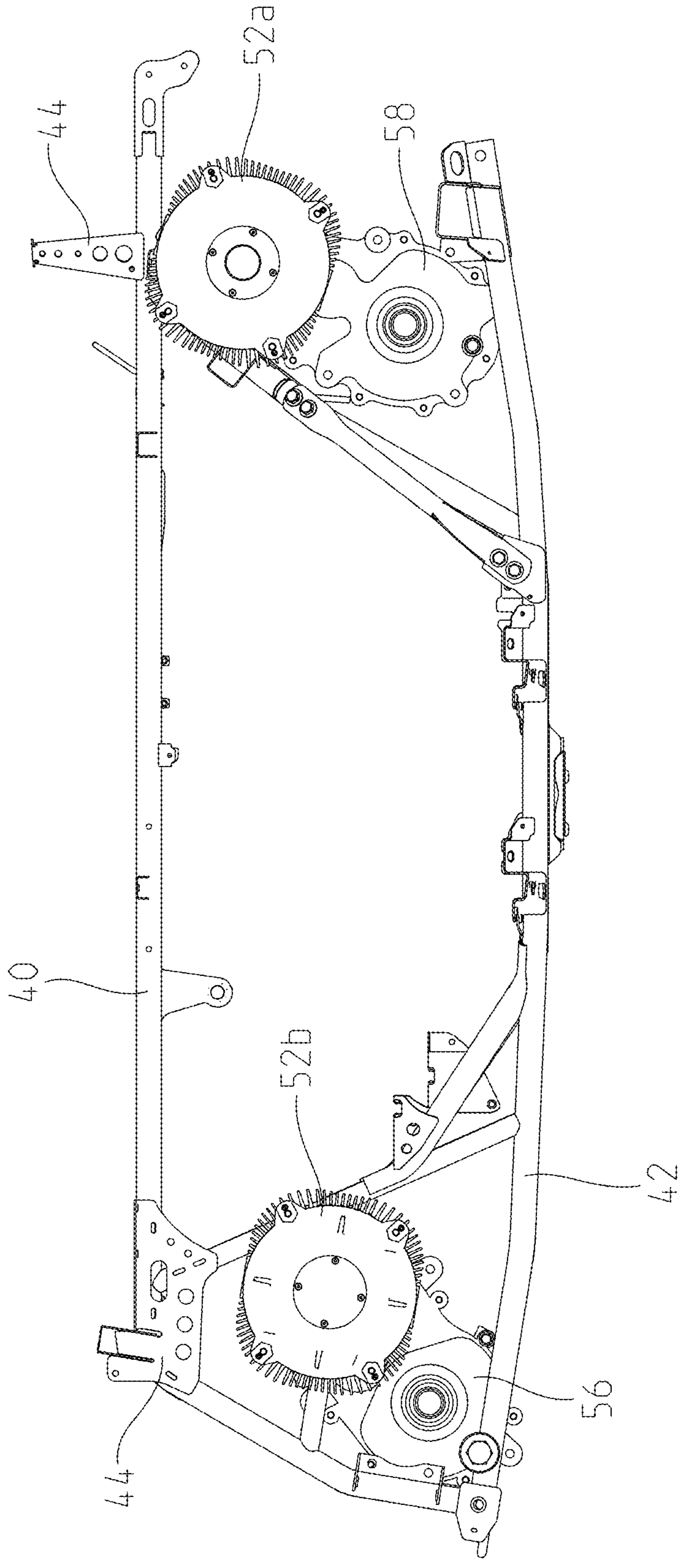
FIG. 7 is a left side view of an alternative configuration of the powertrain assembly of the utility vehicle of FIG. 1.

In contrast to the generally longitudinally alignment of various components of powertrain assembly 15 illustrated in and described with reference to FIGS. 2-5, various components of powertrain assembly 15 may be rotated or in a different configuration such that they are supported vertically on frame assembly 20, as illustrated in FIG. 7. In the illustrative embodiment of FIG. 7, a portion of front differential 56 is positioned forward of and longitudinally below front motor 52*b*. Front motor 52*b* is mounted onto front differential 56 and above lower longitudinal members 42 such that the space forward of front differential 56 is relatively open. In various embodiments, front motor 52*b* may be mounted under invertor 54 such that front motor 52*b* and inverter 54 may be mounted as a one-piece assembly, further reducing the space occupied by powertrain assembly 15 on vehicle 10. Front differential 56 may be positioned forward or rearward of steering 38.

As illustrated, rear motor 52*a* is positioned above rear differential 58 such that rear motor 52*a* is at least partially vertically aligned with rear differential 58. By mounting front and rear motors 52*b*, 52*a* vertically onto front and rear differential 56, 58, respectively, space along lower longitudinal members 42 of vehicle 10 is made available for other components or for a particular configuration of vehicle 10. This may include increased space for battery 50, inverter 54, and/or any other component of vehicle 10.

Figure 8B:
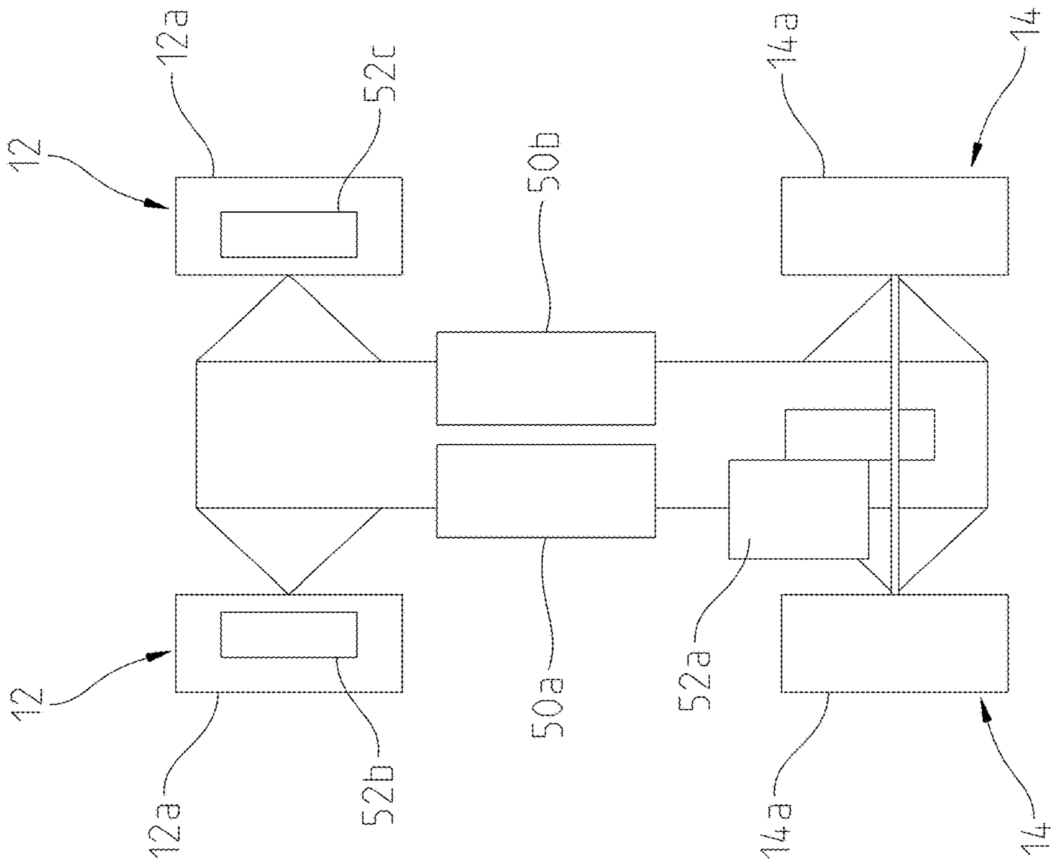
FIG. 8B is a schematic view of a further alternative configuration of the powertrain assembly of the utility vehicle of FIG. 1.
Figure 8A:
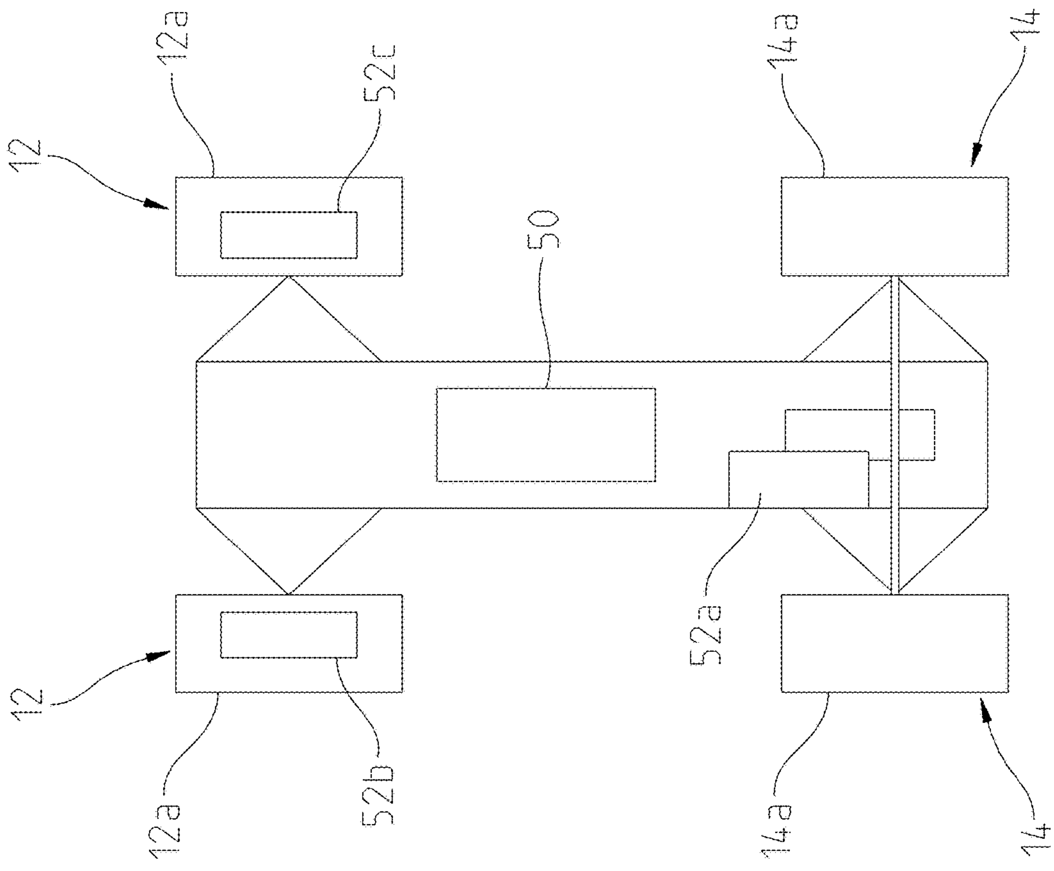
FIG. 8A is a schematic view of an alternative configuration of the powertrain assembly of the utility vehicle of FIG. 1.

Various other configurations are possible for powertrain assembly 15 of vehicle 10. For example, FIG. 8A and FIG. 8B illustrate an additional configuration of powertrain assembly 15 of vehicle 10. In these embodiments, powertrain assembly 15 comprises rear motor 52*a*, front motor 52*b*, and a second front motor 52*c*. Rear motor 52*a* is positioned between rear ground engaging members 14. Front motor 52*b* is mounted onto wheel hub 12*a* of a left ground-engaging member of front ground-engaging members 12 and front motor 52*c* is mounted onto wheel hub 12*a* of a right ground-engaging member of front ground-engaging members 12. In other embodiments, powertrain assembly 15 may include rear motor 52*a*, front motor 52*b*, second front motor 52*c*, and a second rear motor, such that each wheel hub 12*a* of front ground-engaging members 12 and each wheel hub 14*a* of rear ground-engaging members 14 has an associated motor 52 mounted thereon. Mounting each of motors 52 to an associated wheel hub 12*a*, 14*a* eliminates the need for front and rear half prop shafts. Among various other advantages, this configuration allows for more flexibility in angles of front suspension assembly 24 and rear suspension assembly (not shown). Additionally, with use of wheel hubs 12*a*, 12*b* for mounting motors 52, differential motor steering may be used, and a separate electric power steering unit may be eliminated.

As illustrated in FIGS. 8A and 8B, battery 50 is positioned low on frame assembly 20. As previously mentioned, this configuration of battery 50 may be achieved due to the elimination of a combustion engine and prop shaft extending longitudinally through vehicle 10, which may otherwise be required for a combustion-based powertrain assembly. In particular, positioning battery 50 relatively centered in vehicle 10 contributes to optimizing the size and position of footwells, thus increasing space and comfort for operator. In various embodiments, as illustrated specifically in FIG. 8B, powertrain assembly 15 may include a first battery 50*a* and a second battery 50*b* positioned adjacent one another and laterally aligned. While shown positioned laterally aligned with one another, various other positions of the batteries 50*a*, 50*b* are possible such as, but not limited to, longitudinally aligned. In various embodiments, powertrain assembly 15 may include more than two batteries 50*a*, 50*b*. With reference to any of the previously described configurations for battery(ies) 50, each battery 50 configured for use in powertrain assembly 15 may comprise one or more modules. Further, battery 50 may be removed from vehicle 10 through an underside or the side of vehicle 10. As such, battery 50 can be removed and replaced with a different battery. This may be beneficial for allowing upgrades in battery 50 of vehicle 10, or for swapping with a battery of another vehicle if increased battery charge is required for either vehicle. Battery 50 may be accessible through a removable body panel on an underside, top, front, rear, left, or right side of vehicle 10. While battery 50 is used for powering vehicle 10, battery 50 is sized to have sufficient power for powering tools and accessories of vehicle 10, as will be described further with reference to FIGS. 47 and 48. Additionally, battery 50 may be used for powering smaller vehicles or large equipment to be used by an operator.

Figure 9A:
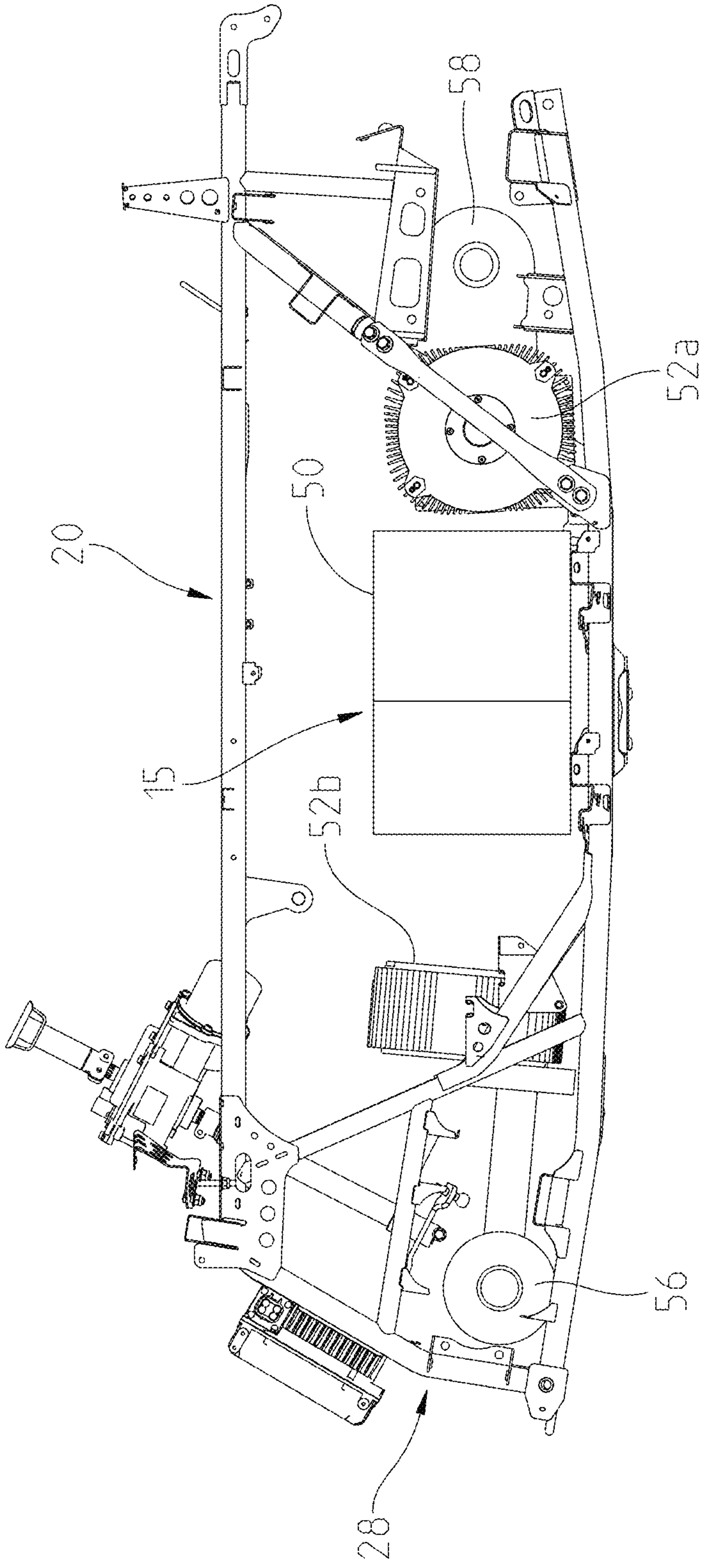
FIG. 9A is a left side view of an alternative configuration of the powertrain assembly of the utility vehicle of FIG. 1.
Figure 9B:
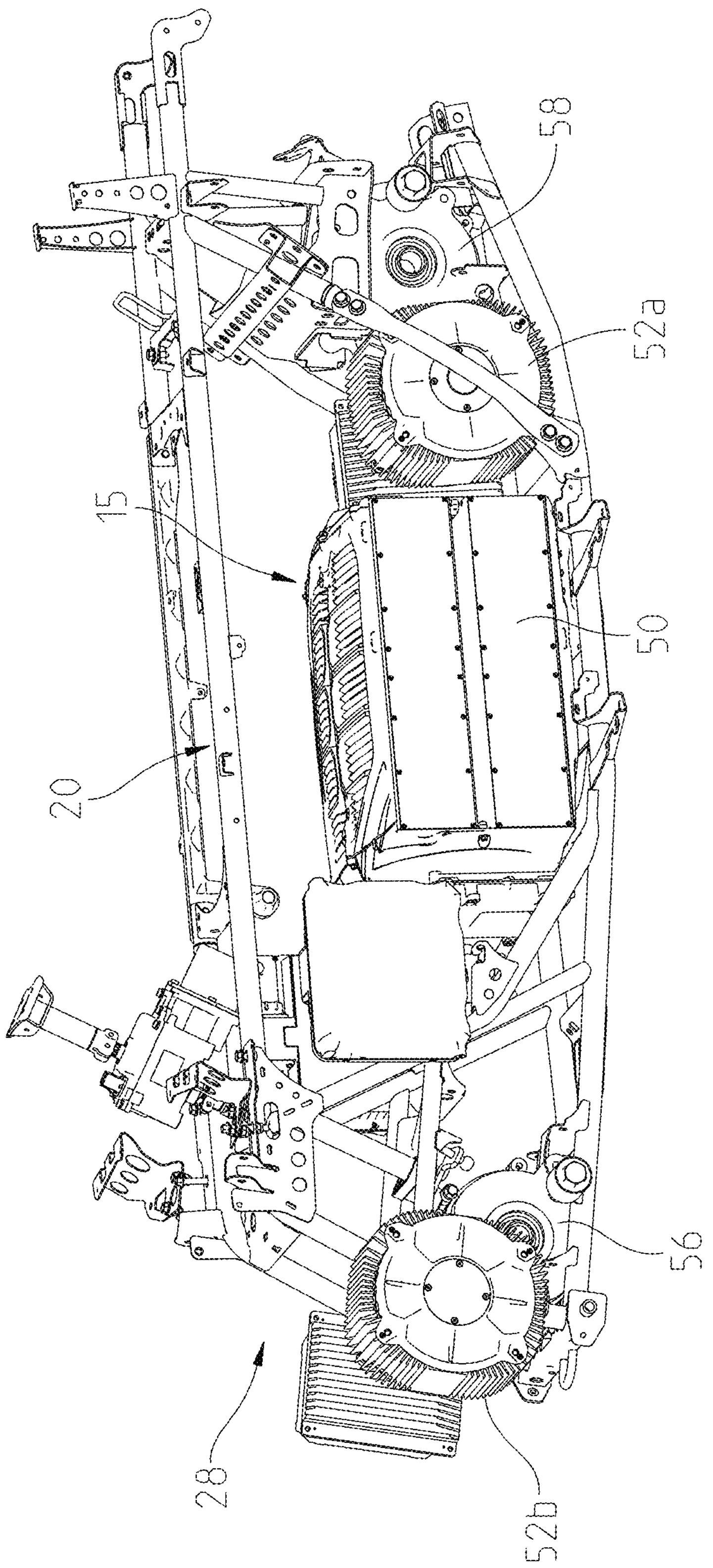
FIG. 9B is a left side view of an alternative configuration of the powertrain assembly of the utility vehicle of FIG. 1.

FIGS. 9A and 9B illustrate additional configurations of powertrain assembly 15 of vehicle 10 (FIG. 1). Specifically, as illustrated in FIG. 9A, powertrain assembly 15 comprises front motor 52*b* positioned forward of battery 50 and positioned rearward of front portion 28 of frame assembly 20. In this embodiment, a width of front motor 52*b* is aligned with a lateral width of vehicle 10. An output of front motor 52*b* relative to the front differential 56 (e.g., via prop shaft or another suitable connection means) is aligned along the longitudinal axis L (FIG. 1) of vehicle 10. As illustrated, front differential 56 may be positioned forward of front motor 52*b* in these embodiments.

FIG. 9B illustrates an additional configuration of powertrain assembly 15. Powertrain assembly 15 comprises front motor 52*b* positioned such that at least a portion of front motor 52*b* is forward of front portion 28 of frame assembly 20. In these embodiments, the width of front motor 52*b* may be aligned along longitudinal axis L (FIG. 1) of vehicle 10 (FIG. 1). The output of front motor 52*b* relative to front differential 56 is aligned along a lateral width of vehicle 10 (FIG. 1). As illustrated, front motor 52*b* is positioned at least partially aligned with front differential 56 along the lateral width of vehicle 10.

Figure 10:
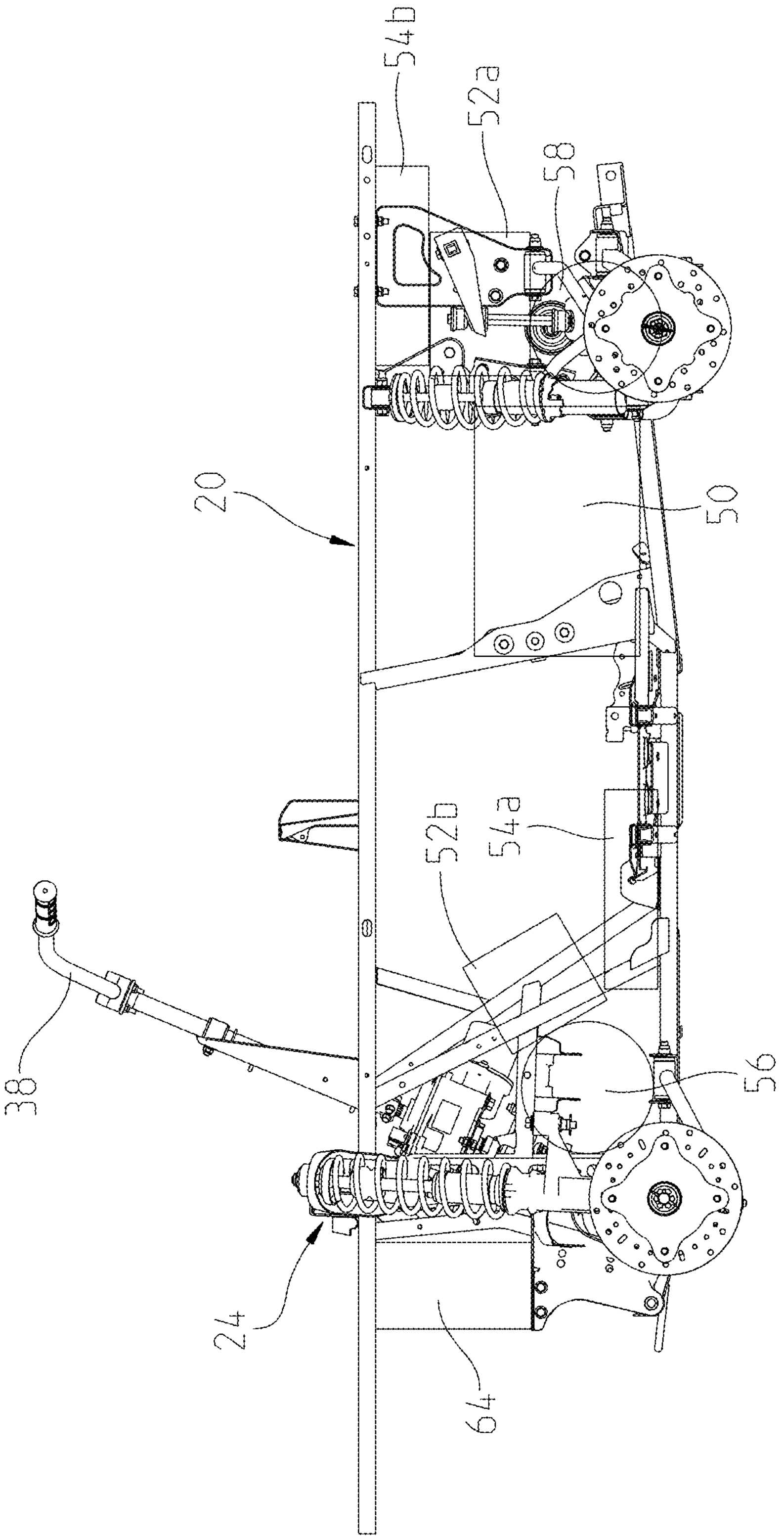
FIG. 10 is a left side view of another configuration of the powertrain assembly and the frame assembly of the utility vehicle of FIG. 1.

As previously mentioned with respect to FIG. 7, components of powertrain assembly 15 may be mounted vertically relative to each other. As illustrated in FIG. 10, in these embodiments, powertrain assembly 15 may include front motor 52*b*, rear motor 52*a*, a front inverter 54*a*, and a rear inverter 54*b*. Front motor 52*b* is positioned partially above and adjacent to front differential 56 while rear motor 52*a* is positioned generally above rear differential 58. Further, rear motor 52*a* may be mounted to or adjacent rear inverter 54*b*. In some embodiments, rear motor 52*a* and rear inverter 54*b* may be a one-piece assembly, further reducing space and parts required for vehicle 10.

Figure 56:
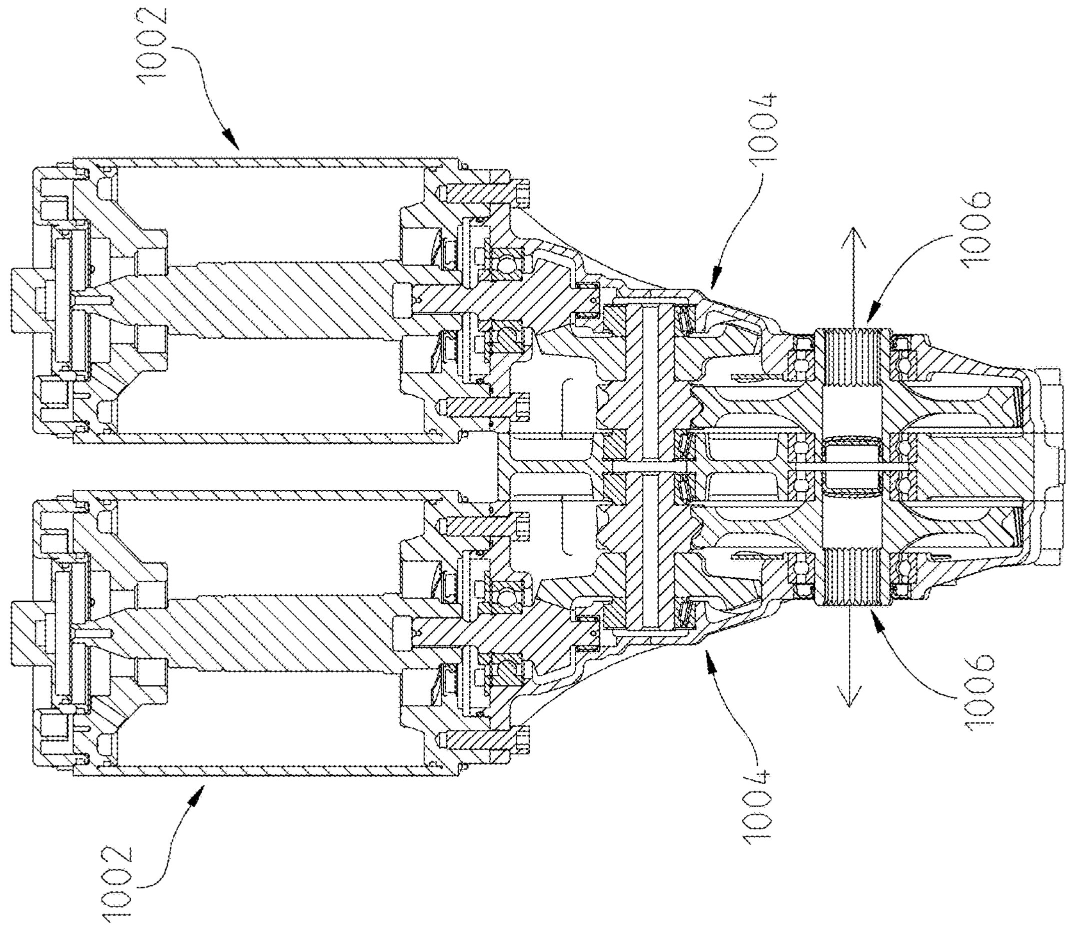
FIG. 56 illustrates a cross-sectional view of the compact transmission system of FIG. 53.

Referring to FIG. 10, as front motor 52*b* is positioned at least partially rearward of front differential 56 and generally rearward of steering 38, the region forward of front differential 56 and steering input 38 may be used for storage or placement of other components, such as for placement of a charger 64. In various embodiments, charger 64 is a 3 kW charger or a 6 kW charger. Charger 64 converts AC power received from an external plug-in source, such as a charging station, to DC power for charging battery(ies) 50. Charger 64 may receive the AC power from the external plug-in source through a charging port of vehicle 10, as will be described further with reference to FIG. 56. For example, FIG. 56 illustrates a charging port 410 configured to receive a plug attached to a cable that is coupled with the external plug-in source such as the charging station. The plug may engage with charging port 410 to charge battery 50 (FIG. 4) of utility vehicle 10. As illustrated, charging port 410 is arranged on a horizontal surface 412 positioned vertically below the left side handlebar of steering 36. In this way, charging port 410 is not positioned on a vertically extending panel of utility vehicle 10 and, therefore, the amount of debris and dirt that may accumulate near or in charging port 410, which may otherwise damage or reduce the efficiency of charging port 400, may be reduced and/or eliminated. Additionally, charging port 410 is positioned adjacent seat 36 and steering 38 which may provide an improved visual indication to an operator that a cable and plug is coupled with charging port 410 when approaching, mounting, or otherwise utility vehicle 10, compared to a charge port in a different location. This may provide the advantage of reducing attempted operation of vehicle 10 while plugged in. However, charging port 410 may have various other positions on utility vehicle 10, for example charging port 410 may be positioned on either side of seat 36 and/or steering 38 and on any body panel of vehicle 10. Additionally, the location of charging port 410, as shown in FIG. 56, and/or any other location on vehicle 10 may be used for other charging and/or power applications, such as powering an accessory.

Figure 11:
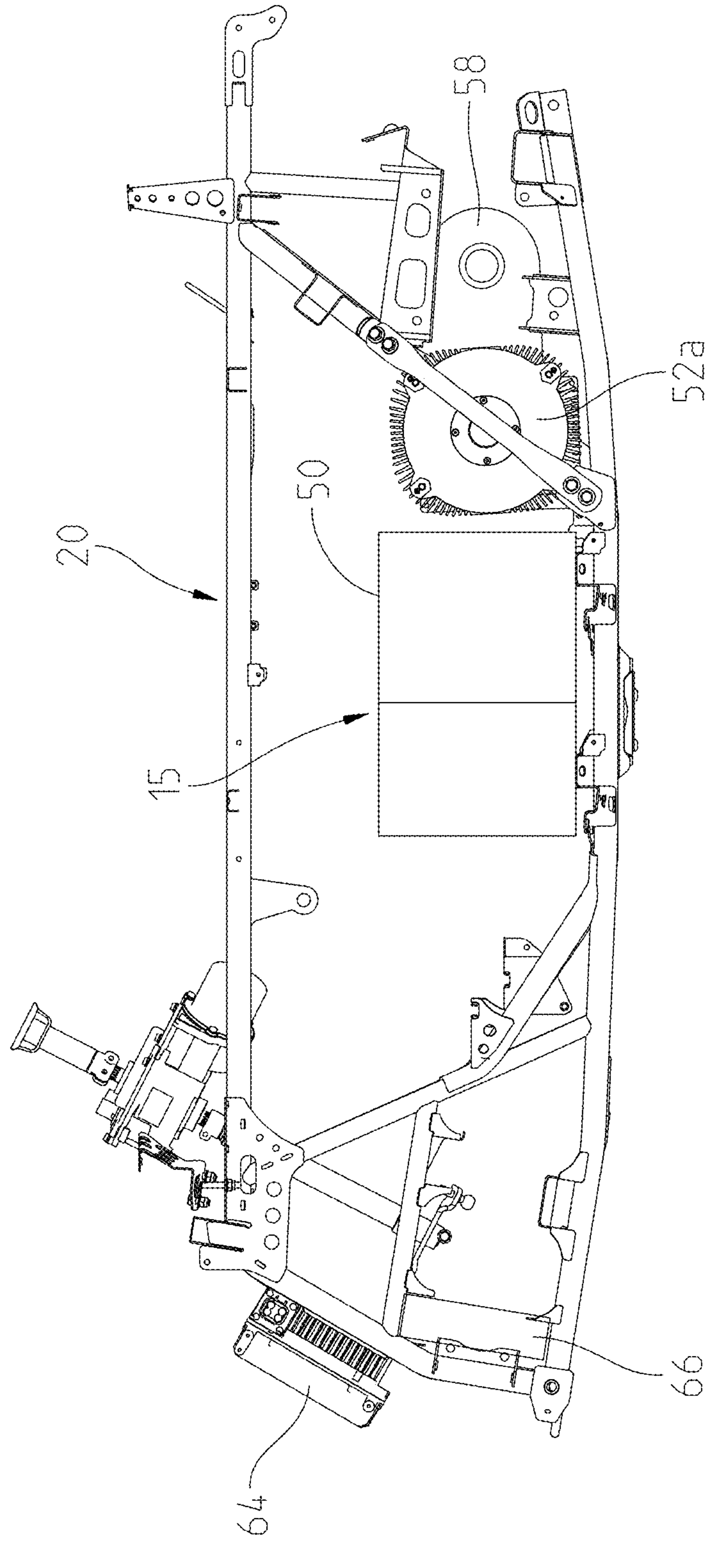
FIG. 11 is a left side view of a further configuration of the powertrain assembly and the frame assembly of the utility vehicle of FIG. 1.

An additional embodiment of a configuration of powertrain assembly 15 is illustrated in FIG. 11, illustrating flexibility in the configuration of powertrain assembly 15 as a result of eliminating the engine and prop shaft of a combustion-based powertrain that would otherwise extend longitudinally through vehicle 10. Rear motor 52*a* and rear differential 58 are supported at a rear portion of powertrain assembly 15. Similar to the illustrative embodiments of FIGS. 8A and 8B, wheel hubs 12*a* of front ground engaging members 12 have motors mounted thereon. As illustrated in FIG. 11, battery 50 may be positioned at front portion 28 and rearward of a radiator 66 supported at a front portion 28 of frame assembly 20. Further, charger 64 may be positioned forward of frame assembly 20. While charger 64 is illustrated positioned forward of steering 38 and front portion 28 of frame assembly 20, various other components may be positioned forward of steering 38 and frame assembly 20 such as radiator 66.

Figure 12A:
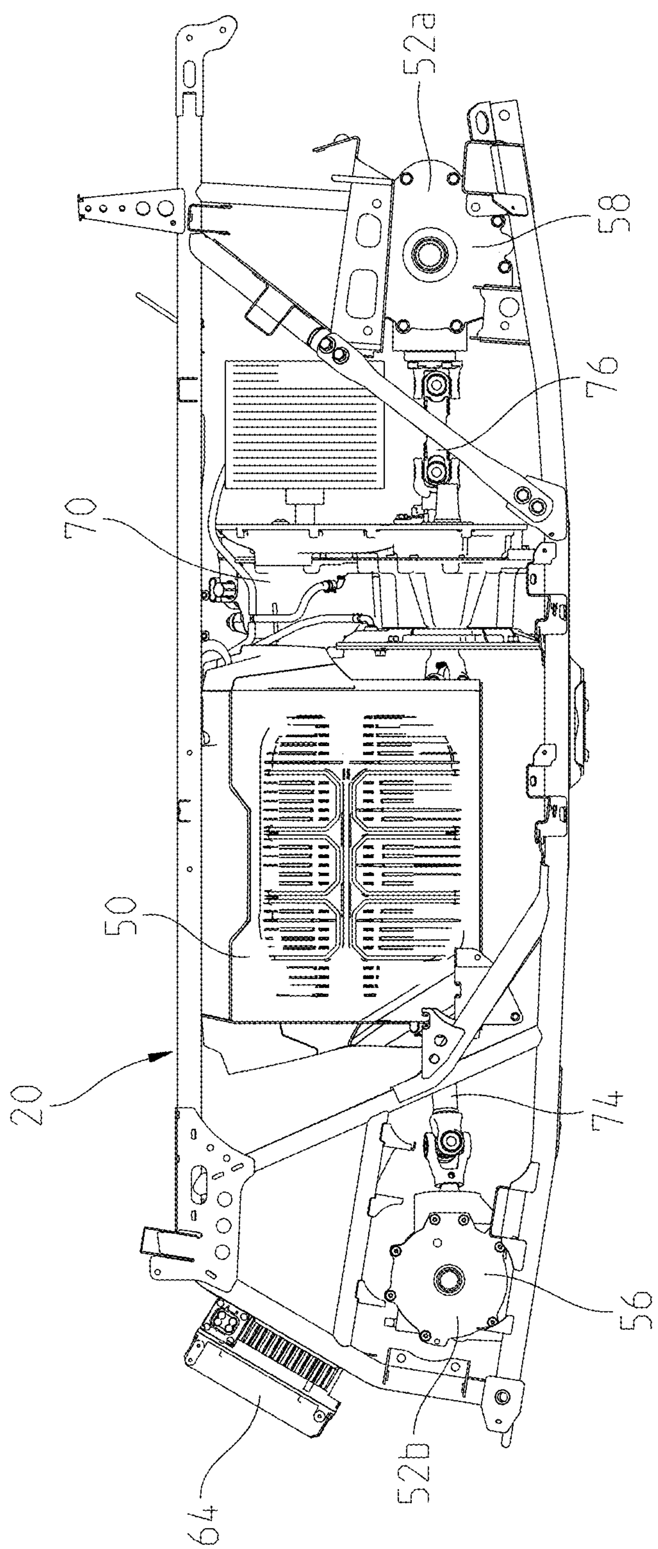
FIG. 12A is a left side view of yet another configuration of the powertrain assembly and the frame assembly of the utility vehicle of FIG. 1.

FIG. 12A discloses a further embodiment of powertrain assembly 15. Illustratively, powertrain assembly 15 of FIG. 12A includes a transmission or gearcase 70 operably coupled to rear motor 52*a* and further operably coupled to front differential 56 through a front prop shaft 74 and to rear differential 58 through a rear drive shaft 76. In this way, front motor 52*b* may be eliminated, however, in other embodiments, front motor 52*b* may be included in addition to gearcase 70 and/or in place of rear motor 52*a*. Battery 50 still provides the power for operating powertrain assembly 15 and motor 52*a* is configured to provide rotational power to gearcase 70 which then transmits rotational power to front and rear differentials 56, 58 through front and rear prop shafts 74, 76 for driving front and rear ground-engaging members 12, 14. In some operating modes, power may be provided to only one of front or rear differential 56, 58 such that vehicle 10 operates in a turf mode, one-wheel drive ("1WD") mode, two-wheel drive ("2WD") mode, or three-wheel drive ("3WD") mode rather than a four-wheel drive ("4WD") mode. In embodiments wherein only one motor 52 is included, the removal of front motor 52*b* may be beneficial for creating increased storage space within vehicle 10. If front motor 52*b* is omitted, the half shafts associated with front motor 52*b* could be omitted and vehicle 10 would operate in a two-wheel drive ("2WD") mode. As described with reference to rear differential 58, the gearing of gearcase 70 may vary to achieve the desired gear reduction ratio. For example, gears within gearcase 70 may include a planetary gear set or a helical gear set, as previously described with reference to FIG. 6. As illustrated in FIG. 12A, vehicle 10 comprises charger 64 positioned forward of steering input 38 centerline and supported by front portion 28 of frame assembly 20. Gearcase 70 is positioned at least partially forward of motor 52*b* and rearward of battery 50. The placement of gearcase 70 and front and rear prop shafts 74, 76 may be varied within vehicle 10. For example, motor 52*a* may be directly mounted to rear differential 58 and front prop shaft 74 (or rear prop shaft 76) may extend forward to front differential 56 from rear differential 58. In these examples, rear prop shaft 76 (or front prop shaft 74) may be omitted in instances when only one prop shaft is necessary. Further, in another example, motor 52*b* may be directly mounted to front differential 56 and front prop shaft 54 (or rear prop shaft 76) may extend rearward from front differential 56 to rear differential 58.

Figure 12B:
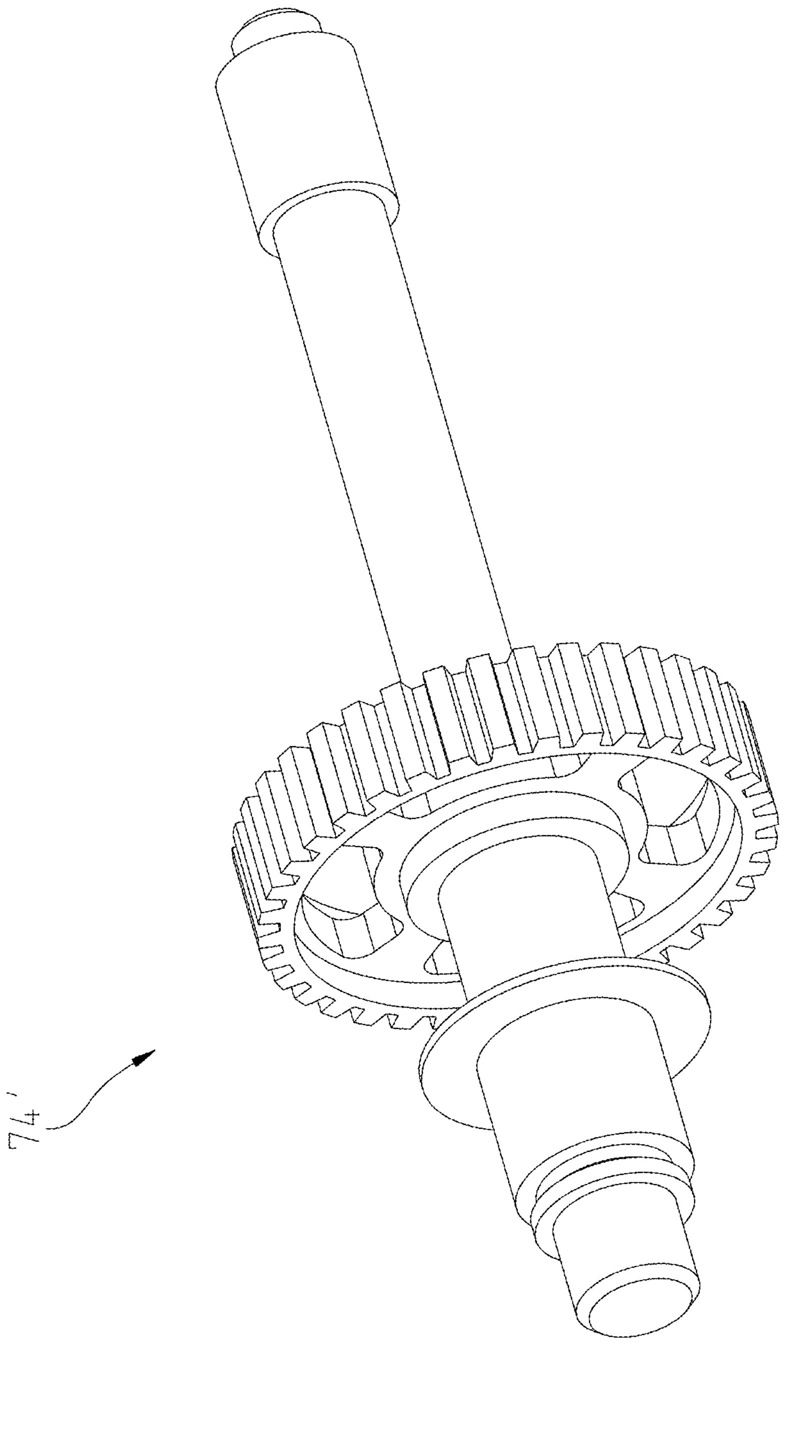
FIG. 12B is a perspective view of a prop shaft for use with various embodiments of the powertrain assembly of the utility of FIG. 1.

While front and rear prop shafts 74, 76 are illustrated generally as U-joint prop shafts, other variations of prop shafts 74, 76 and its associated connections or joints may be used. For example, FIG. 12B illustrates an embodiment of a crown spline prop shaft 74' that may be incorporated with powertrain assembly 15 of FIG. 12A and may be used in place of front prop shaft 74 or rear prop shaft 76. In various embodiments, the crown spline prop shaft 74' is used in embodiments wherein there is one motor 52*b* (or motor 52*a*) and crown spline prop shaft 74' is centrally mounted to connect motor 52*b* (or motor 52*a*) to rear differential 58 (or front differential 56). Further, other variations of a prop shaft may be used in combination with powertrain assembly 15 (FIG. 12A).

Front and rear differentials 56, 58 may be mechanical components or systems and are configured to be hydraulically, electronically, or otherwise controlled. In one embodiment, a control system/assembly 60 (FIG. 13) may be configured to control operation and parameters of powertrain assembly 15 and also may allow the operator to selectively adjust an operating mode of vehicle 10. Control system 60 may be used in combination with any of the previously described configurations and variations thereof of powertrain assembly 15. Control system 60 includes a powertrain controller 62. Controller 62 may be a vehicle control unit or may be configured for control of powertrain assembly 15 only. Controller 62 is operably coupled to various components of vehicle 10. For example, controller 62 is operably coupled to steering 38 to receive information about the steering angle of vehicle 10 (e.g., via position sensors of steering 38). Additionally, controller 62 is operably coupled to gauge 90 to receive inputs from the operator related to desired operational conditions (e.g., 1WD, 2WD, 3WD, 4WD, operating modes such as turf mode, regen braking, and active descent braking, security features of powertrain assembly 15, etc.). Controller 62 also is configured to transmit information to gauge 90 to provide powertrain or other information to the operator. Controller 62 is further operably coupled to throttle input 84 to receive the desired throttle from the operator. Controller 62 also is operably coupled to brake input 80 (e.g., hand and/or foot brakes), IMU input 108 (e.g. IMU may be integral with controller 62 or may be separate therefrom and electrically coupled thereto), and ground-engaging members 12, 14 via sensors to understand the desired braking input, braking bias, and position and speed of ground-engaging members 12, 14 to provide wheel speed, yaw, and other information to controller 62. With such inputs, controller 62 is configured to provide and receive information from motors 52, battery(ies) 50, front differential 56, and/or rear differential 58. Controller 62 is further operably coupled to various electronic accessories 98 which may include at least a charge status indicator light and/or a telematics control unit (TCU). For example, controller 62 may provide the charge status of battery(ies) 50 to charge status indicator lights which may then display a color or value or any other visual output for indicating the current charge level, and/or receive information from the charge status indicator lights. Charge status indicator lights may be incorporated with headlights or taillights of vehicle 10, a light bar positioned on vehicle 10, an external light display anywhere in or on vehicle 10, and/or a combination of the above. The vehicle 10 may thus inform the operator from within or outside vehicle 10 of the charge of battery 50. Further, controller 62 may be configured to transmit or receive information from the TCU to communicate information to and from vehicle 10 and a network. In this way, the operator can access information regarding the status of the vehicle 10 from a remote device through the network.

Figure 14:
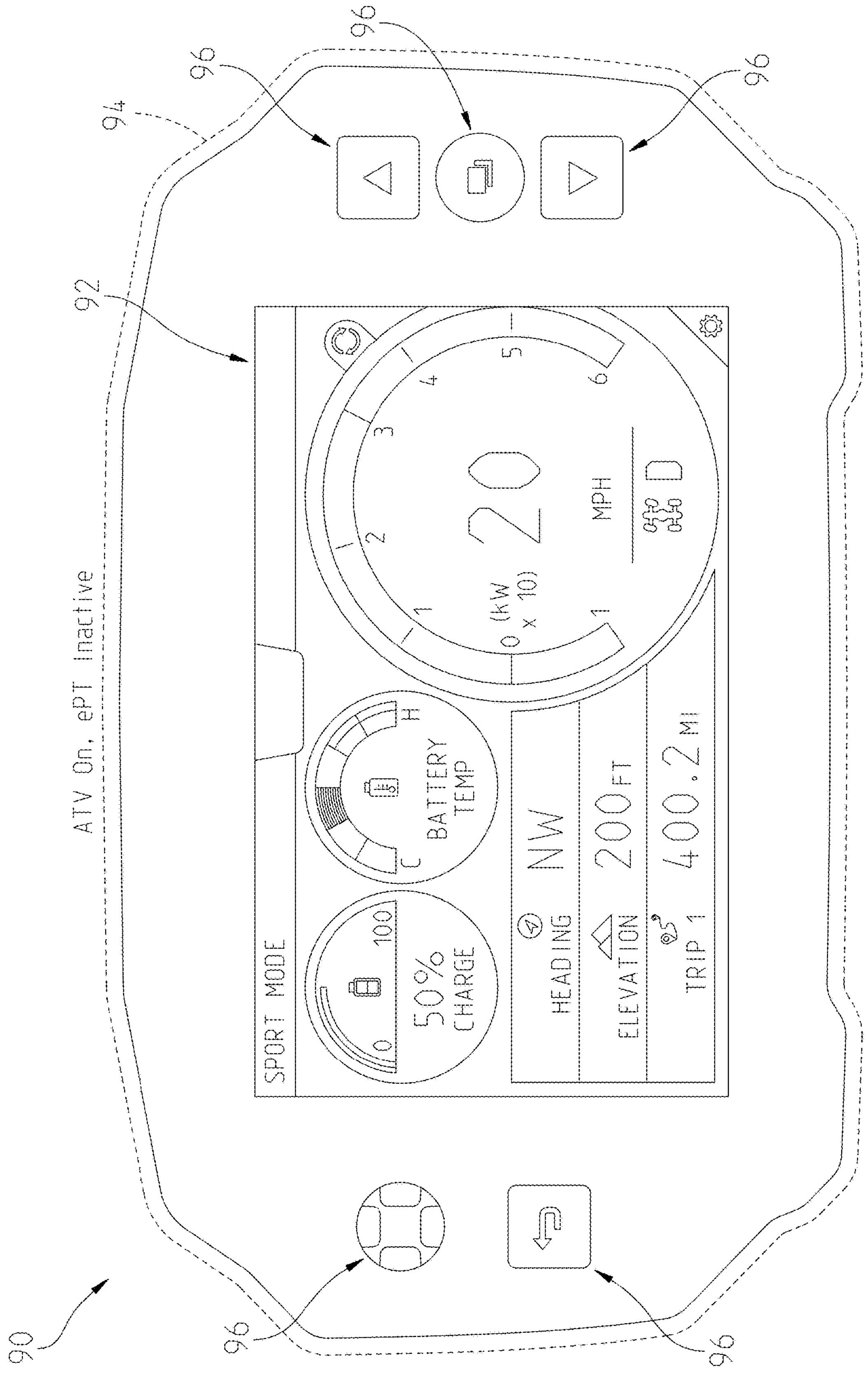
FIG. 14 illustrates an embodiment of a gauge of the utility vehicle of FIG. 1 electrically coupled to the control system of FIG. 13 and indicating a state in which the utility vehicle of FIG. 1 is on and the powertrain assembly is inactive.
Figure 15:
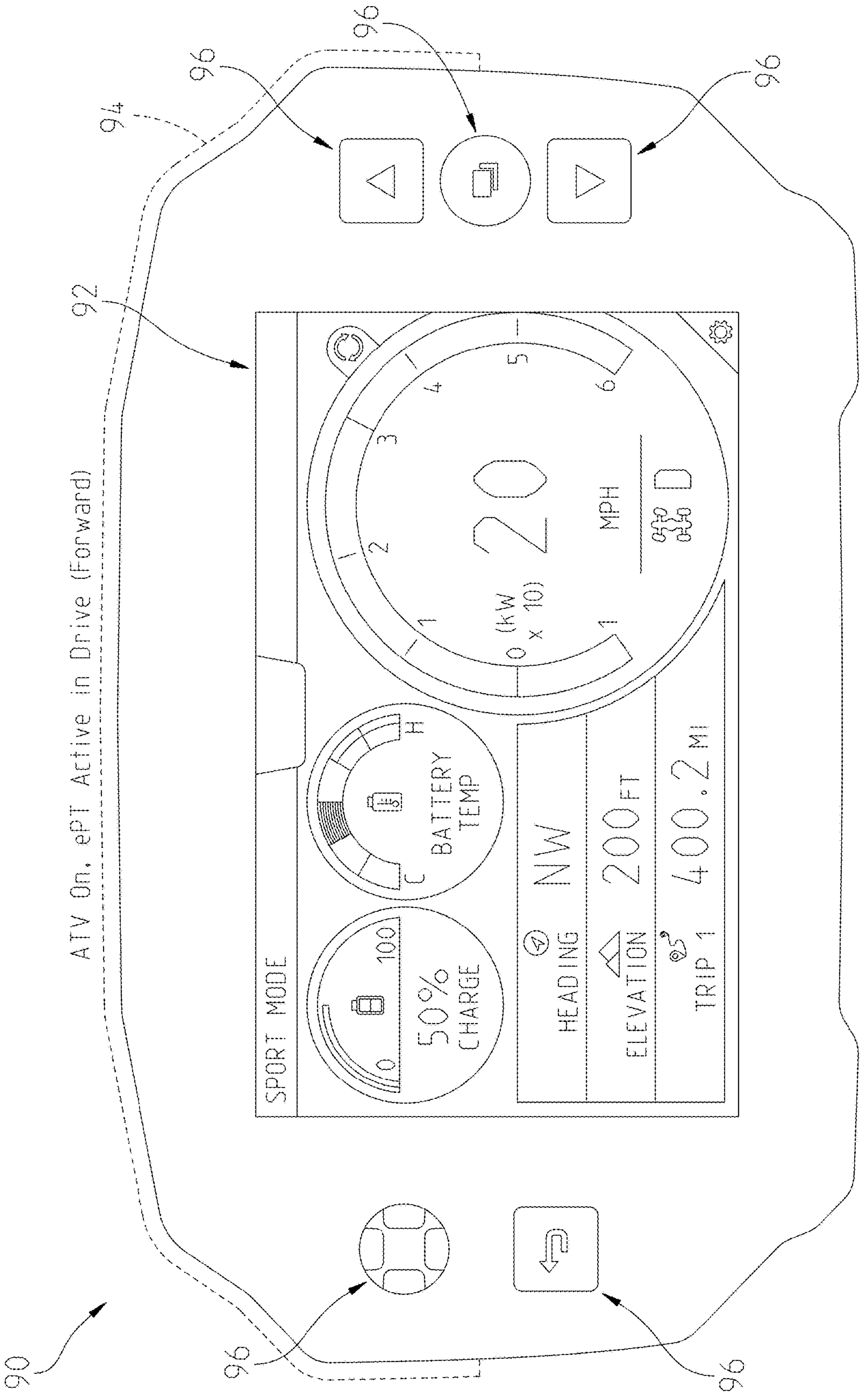
FIG. 15 illustrates an embodiment of the gauge of FIG. 14 indicating a state in which the utility vehicle of FIG. 1 is on and the powertrain assembly is active in a forward drive mode or gear.
Figure 16:
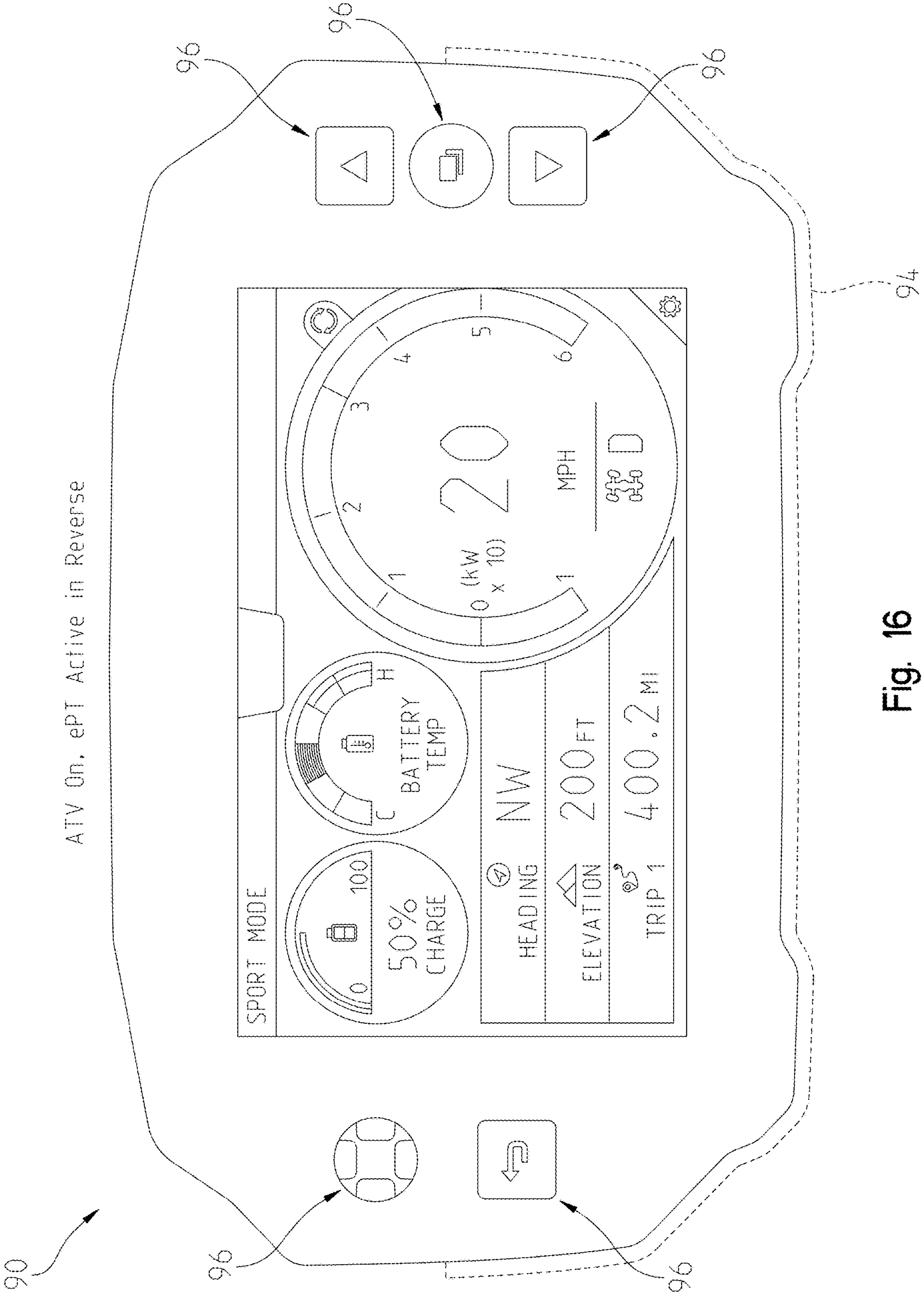
FIG. 16 illustrates an embodiment of the gauge of FIG. 14 indicating a state in which the utility vehicle of FIG. 1 is on and the powertrain assembly is active in a reverse drive mode or gear.

FIGS. 14-16 illustrate various display outputs on a display or screen 92 of gauge 90 for displaying information transmitted to operator. As illustrated in FIGS. 14-16, gauge 90 has an indicator 94, which may be a light source within a bezel of gauge 90, positioned around an outer perimeter of gauge 90 for indicating a status and mode of powertrain assembly 15 of vehicle 10. Indicator 94 may be active instantaneously with an activation from the operator so that the operator can quickly know what operating state vehicle 10 and powertrain 15 is in. As illustrated in FIG. 14, indicator 94 surrounds the entirety of an outer perimeter of gauge 90 which is meant to indicate an operating status of powertrain assembly 15 and vehicle 10, based on programming of gauge 90. In this illustrative embodiment, the status indicates that vehicle 10 is powered on but powertrain assembly 15 is inactive. Powertrain assembly 15 being inactive may be defined by rear and front motors 52*a*, 52*b*, being in neutral or off. In the embodiment of FIG. 14, indicator 94 may be characterized by a color such as black, dark red or gray to indicate the status. Although, any desired color or shade may be incorporated. Additionally, indicator 94 may pulse or flash to indicate a status to the operator.

In other embodiments, such as that illustrated in FIG. 15, indicator 94 may surround just an upper portion of the outer perimeter of gauge 90. This may indicate to the operator that vehicle 10 is powered on and powertrain assembly 15 is powered on and active in a drive mode or gear (e.g., vehicle 10 is configured for forward operation). Similar to the embodiment of FIG. 14, when displaying the power status, indicator 94 may be characterized by an associated color, such as blue, although any variety of colors may be used. For example, indicator 94 may pulse a blue light to indicate the status indicative of an active powertrain assembly.

Further, in the embodiment of FIG. 16, indicator 94 surrounds only a lower portion of the outer perimeter of gauge 90. In this example, this configuration of indicator 94 indicates that vehicle 10 is powered on and powertrain assembly 15 is on and operating in reverse. Similar to the embodiments of FIGS. 14 and 15, indicator 94 in this embodiment may be characterized by a color to further indicate the operational status of vehicle 10 and powertrain assembly 15. For example, this color may be red or orange, but any color may be configured for use. Additionally, indicator 94 may pulse red or orange and then fade to indicate the associated operational status.

As illustrated in FIGS. 14-16, gauge 90 indicates various other information of vehicle 10 through display 92. For example, display 92 may include information regarding battery 50, for example, the state of charge ("SOC") of battery 50. Battery 50 also may comprise a temperature sensor operably coupled to gauge 90 through controller 62. As illustrated in FIGS. 13-16, controller 62 may receive a brake input 80 and information from sensors associated with front and rear ground engaging members 12, 14 to monitor the speed at which vehicle 10 is traveling. This information may be transmitted to gauge 90 such that display 92 displays the speed of vehicle 10. Further, gauge 90 may receive information from controller 62 regarding the directionality of the motion of vehicle 10, the distance at which vehicle 10 has traveled, and the elevation at which vehicle 10 is traveling and/or has traveled. This information may be transmitted to controller 62 via position sensors of steering input 38 and/or ground engaging members 12, 14. For example, steering 38 may include position sensors that monitor the direction vehicle 10 is traveling relative to cardinal directions north, east, south or west for displaying to on gauge 90.

In some embodiments, gauge 90 includes operational keys or inputs 96 for viewing additional information on display 92. In this way, display 92 may not report all of the information regarding vehicle 10 at once, or at all, and can be altered and/or customized by user through operational keys 96. Operational keys 96 may include various directional keys such as an up, down, left and right arrow key, and a select key. Various other configurations may be used for operator to configure display 92 for reporting the desired outputs.

Figure 17:
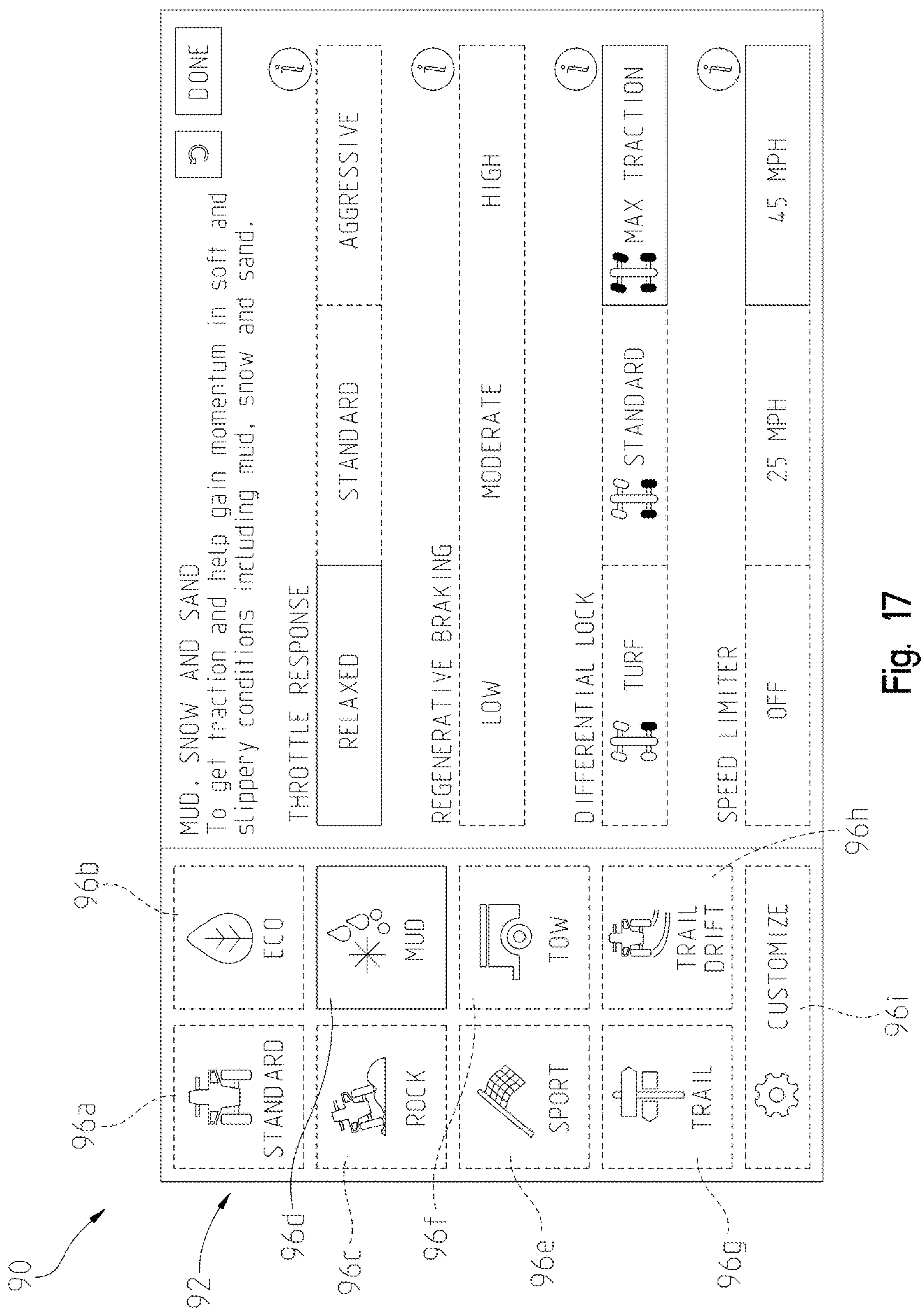
FIG. 17 illustrates an embodiment of the gauge of FIG. 14 indicating drive modes of the utility vehicle of FIG. 1.

Additionally, in some embodiments and as illustrated in FIG. 17, display 92 may be a touchscreen display such that the operator may provide an input to controller 62 through direct actuation onto display 92 of gauge 90. In this way, operational keys or inputs 96 may be actuators shown on display 92 and capable for touch screen actuation. The function of operational keys or inputs 96 will thus depend on which selection screen is shown on display 92. For example, FIG. 17 illustrates an example of a selection screen that may be shown on display 92 for choosing a drive mode setting and/or specific settings for various powertrain 15 components. Illustratively, on a left side of display 92, a variety of drive modes of vehicle 10 are available for selection. For example, a first operational key or input **96*a* indicates a "standard" drive or operating mode, a second operational key or input 96*b* indicates an "eco" drive or operating mode, a third operational key or input 96*c* indicates a "rock crawling" drive or operating mode, and a fourth operational key or input 96*d* indicates a "mud" drive or operating mode. Further, a fifth operational key or input 96*e* indicates a "sport" drive or operating mode, a sixth operational key or input 96*f* indicates a "tow" drive or operating mode, a seventh operation key or input 96*g* indicates a "trail" drive or operating mode and an eighth operational key or input 96*h* indicates a "trail drift" drive or operating mode. Various of these drive modes and associated settings will be described further herein with reference to FIGS. 26A-26**D.

With reference still to FIG. 17, once an operator actuates one of operational keys or inputs **96*a-d*, a ninth operational key or input 95*i* may be selected which is illustrated as a "customize" key. As illustrated on a right side of display 92, the various settings for powertrain 15 associated with the selected drive mode may then be shown to the operator. In some embodiments, the operator may customize the various settings of powertrain 15 through use of operational keys or inputs 96. The above-described configuration of display 92 allows for the operator to interact with gauge 90 efficiently to provide inputs to controller 62 (FIG. 13) regarding the desired operation of powertrain 15, and thus vehicle 10. Display 92 may be used to specify various other settings as well, for example the function of lights, outlets, various electronics, and/or various accessories of vehicle 10, and the selection screen of FIG. 17** is presented only for example.

Figure 13:
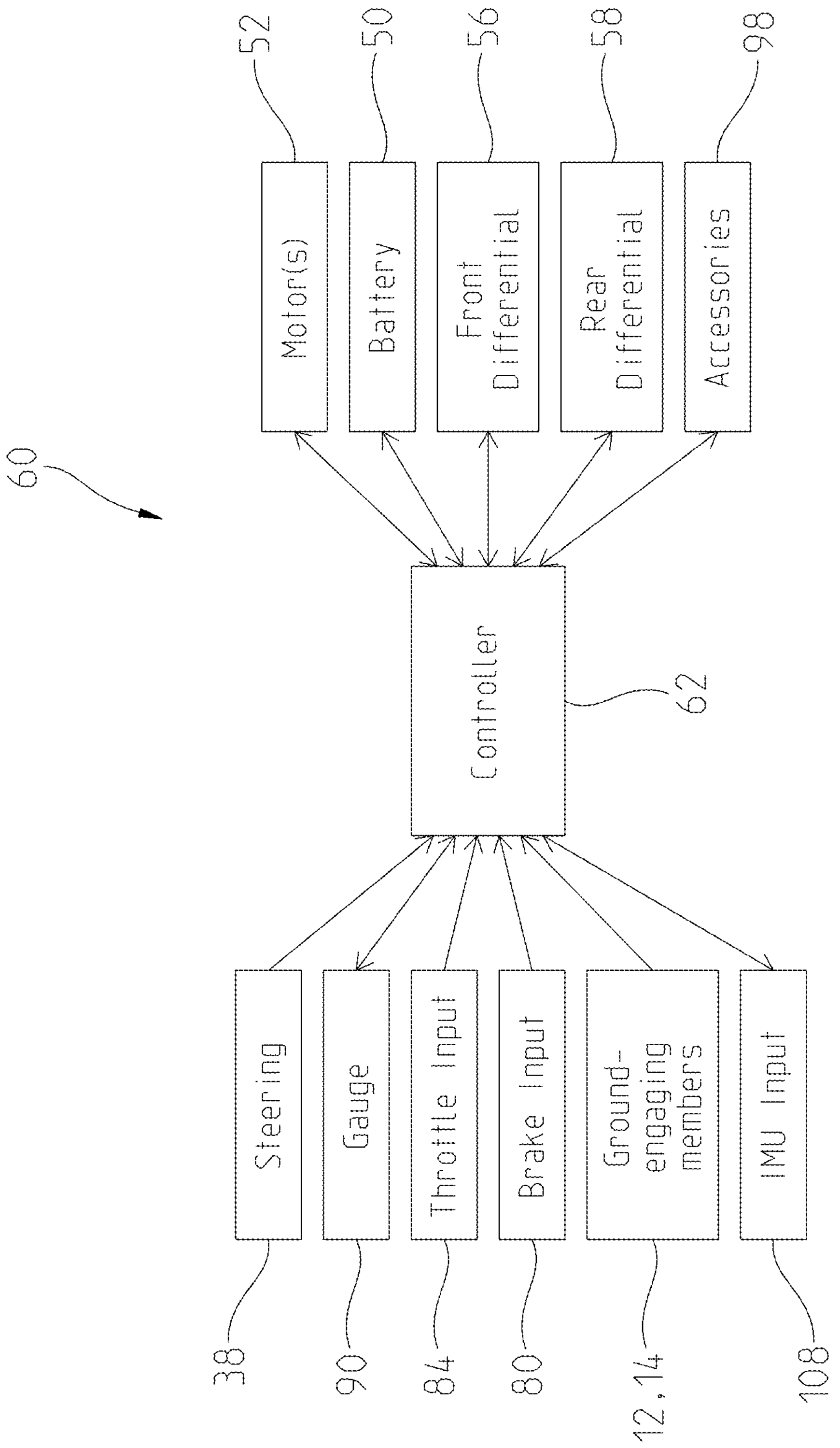
FIG. 13 is a schematic of a control system of the utility vehicle of FIG. 1.
Figure 18:
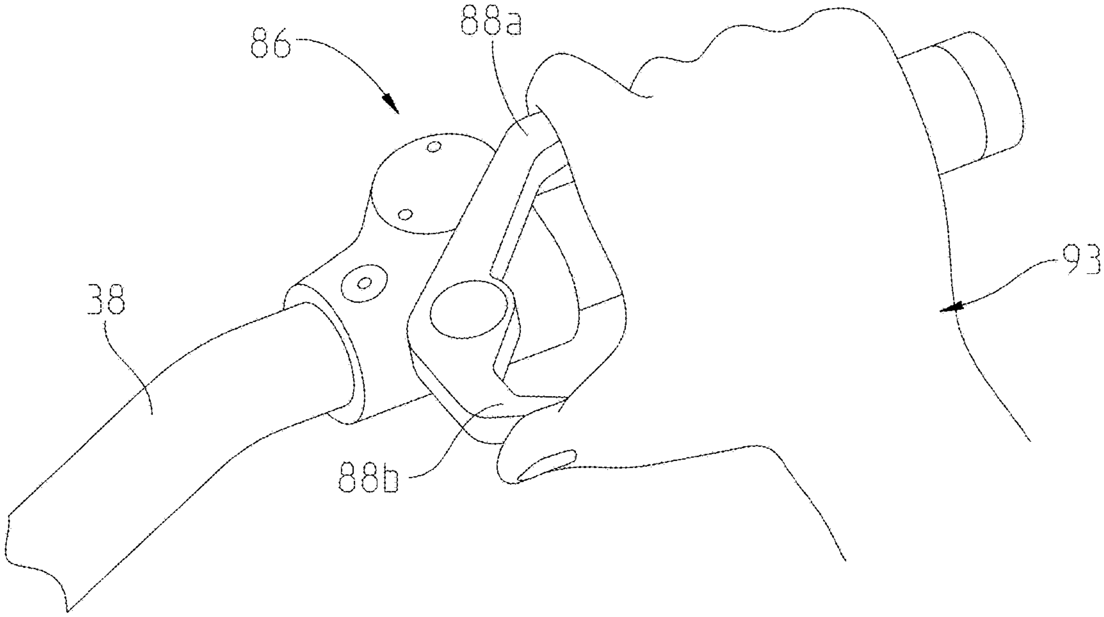
FIG. 18 is a schematic view of a portion of a steering assembly, illustratively a handlebar, with a throttle actuator operably coupled to the powertrain assembly of the utility vehicle of FIG. 1.

As previously described with reference to FIG. 13, controller 62 may receive throttle input 84 to use when communicating with motor(s) 52, battery 50, front differential 56, and rear differential 58. FIG. 18 illustrates a configuration of receiving throttle or accelerator input 84 (FIG. 13) for transmitting a desired throttle to various components of powertrain assembly 15 through at least controller 62. This allows for controlling the throttle through one hand of the operator and in various embodiments, just the thumb of the operator's hand, thereby largely increasing the ease of which operator can operate vehicle 10.

FIG. 18 illustrates a throttle or accelerator actuator 86 positioned on steering 38, more specifically a handlebar of steering 38. FIG. 18 further illustrates an operator 93 who may actuate throttle actuator 86 to alter the requested torque and/or the operating modes through pushing throttle actuator 86 upwards or downwards using one or both of a first actuator portion **88*a* or a second actuator portion 88*b*. For example, actuation of first actuator portion 88*a* downwards may cause vehicle 10 to slow from operation in a forward direction into a stopped state. Once vehicle 10 has stopped, further actuation of first actuator portion 88*a* downwards may cause vehicle 10 to operate in a reverse direction. Actuation of second actuator portion 88*b* upwards may cause vehicle 10 to operate in a forward direction. Throttle actuator 86 may also be configured for use with only one actuator portion. For example, throttle actuator 86 may only have first actuator portion 88*a* for controlling movement in one direction, for example the forward direction. In these instances, at least one actuator may be incorporated that is separate from throttle actuator 86 for selecting operation in other directions, such the reverse direction. Further variations of the configurations and functions of one or both of first actuator portion 88*a* and second actuator portion 88*b*** are possible.

Figure 19:
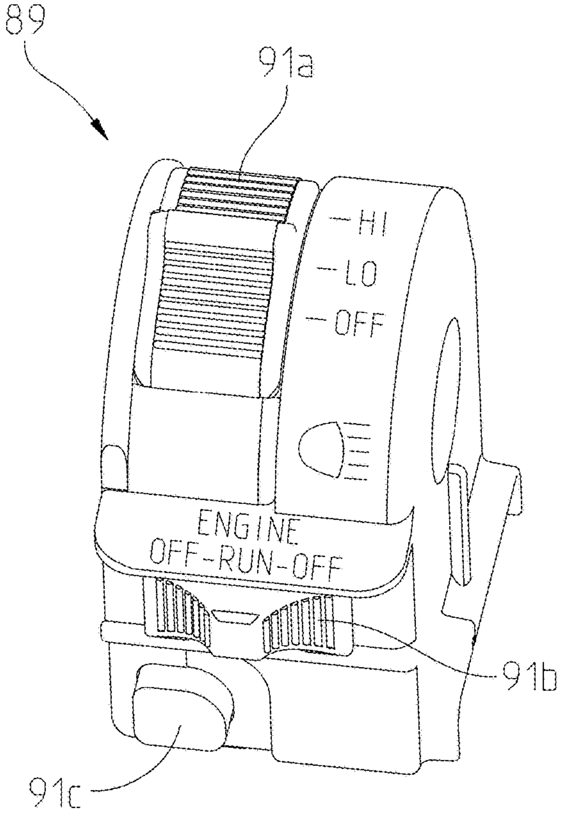
FIG. 19 is a perspective view of an embodiment of a direction controller of the utility vehicle of FIG. 1 which may be supported on a portion of the steering assembly.
Figure 20:
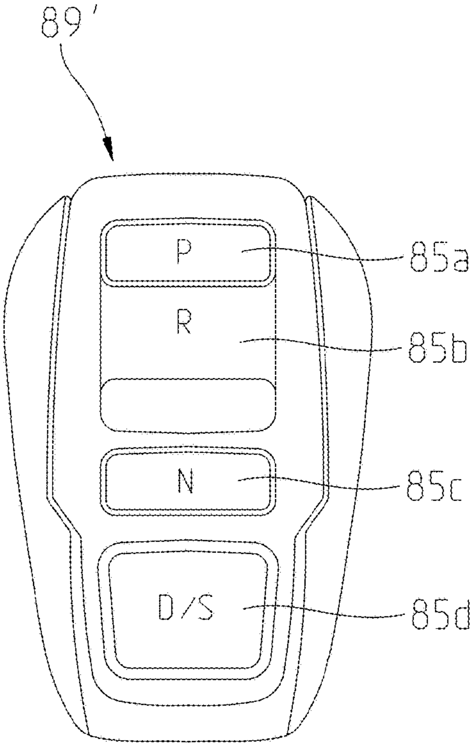
FIG. 20 is a rear view of another embodiment of the direction controller of the utility vehicle of FIG. 1 which may be supported on a portion of the steering assembly or the utility vehicle.

FIGS. 19 and 20 illustrate various embodiments of a direction controller 89, 89', respectively, for controlling operation in either a forward or reverse direction. As illustrated in FIG. 19, direction controller 89 may include a first actuator portion **91*a* and a second actuator portion 91*b*. In this embodiment, first actuator portion 91*a* may be used for controlling a headlight assembly or other component or accessory of vehicle 10. Second actuator portion 91*b* may be used for controlling the power from motor 52 (FIG. 2). As illustrated, actuation of second actuator portion 91*b* to the rightmost position puts motor 52 in an "off" mode. In these embodiments, the "off mode" is defined as when vehicle 10 is powered off. Actuation to a center position causes the motor 52 to be in a "run" mode, meaning powered on. In various embodiments, a "run" mode may be defined as a forward drive operational state of motor 52. Second actuator 91*b* can be actuated further to an additional "off" position such that motor 52 is no longer operating. In various embodiments, the positioning of first and second actuator portions 91*a*, 91*b* and their associated operating modes or controls may be altered. For example, second actuator portion 91*b* could transition from an "off" mode to a "run" mode in the forward direction when actuated to the right or left, and to a "run" mode in the reverse direction when actuated to the right or left. Further, first actuator portion 91*a* may control various other elements of vehicle 10. Additionally, and with reference still to FIG. 19, direction controller 89 may comprise a third actuator portion 91*c* in the form of an input configurated for speedo/reverse override. The third actuator portion 91*c* may also be configured to alter the direction of travel through a programed actuation. For example, third actuator portion 91***c* may be pushed a single time and allow for the forward drive mode to be set. Third actuator portion 91*c* may be held down for a certain amount of time, or pushed more than once, to cause a reverse drive mode. Other examples of the actuation are possible and are not limited by the actuation options described herein. FIG. 20 illustrates an additional embodiment of a direction controller 89' having a first actuation portion (illustratively, a push button 85*a*), a second actuation portion (illustratively, a second push button 85*b*), a third actuation portion (illustratively, a third push button 85*c*), and a fourth actuation portion (illustratively, a fourth push button 85*d*). In this embodiment, actuation of first push button 85*a* by operator 93 may place vehicle 10 in Park. Actuation of second push button 85*b* triggers powertrain assembly 15 to operate vehicle 10 in a reverse direction while actuation of third push button 85*c* triggers powertrain assembly 15 to operate vehicle 10 in a forward direction. Further, actuation of fourth push button 85*d* puts powertrain assembly 15 in Neutral. The functions of the various push buttons 85 of direction controller 89" may vary and are not mean to be limited to the above described functions.

Figure 21:
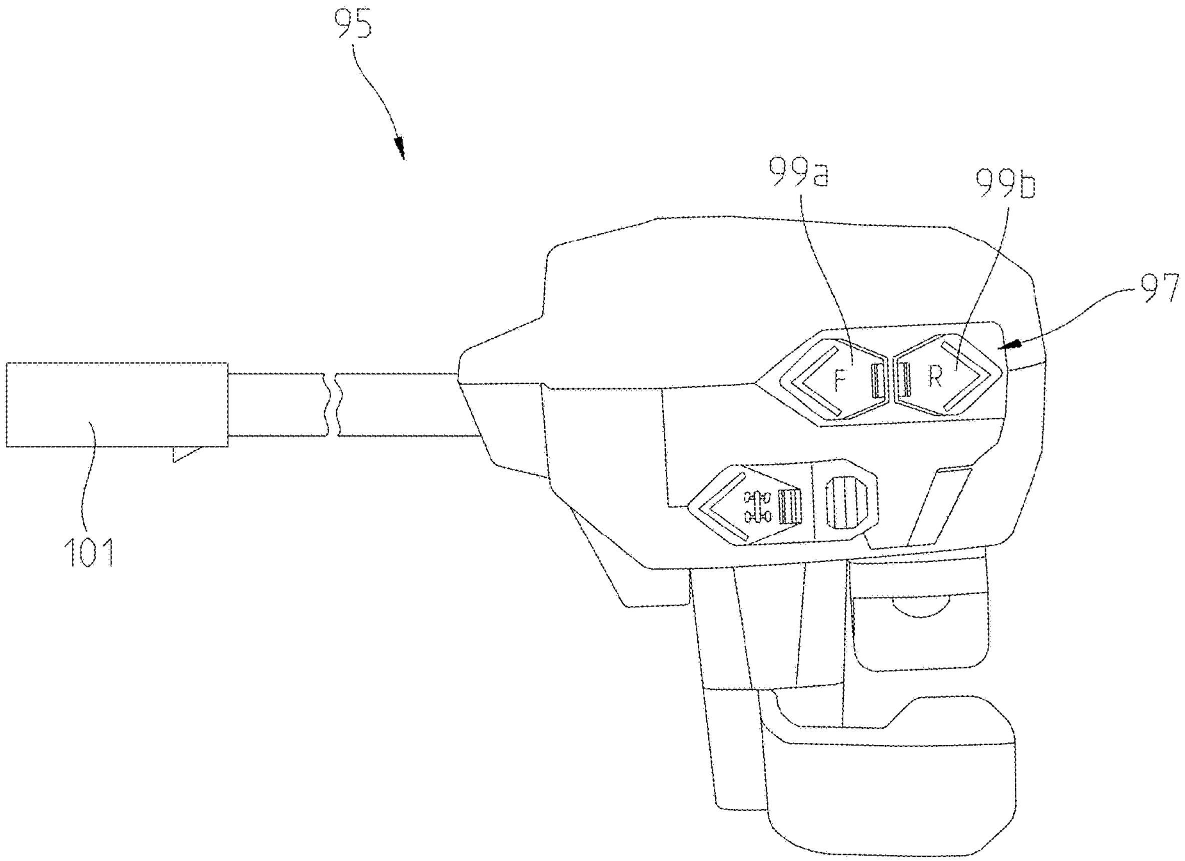
FIG. 21 is a schematic view of another embodiment of the direction controller of the utility vehicle of FIG. 1 which may be supported on a portion of the utility vehicle.

FIG. 21 illustrates an additional embodiment of a direction controller 95 having an actuator 97 disposed thereon. As illustrated, actuator 97 may include a first input, illustrative a switch 99*a*, and a second input, illustratively a switch 99*b*, for placing vehicle 10 into various drive states. For example, first switch 99*a* may be actuated for placing vehicle 10 in either the forward direction and/or in Park. Second switch 99*b* may be actuated for placing vehicle 10 in either the reverse direction and/or in Neutral. Further, in these embodiments, first and second switches 99*a*, 99*b* may act as momentary switches. In other words, actuation of first and second switches 99*a*, 99*b* is momentary such that after release of first and second switches 99*a*, 99*b* by the operator, first and second switches 99*a*, 99*b* return to the original positioning. For example, to place vehicle 10 in the forward direction during operation, the operator may push down on first switch 99*a* once and after release, first switch 99*a* may return to the original positioning. After the actuation, powertrain 15 is placed into operation into the forward direction and operation remains in the forward direction until a separate actuation by the operator. The various actuations will be described further herein.

The singular actuation of first switch 99*a* may place powertrain 15 into the forward direction, and more specifically into a “high” mode of forward operation. In other embodiments, any variation of forward direction drive modes may be incorporated and actuated through direction controller 95. To place vehicle 10 into Park, first switch 99*a* may be held down until powertrain 15 places vehicle 10 into Park. Further, second switch 99*b* may be actuated or pressed once in order to place powertrain 15 into operation in the reverse direction. The operator may also hold down second switch 99*b* to place vehicle 10 into Neutral. The throttle input from actuator 97 may be transmitted to controller 62 (FIG. 13) to cause the desired output of vehicle 10. In this way, actuator 97 may provide for a quick and easily actuatable method for altering the drive mode of vehicle 10. As illustrated, direction actuator 95 may also include a connector assembly 101 for electrically coupling direction actuator 95 with one of the handlebars of steering 38. While described as being positioned on either one of the handlebars, direction actuator 95 may be positioned on any variety of locations of vehicle 10, for example adjacent gauge 90 (FIG. 14) or anywhere in operator area 34 (for example, the dashboard).

While the foregoing is described largely with reference to throttle actuator 86 of FIG. 18, the descriptions may be applied to direction controllers 89, 89', 95 of FIGS. 19-21, as well. Positioning of throttle actuator 86 on vehicle 10 is not limited to the handlebar of steering input 38, as described above. For example, throttle actuator 86 may be positioned anywhere within operating area 34 (e.g., on a body panel (e.g., the dashboard) of vehicle 10 or any other position that is accessible to the operator while operating vehicle 10 from seat 36).

Figure 60:
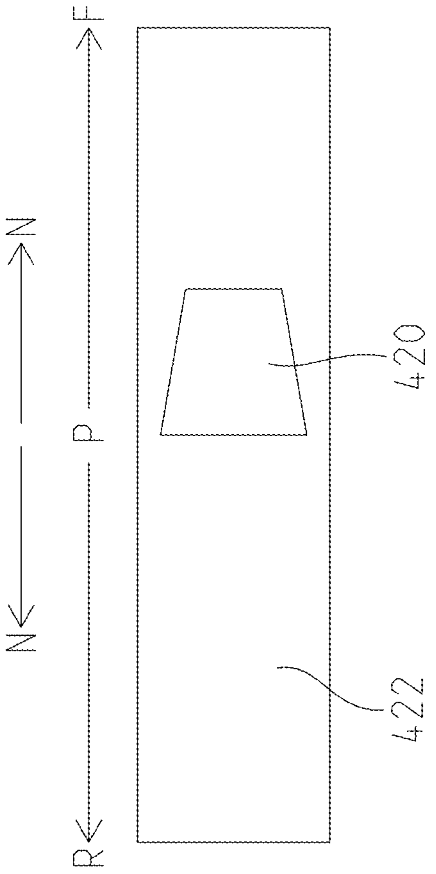
FIG. 60 illustrates a schematic of a gear selector for use with the exemplary electric vehicle of FIG. 59.

Further, with reference to FIG. 60, in addition to throttle input 86 (FIG. 13), controller 62 (FIG. 13) may receive input from an input selector, illustratively a gear selector 400. However, input selector may receive any variation of inputs, for example, inputs regarding lights and accessories of vehicle 10. In the illustrative embodiment, gear selector 400 may have a first input 402*a*, a second input 402*b*, and a third input 402*c*. In one embodiment, actuation of first input 402*a* may allow powertrain assembly 15 (FIG. 2) to operate vehicle 10 in a forward direction. Second input 402*b* may allow powertrain assembly 15 to operate vehicle 10 in the reverse direction, and actuation of third input 402*c* may place vehicle 10 in park. Gear selector 400 also may allow the operator to select a neutral position. In various other embodiments, inputs 402 may actuate various other operations for vehicle 10. For example, in some embodiments, one of inputs 402 may be a reverse override actuation. In other words, actuation of one of inputs 402 may allow powertrain assembly 15 to only operate in reverse if operating below or at a pre-determined threshold speed, e.g., at or below zero miles per hour, at or below one mile per hour, at or below five miles per hour, or the like. While illustrated as having three inputs 402, there may be any number of inputs 402 incorporated into gear selector 400.

As illustrated in FIG. 60, gear selector 400 is illustrated in four different positions. While illustrated in each position, in embodiments, vehicle 10 may only include one gear selector 400, and the additional gear selectors within this illustrative embodiment are only meant to show the varying positions for gear selector 400. However, the various locations shown may allow for multiple gear selectors or other inputs to be provided on vehicle 10 to accommodate user selection of gears, accessories, vehicle information, communications and messages, operating modes, etc. For example, in one embodiment, gear selector 400 may be positioned on the right side handlebar at position 400*a* and directly adjacent throttle actuator 86. Position 400*a* may be advantageous in that an operator is required to remove actuation from throttle actuator 86 to actuate gear selector 400 as both throttle actuator 86 and gear selector 400*a* will be actuated by the same hand on the right side handlebar. Alternatively, in a further embodiment, gear selector 400 may be positioned at position 400*b* on a left side handlebar of steering 38. Among other advantages, position 400*b* may be especially beneficial when it is desired for throttle actuator 86 to be actuated at the same time or nearly the same time (e.g., less than two seconds, or less than one second) as one of inputs 402 of gear selector 400. For example, this may be desired when operating vehicle 10 with a snowplow where transitions from forward direction to reverse direction may be facilitated or more easily controlled having a gear selector on a first hand grip and a throttle on a second, different handgrip. In other embodiments, gear selector 400 may not be positioned on steering 38, but instead may be positioned on a body panel of vehicle 10. For example, gear selector 400 is illustrated at position 400*c* to the one side of seat 36 on a body panel 404 that may typically incorporate a shift lever 406 (e.g., compared to a vehicle, such as an internal combustion engine ATV, having a manually operated shift level). Further, gear selector 400 may also be positioned longitudinally forward of seat 36. For example, as illustrated, gear selector 400 is at position 400*d* which is directly longitudinally forward of seat 36 and longitudinally rearward of display 90 of vehicle 10. Among other advantages, position 400*d* may provide the advantage of being easily accessed by the operator during operation of vehicle 10 and/or a visual indication of the selected gear may be more clearly visible to the operator compared to a gear selector in other positions. While FIG. 60 illustrates four exemplary arrangements of gear selector 400, various other positions of gear selector 400 and/or any other input device may be incorporated.

As previously described, control system 60 (FIG. 13) is configured to adjust various parameters of powertrain assembly 15 and at least partially control operation of vehicle 10. While the methods of FIGS. 20-23 will be described largely with reference to vehicle 10 and powertrain assembly 15 of FIGS. 2-7, it is also within the scope for methods of FIGS. 22-25 to be modified and used with other embodiments of vehicle 10 and powertrain assembly 15, such as those described in FIGS. 8A-12B.

Figure 22:
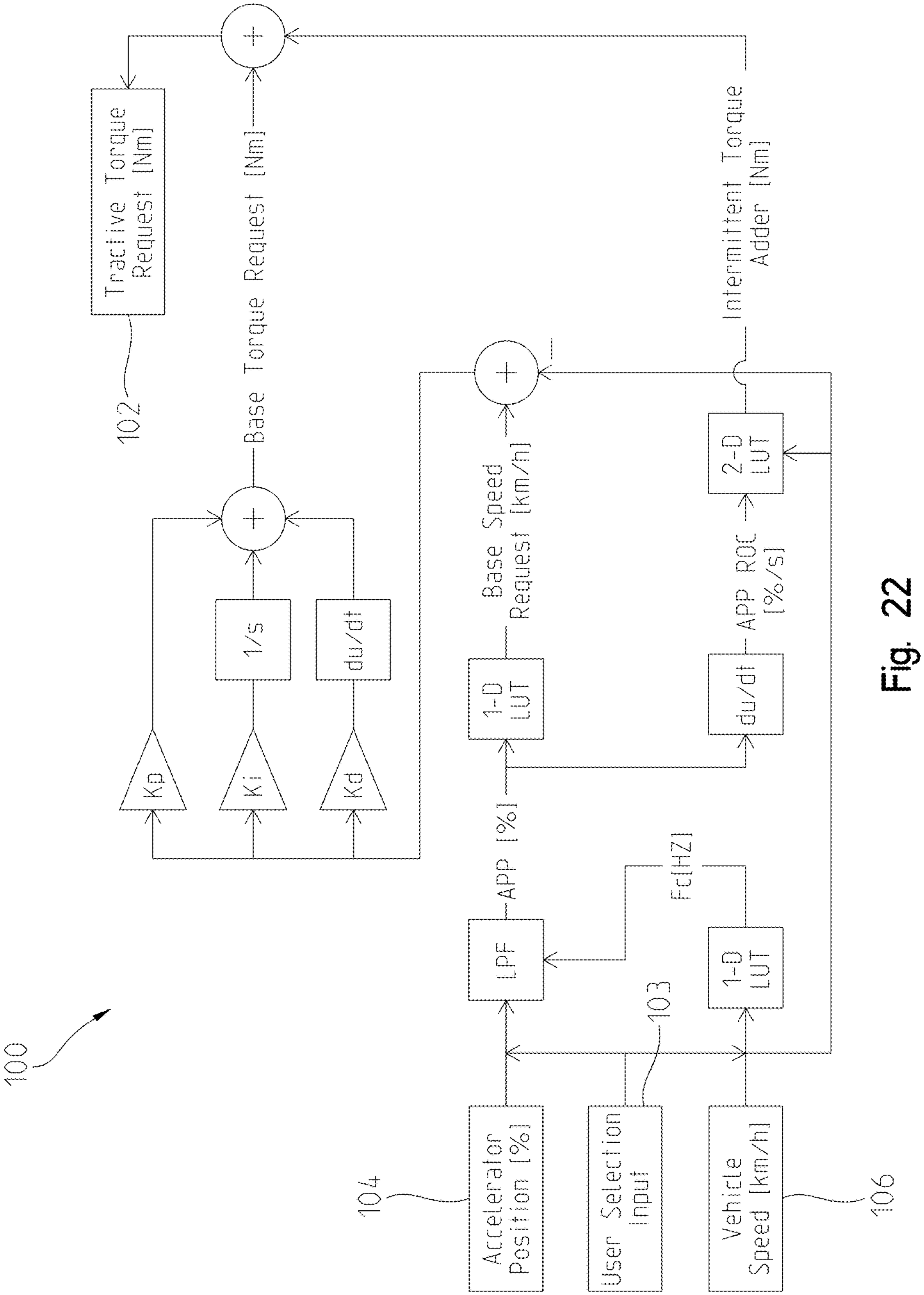
FIG. 22 is a logic diagram for acceleration control at the steering of the vehicle of FIG. 1.

FIG. 22 illustrates a method 100 for determining a tractive torque request 102 through actuation of throttle input 84 requested by the operator. Method 100 allows for one-pedal driving in that the throttle or accelerator input 84 can provide for a positive or negative torque request contributing to tractive torque request 102. As illustrated in FIG. 22, a user selection input 103 is inputted which may have options of either being "ON" or "OFF", indicating if the operator wants to operate using method 100 for one-pedal driving. If "ON" is selected, an accelerator position 104 and a vehicle speed 106 are transmitted to controller 62 via at least throttle input 84 (e.g., an accelerator pedal or accelerator actuator 86) and wheel speed and direction based on motor speed feedback from invertor 54. Controller 62 may process accelerator position input 104 through a low pass filter. Controller 62 may further process accelerator position 104 to determine a base speed request. Controller 62 and/or other controllers associated with control system 60 may be a proportional integral derivative ("PID") controller to provide a base torque request.

In various embodiments, before being processed through the PID controller, accelerator position 104 also is used to derive the accelerator position rate of change. This accelerator position rate of change undergoes processing along with inputted vehicle speed 106. The output from this processing may provide an intermittent torque adder to account for the rate of change of the accelerator position 104. The intermittent torque adder is summed with the base torque request to provide a final output of tractive torque request 102. With additional reference to FIG. 13, tractive torque request 102 may then be transmitted to components of powertrain assembly 15 for outputting the desired torque at ground-engaging members 12, 14 and/or adjusting other parameters configured for operation of vehicle 10.

Figure 23:
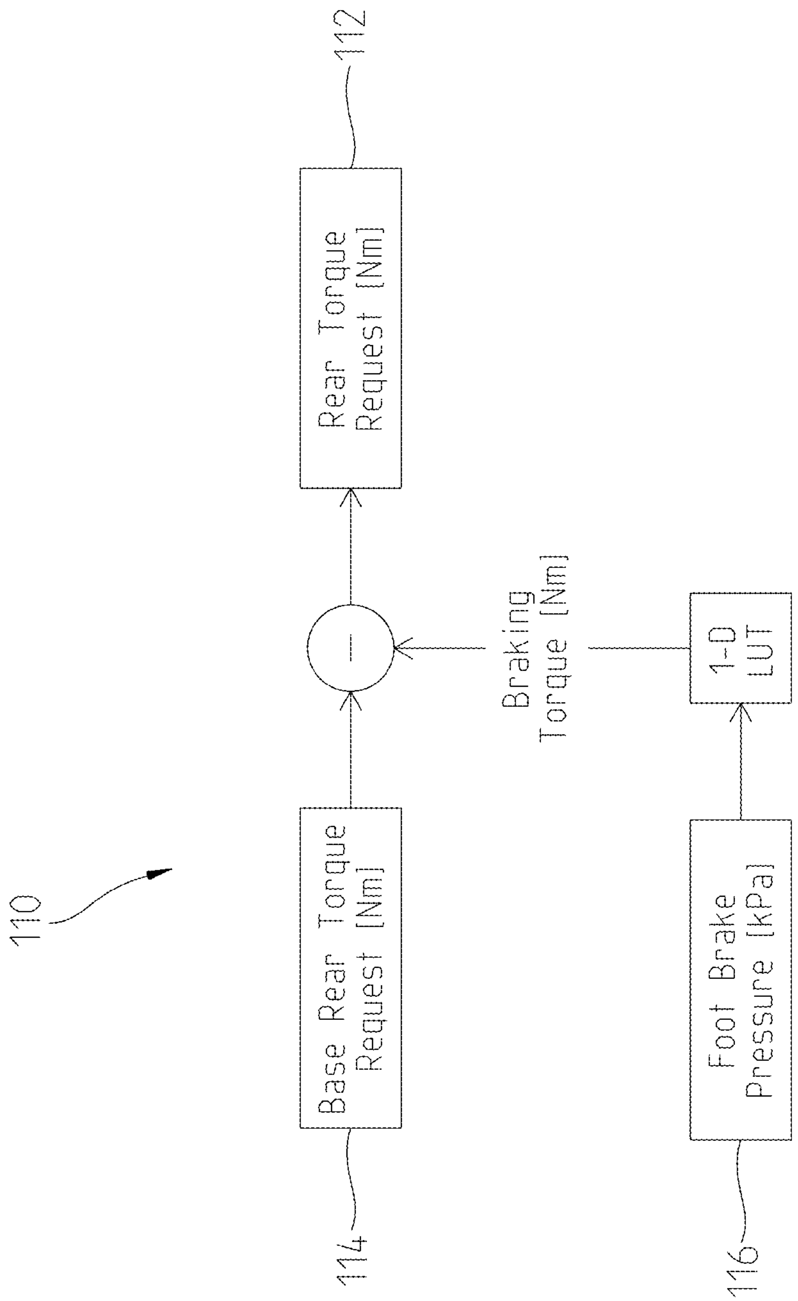
FIG. 23 is a logic diagram for controlling braking when a rear brake is removed from the vehicle of FIG. 1.

FIG. 23 illustrates a method 110 for operating vehicle 10 to provide an output of a rear torque request 112. Method 110 will be described generally with reference to FIGS. 1-5 and 13. As illustrated, a base rear torque request 114 and a foot brake pressure 116 (e.g., via at least one brake input 80, which may be a foot pedal) are transmitted to controller 62. Foot brake pressure 116 is transmitted from the actuation of a brake pedal 82 comprising a pressure sensor which is operationally coupled to a deadheaded hydraulic system for simulating a braking feel for the operator. The inclusion of brake pedal 82 and a pressure sensor allows for the removal of the rear brake assembly, which may reduce cost for manufacturing vehicle 10. The pressure applied by the operator to brake pedal 82 acts as a torque request reducer for at least rear motor 52*a*. The input of foot brake pressure 116 undergoes processing and is then subtracted from the base rear torque request 114 to provide an output of a rear torque request 112. Control system 60 then outputs rear torque request 112 to control the torque at ground-engaging members 12, 14 based on foot brake pressure 116 and base rear torque request 114. Further, in these embodiments, throttle actuator 86 and foot brake pedal 82 may be actuated at the same time which allows for the rider to bias torque to front ground-engaging members 12 through a reduction of rear torque. This may be beneficial when navigating certain terrain, such as a descent. In some embodiments, front and/or rear brake assemblies may be removed from ground-engaging members 12, 14 and, instead, torque is controlled at ground-engaging members 12 and/or 14 through motors 52, for example in embodiments in which motors 52 are positioned at all or some of wheel hubs 12*a*, 14*a* for independent control of torque at the associated ground-engaging members 12, 14.

Figure 24:
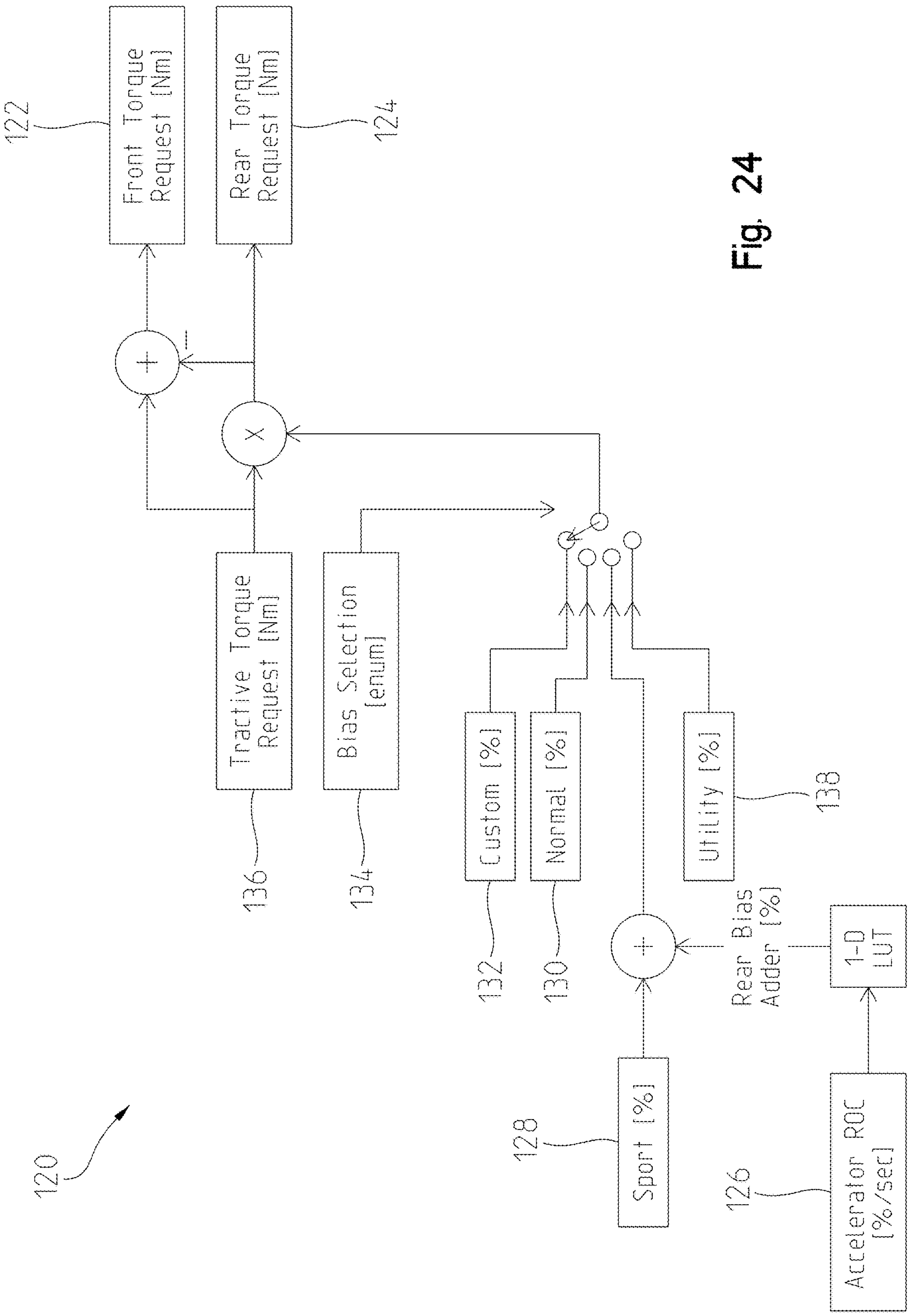
FIG. 24 is a logic diagram for torque splitting strategies using a dual-motor configuration of the powertrain assembly of the vehicle of FIG. 1.

FIG. 24 illustrates a method 120 for operating vehicle 10 through a dual motor torque splitting strategy to provide a torque request 122 to front ground-engaging members 12 and a torque request 124 to rear ground-engaging members 14. Method 120 allows for control of the ratio of the torque split between rear and front ground-engaging members 12, 14 of vehicle 10 which may be particularly advantageous for certain terrains, operating speeds, or purposes of operation such as plowing or towing. Tractive torque request 136 indicates a total torque request, while inputs that are incorporated with bias selection 134 work to separate tractive torque request 136 into the desired fractions between front torque request 122 and rear torque request 124, as will be described further herein.

As illustrated in FIG. 24, an accelerator rate of change 126 is transmitted to controller 62. This value undergoes various processing and is summed with a sport input 128. Various other inputs may be provided such as a utility input 138, a bias selection input 134, as well as a tractive torque request 136. Further, other values may be transmitted to controller 62 such as a normal input 130 and a custom input 132. As illustrated, the inputs of accelerator rate of change 126, "sport" mode 128, "utility" mode 138, "normal" mode 130, and "custom" mode 132 are incorporated with bias selection 134 and processed with tractive torque request 136 to contribute to the outputs of front and rear torque request 122, 124. The inputs of various preset operating modes or characteristics (e.g., operating modes labeled as "normal" 130, "sport" 128, and "utility" 138) may refer to fixed rear torque bias percentages. These may be presented as a preset within software of control system 60. "Sport" mode 128 may also be supplemented by accelerator rate of change 126 for increased control in the operation of vehicle 10 by the operator. "Custom" mode 132 may be an input percentage that is programmed by the operator via a display, for example. Bias selection 134 input allows for a momentary addition of torque to either front or rear ground-engaging members 12, 14, as desired by the operator. The flexibility in sending more or less torque to rear or front motor 52*a*, 52*b* of vehicle 10 allows for increased variation in desired operation of vehicle 10 by the operator while still maintaining proper function and control. Method 120 is not meant to be limiting and various other inputs and/or processing methods may be used by control system 60 for delivering front and rear torque requests 122, 124. In some embodiments, only some of the above-mentioned inputs are used for processing and outputting front and rear toque requests 122, 124.

Figure 25:
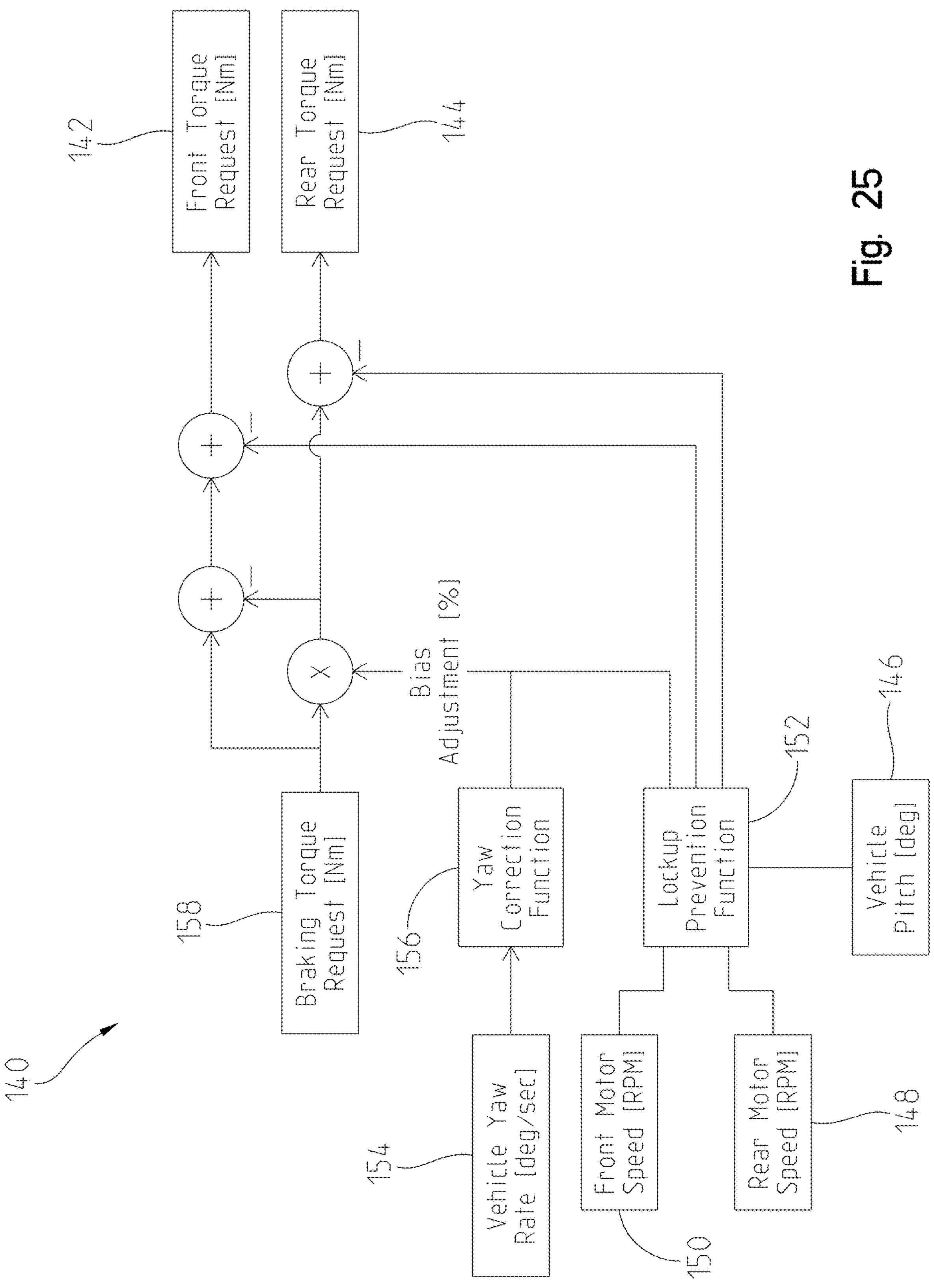
FIG. 25 is a logic diagram for advanced descent control of the vehicle of FIG. 1.

FIG. 25 illustrates a method 140 for independent control of braking torque to rear and front motor 52*a*, 52*b*. As previously described, this independent control may provide various benefits which may include, but are not limited to, advanced control of vehicle 10 while in descent and specifically preventing locking of front and rear ground-engaging members 12, 14. As illustrated, method 140 provides two output values, including front rear torque request 142 and rear torque request 144. Vehicle pitch 146, rear motor speed 148, and front motor speed 150 are transmitted to controller 62 and serve as a lockup prevention function 152. Additionally, vehicle yaw rate 154 is provided to output a yaw correction function 156. A braking torque request 158 is additionally transmitted to controller 62. Lockup prevention function 152 receives the inputs of front motor speed 150, rear motor speed 148, and vehicle pitch 146, and outputs a value processed by control system 60 for both front torque request 142 and rear torque request 144. Lockup prevention function 152 and yaw correction function 156 both additionally contribute to a bias adjustment that is processed, for example in a multiplier function, with braking torque request 158. This output then is processed with lockup prevention function 152 to provide rear torque request 144. Similar to the methods described with reference to FIGS. 22-24, the above inputs and processing are not meant to be limited, and variations thereof may be used for producing front and rear torque requests 142, 144.

Varying the values of the inputs can allow for a more controlled and individualized split of torque between rear and front motors 52*b*, 52*a*. These inputs may vary during each use of vehicle 10 depending on the desired and current application. For example, an operator may desire a torque ratio of rear motor 52*a* to front motor 52*b* of 80 to 20 for an easier step out and drift function of vehicle 10. In other examples, an operator may desire a torque ratio of rear motor 52*a* to front motor 50*b* of 50 to 50. In various other examples, an operator may use vehicle 10 for plowing or other purposes that cause a greater weight in the front of vehicle 10, and thus the operator may desire to have a torque ratio of rear motor 52*a* to front motor 52*b* of 30 to 70. The ratios provided are examples and are not intended to limit the present disclosure. A variety of rear motor 52*a* to front motor 52*b* torque ratios can be implemented using the presently disclosed embodiments.

The above components of powertrain assembly 15 allow for flexibility and customization in the operation of vehicle 10. As will be described herein with reference to FIGS. 26A-26D, vehicle 10 may also have various predetermined and/or preprogrammed drive modes 350*a*-350*d* which provide driveline configurations, steering assist settings, throttle maps or sensitivity, and/or regenerative braking settings for use in combination with the various inputs into controller 62 (FIG. 13) for operation of vehicle 10. The driveline configurations may define the capability of torque bias to be distributed between front motor 52*b* (FIG. 2) and rear motor 52*a* (FIG. 2), and as such, front and rear ground engaging members 12, 14 (FIG. 1). In the following description regarding the varying driveline configurations of each drive mode 350*a*-350*d*, the level of variable torque bias that may be distributed to the front and rear motors 52*b*, 52*a* will be defined in a range of between 0% and 100%, with approximate percentages of this distribution indicated by key 352. While specific variable torque bias percentages will be described herein with reference to various drive modes, any percentage of power may be delivered to any of ground engaging members 12, 14 to effect a given drive mode. Additionally, while the percentages are described herein as specific values, these percentages may be approximately values. Further, as illustrated in FIGS. 26A-26D and more particularly in key 352, the "locked" or "unlocked" condition of each axle of rear and front engaging members 12, 14 (FIG. 1) will also be indicated. In the condition of being "locked," each ground engaging member 12, 14 on the designated front or rear axle is rotating at the same speed.

The steering assist setting will also be identified for the drive modes described herein. The steering assist may be defined by various qualitative levels shown on a scale, which may include low, neutral, or high settings. The steering assist may be defined as the proportion of a steering output in response to the steering input from the operator. For example, in configurations having the steering assist described as neutral, the steering output (i.e., direction change of vehicle 10) may be directly proportional to the steering input into steering 38 from the operator. In other words, the steering input may be proportional to the steering output with a ratio of approximately one. When steering assist is described as low, the operator may be required to cause a larger steering input in order to get a set output in steering. In other words, the input may be described as proportional to the steering output through a ratio of less than one. Further, in configurations having the steering assist described as high, less input may be required from the operator for a desired set steering output. In other words, the input may be described as proportional to the steering output through a ratio of greater than one.

The throttle sensitivity, indicated by a qualitative level illustrated on a scale, may be defined as the general level of response time required to exhibit the throttle output from the actuation of the throttle actuator (i.e., actuation of throttle actuator 86 (FIG. 18)). More specifically, an aggressive throttle sensitivity indicates that the throttle output has a shorter response time than a steady throttle sensitivity, such that actuation of throttle actuator 86 (FIG. 18) causes a quick and aggressive response by powertrain 15. A neutral throttle sensitivity may be a level that is generally between the aggressive and the steady levels.

Lastly, the regenerative braking settings will be described with reference to each drive mode. The regenerative braking, indicated by a qualitative level on a scale, may be described as soft, neutral, or firm, which indicates the braking feedback or the level of negative torque provided in response to the operator actuating the brakes. For example, a soft regenerative braking may elicit a more steady and slow response from the brakes (i.e., vehicle 10 may slow down slowly), while a firm regenerative braking may elicit an immediate response from the brakes (i.e., vehicle 10 may brake quickly). Various of these drive modes 350*a*-350*d* will be described herein with reference to FIGS. 26A-26D. However, drive modes 350*a*-350*ed* are provided merely as examples and various other preset configurations may be incorporated into operation of vehicle 10.

Figure 26A:
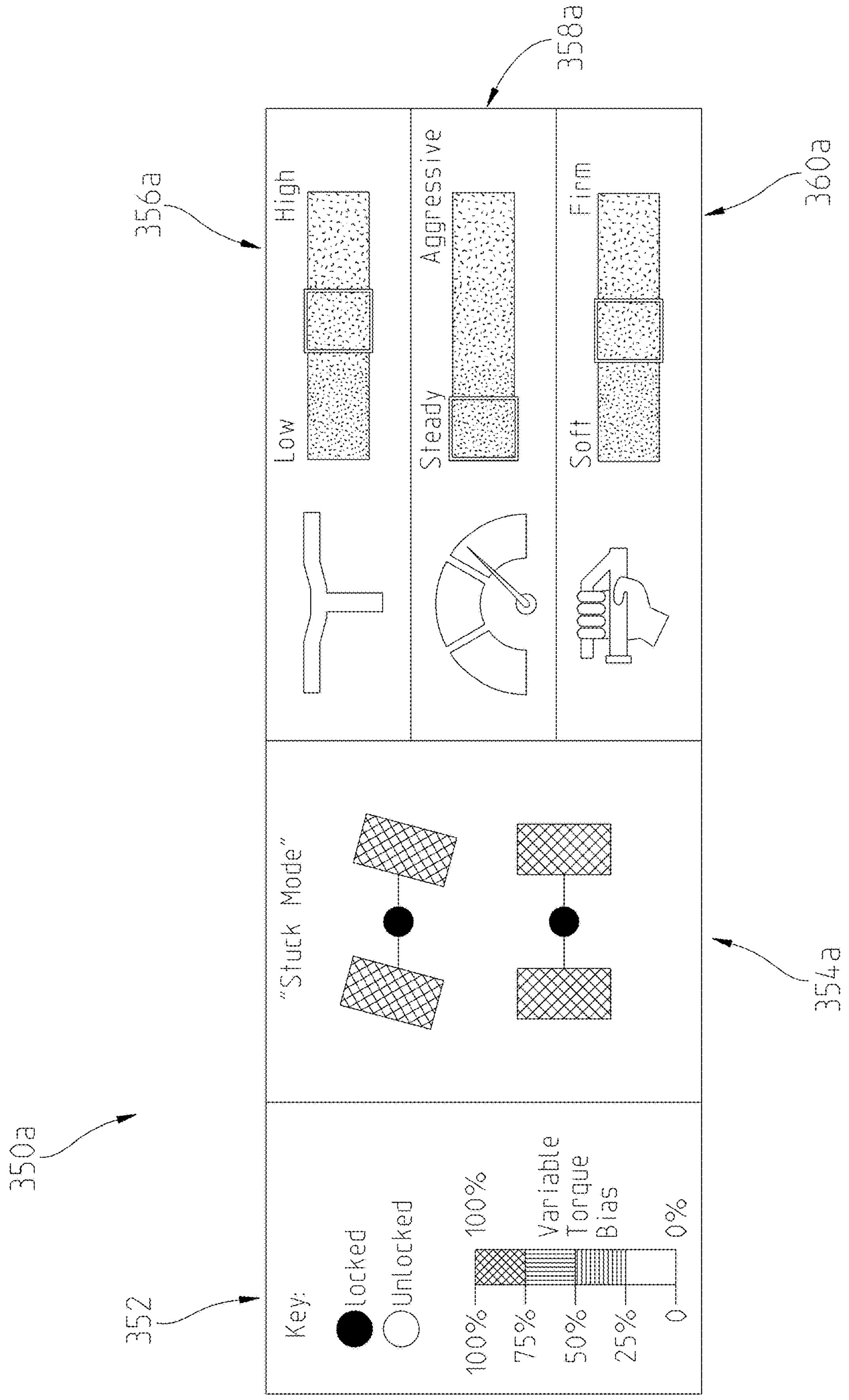
FIGS. 26A-26D are schematic illustrations of various drive modes for use with the vehicle of FIG. 1.

FIG. 26A is a schematic illustrating a first drive mode 350*a*, illustratively a "stuck mode." Drive mode 350*a* may be selected by the operator when vehicle 10 is stuck in mud or various other conditions. As illustrated, in drive mode 350*a*, both front differential 56 and rear differential 58 may be locked such that scale 354*a* of the variable torque bias is at approximately 100%. Further, the front axle of front ground engaging members 12 may be in the locked condition while the rear axle of rear ground engaging members 14 may be in the locked condition. Further, in drive mode 350*a*, scale 356*a* of steering assist may exhibit the neutral setting, such that the steering output is directly proportional to the steering input by the operator. Additionally, as illustrated in FIG. 26A, the throttle sensitivity may be illustrated on scale 358*a* as set at the steady setting, such that the throttle output and vehicle 10 response to actuation of throttle actuator (i.e., throttle actuator 86) is steady. Lastly, when vehicle 10 operates in drive mode 350*a*, the regenerative braking may be in the neutral setting, as illustrated on scale 360*a*. Additionally, in some embodiments, in drive mode 350*a*, vehicle 10 may have a speed limit imposed thereon. For example, vehicle 10 may not operate at speeds higher than approximately 15 miles per hour.

Figure 26B:
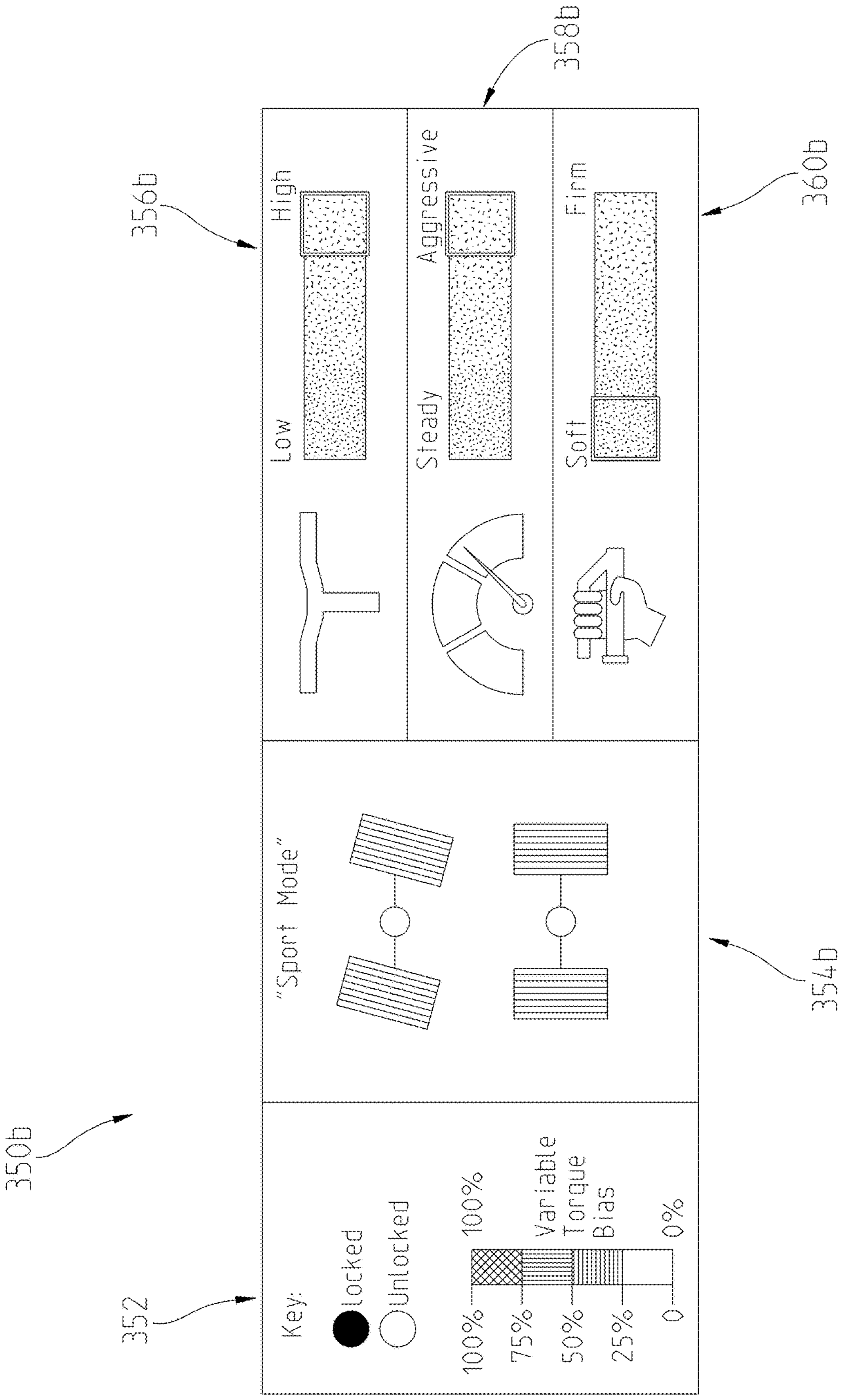

With reference now to FIG. 26B, an additional drive mode 350*b* is illustrated schematically, which may be a "sport mode" for vehicle 10. Drive mode 350*b* may be meant to optimize operation of vehicle 10 while vehicle 10 is traveling at high speeds. As illustrated, the driveline may be configured such that the variable torque bias is at approximately 75% for both front and rear differentials 56, 58 as illustrated in scale 354*b*. In this way, power is provided to both of the front and rear motors 52*b*, 52*a*. Further, the front axle of front ground engaging members 12 may be in the unlocked condition while the rear axle of rear ground engaging members 14 may be in the unlocked condition. Further, the steering assist may be configured such that it has a high level of steering response, as illustrated on scale 356*b*. Additionally, the throttle sensitivity may be set as aggressive, as illustrated on scale 358*b*. In this way, the throttle output of vehicle 10 may be exhibited immediately after the throttle input by the operator. Lastly, scale 360*b* illustrates a soft level of regenerative braking such that the response to braking is a slow stop of vehicle 10.

Figure 26C:
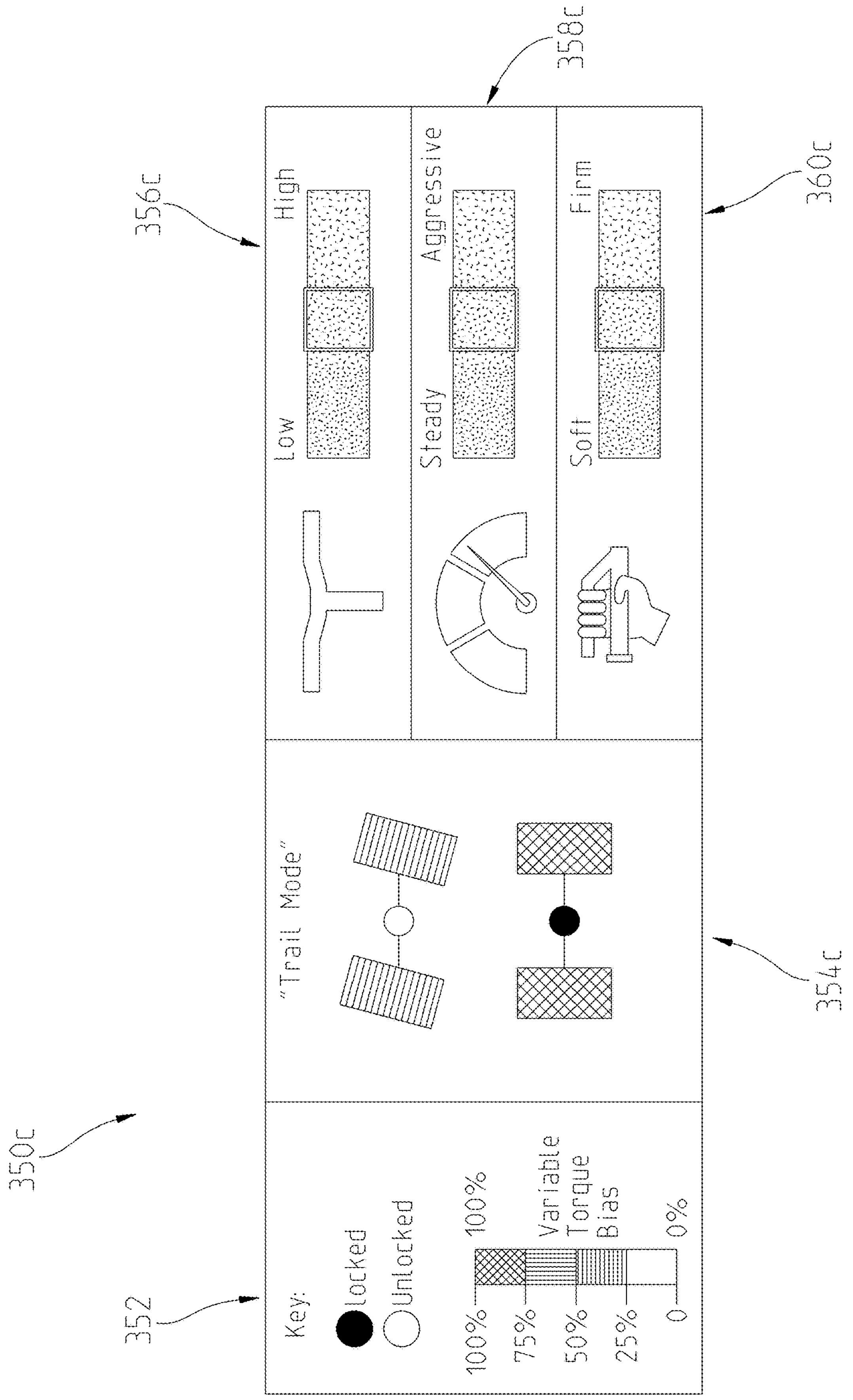

With reference now to FIG. 26C, an additional preset drive mode 350*c* is illustrated, which may be defined as a "trail mode." Drive mode 350*c* may be used primarily when vehicle 10 is operated on a trail or otherwise uneven terrain. While in drive mode 350*c* and as illustrated in scale 354*c*, front differential 56 may have a variable torque bias of approximately 50% while rear differential 58 may have a variable toque bias of approximately 100%. In this way, power is delivered to both front and rear motors 52*b*, 52*a*. Further, the front axle of front ground engaging members 12 may be in the unlocked condition while the rear axle of rear ground engaging members 14 may be in the locked condition. As such, vehicle 10 operates in two-wheel drive ("2WD"). Further, the steering assist may be defined at the neutral level, as illustrated on scale 356*c*. Additionally, in drive mode 350*c*, scale 358*c* illustrates the throttle sensitivity level as aggressive. Lastly, as illustrated in scale 360*c*, the regenerative braking is set at the neutral level.

Figure 26D:
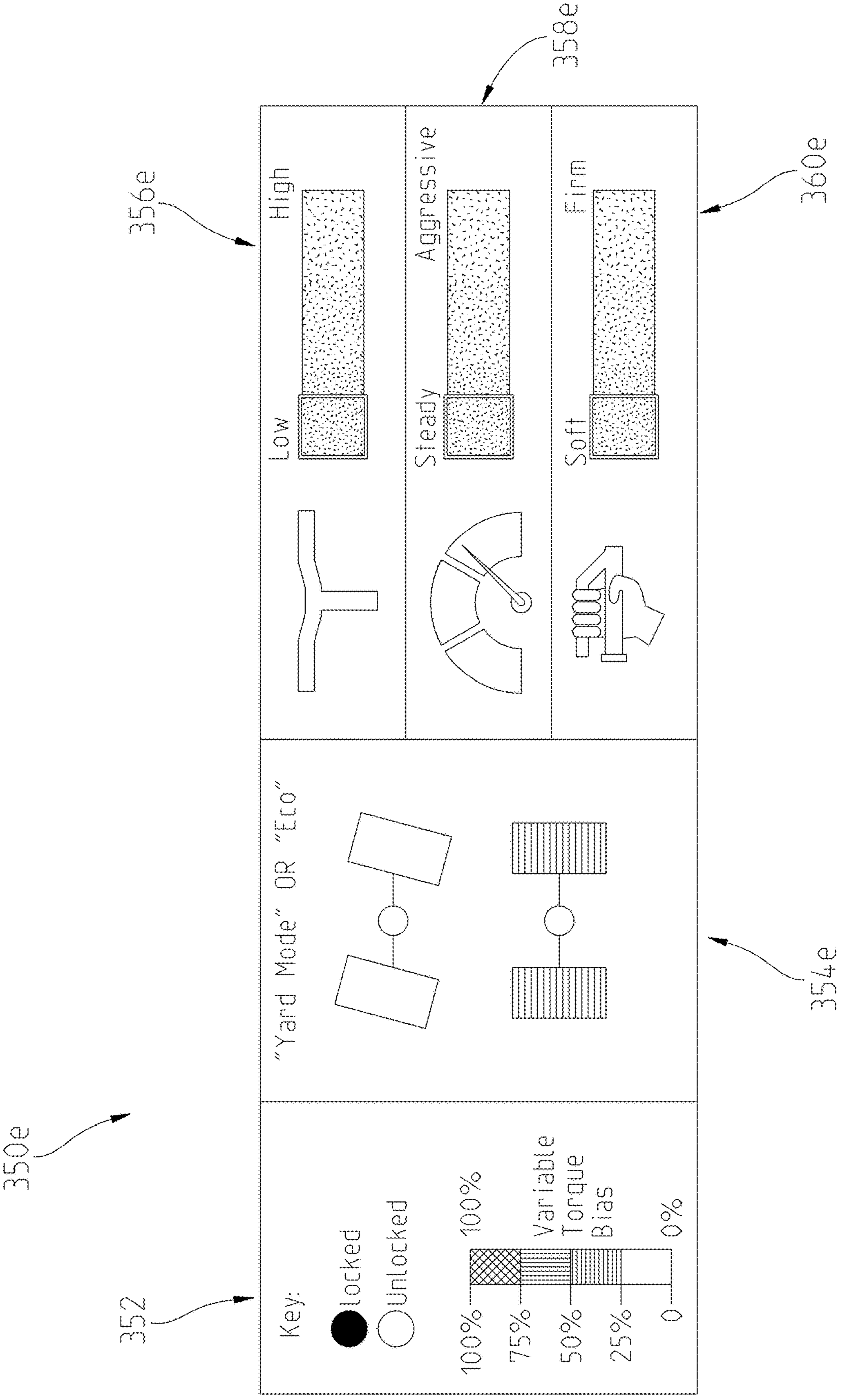

FIG. 26D illustrates an additional drive mode 350*d*, illustratively a "yard mode" or "eco mode." When operating in this mode, front differential 56 and rear differential 58 may actuate front and rear ground engaging members 12, 14 in an unlocked configuration. Further, front differential 56 may have a variable torque bias of approximately 0%. In this way, there is minimal power delivered to front motor 52*b*, however there is power delivered to rear differential 58. Rear differential 58 may have a variable torque bias of approximately 75%. As illustrated, the front axle of front ground engaging members 12 may be in the unlocked condition while the rear axle of rear ground engaging members 14 may be in the unlocked condition. Further, in drive mode 350*d*, the steering assist may be set to a low level, as illustrated at scale 356*d*. As illustrated at scale 358*d*, the throttle sensitivity may be configured at the steady level. Additionally, in drive mode 350*d*, the regenerative braking may be set at the soft level. Lastly, while operating in drive mode 350*d*, there may be a speed limit imposed onto vehicle 10. For example, vehicle 10 may not operate at a speed higher than approximately 25 miles per hour.

Further, in some embodiments, an operator may create a custom drive mode that may be stored within controller 62 (FIG. 13) and chosen by the operator. Front differential 56 and/or rear differential 58 may be selected to have a variable torque bias ranging from 0% to 100%. Additionally, the steering assist may be adjusted to have a setting of between low and high. Further, the throttle sensitivity may be adjusted between steady and aggressive, and the regenerative braking may be set between a soft and a firm setting. However, some settings may force the drive mode into another preset setting. For example, if front differential 56 and rear differential 58 are both placed in the locked configuration, vehicle 10 will be forced into drive mode 350*a* of FIG. 26A. The above described drive modes are presented only as examples, and various other drive modes may be used with vehicle 2.

The operator may select any of the above preset drive modes through display 92 of gauge 90 (FIG. 14). For example, and as described previously herein, display 92 may be a touchscreen display for easy actuation direction on display 92. In these embodiments, display 92 may allow for the operator to visualize each drive mode along with the designated settings associated with each drive mode and allow for selection of the desired drive mode by the operator. In some embodiments, vehicle 10 may additionally include an actuator for the drive modes positioned on steering 38 (FIG. 2) of vehicle 10. In these embodiments, the actuator may have inputs (e.g., buttons or switches) corresponding to each preset drive mode and the operator may adjust the actuator to select the desired drive mode.

As previously described, the components of powertrain assembly 15 of vehicle 10 have flexibility in layout and configuration, which may provide increased area for storage on vehicle 10. For example, these items may include, but are not limited to, coolers, tools, equipment, personal electronics and clothing. Specifically, the elimination of a combustion engine and prop shaft that would be required with a non-electric vehicle, may contribute to the available space for optimized storage within vehicle 10. For example, a gas tank is no longer needed when the engine is eliminated and, as such, the area normally occupied by a gas tank may provide for additional vehicle 10 storage. Various embodiments and configurations of storage assemblies to optimize this available space within vehicle 10 will be described herein. The following examples are not meant to be limited and variations of the assemblies below are within the scope of the present disclosure.

Figure 27:
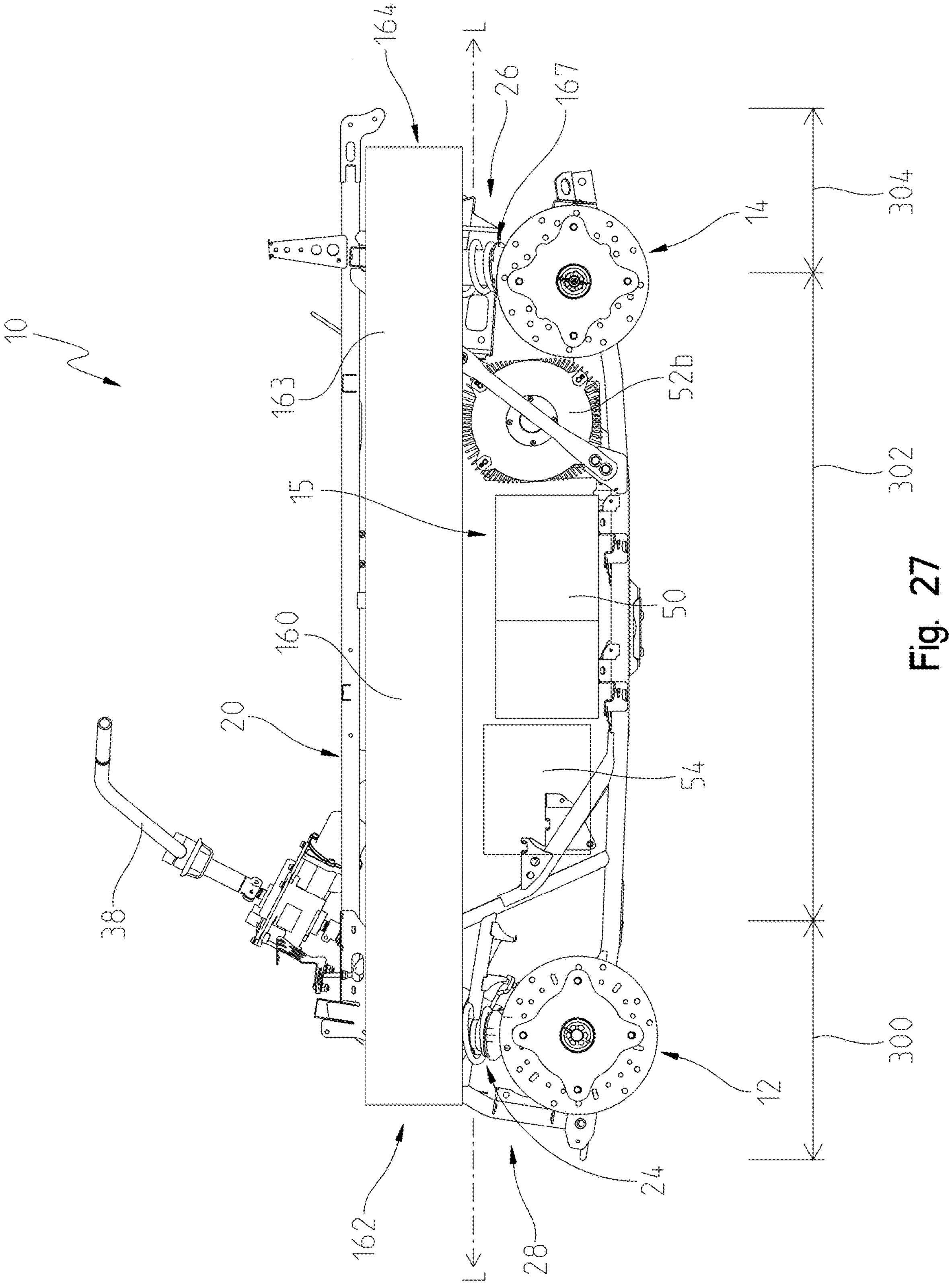
FIG. 27 is a side view of a schematic of the vehicle of FIG. 1 showing a first embodiment of a storage assembly.

FIG. 27 illustrates a side view of powertrain assembly 15 in combination with a storage assembly 160. As illustrated, vehicle 10 includes a front end 300 defined, at least in part, by front frame 28, a middle portion 302, and a rear end 304 defined, at least in part, by rear frame 26. Front end 300 may be defined as the portion extending longitudinally between a forwardmost portion of vehicle 10 and steering 38. Middle portion 302 may be defined as the portion of vehicle 10 extending longitudinally rearward of steering 38 and extending to a rear extent of seating 36. Rear end 304 of vehicle 10 may be defined as the portion of vehicle 10 extending from the rear extent of seating to the rearwardmost portion of vehicle 10 and includes rear suspension assembly 167. As previously described generally with reference to FIGS. 2-11, powertrain assembly 15 comprises rear motor 52*a* positioned rearwardly of battery 50 and inverter 54. As illustrated, the elimination of a combustion engine and prop shaft extending longitudinally within vehicle 10 leaves a lower region of vehicle 10 within middle portion 302 available for positioning of battery 50. Storage assembly 160 includes a main storage compartment 163 which may be positioned generally above battery 50, rear motor 52*a*, front motor (not shown) and ground engaging members 12, 14 and below seat 36 (FIG. 1). In this embodiment, storage assembly 160 extends generally along longitudinal centerline L of vehicle 10. Additionally, a portion of storage assembly 160 may extend forwardly of front suspension assembly 24 and steering 38 into front end 300 of vehicle 10 and is supported by front portion 28 of frame assembly 20. Storage assembly 160 comprises a front opening 162 allowing for access to the inside of main storage compartment 163 from outside vehicle 10. Further, a portion of storage assembly 160 extends rearwardly of rear suspension assembly 167 into rear end 304 of vehicle 10 and is supported by rear frame portion 26 of frame assembly 20. Storage assembly 160 comprises a rear opening 164 allowing for access to the inside of main storage compartment 163 from outside and rear of vehicle 10. Front opening 162 and rear opening 164 include doors or cover panels to deal an inner volume of storage assembly 160, however, the doors may remain open such that tools can extend through front and rear openings 162, 164 if the tools are longer than the length of storage assembly 160. Front and rear openings 162, 164 may vary in height or width. In these embodiments, access to storage assembly 160 through front opening 162 forms an optional front pass through to storage assembly 160 which may then extend through one or more of front end 300, middle portion 302 and rear end 304 of vehicle 2. Additionally, storage assembly 160 may be sealed such that any spills or leaks from accessories within main storage compartment 163 or any other portion of storage assembly 160 remain therein and do not spill onto powertrain assembly 15. The ability of storage assembly 160 to extend along at least the entire length of vehicle 10 and having a portion of storage assembly 160 in front end 300, middle portion 302, and rear end 304, allows for the accommodation of a large range of items to be stored, including those that may have a length that is longer than a length of vehicle 10. This may include, but is not limited to rakes, planks of wood, or fence posts, for example. Additionally, it allows for storage of items or tools that may have an accessory or shape at an end that does not fit within storage assembly 160. The tool may still be accommodated by extending outside of vehicle 10 at the front or rear end of front or rear openings 162, 164. In these embodiments, the ability to accommodate larger items within the length of vehicle 10 may reduce a need for trailers or additional storage attachments to vehicle 10. In some embodiments, even with tools extending through storage assembly 160 and out of front and/or rear openings 162, 164, additional attachments may still be coupled to a front or rear side of vehicle 10, for example trailers or additional storage attachments.

Figure 28:
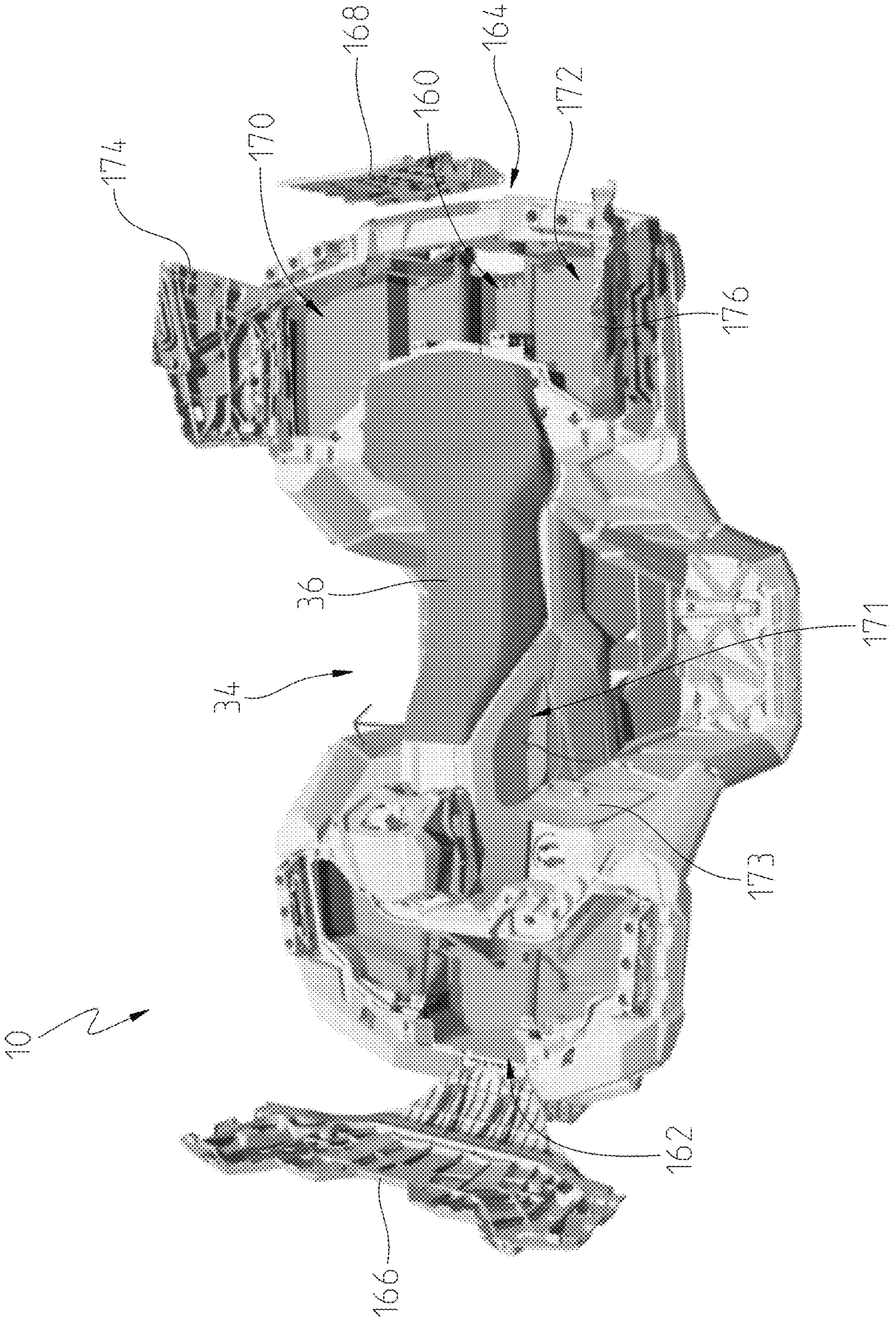
FIG. 28 is a front left perspective view of the vehicle of FIG. 1 showing a second embodiment of the storage assembly with the vehicle seat in a closed position.
Figure 29:
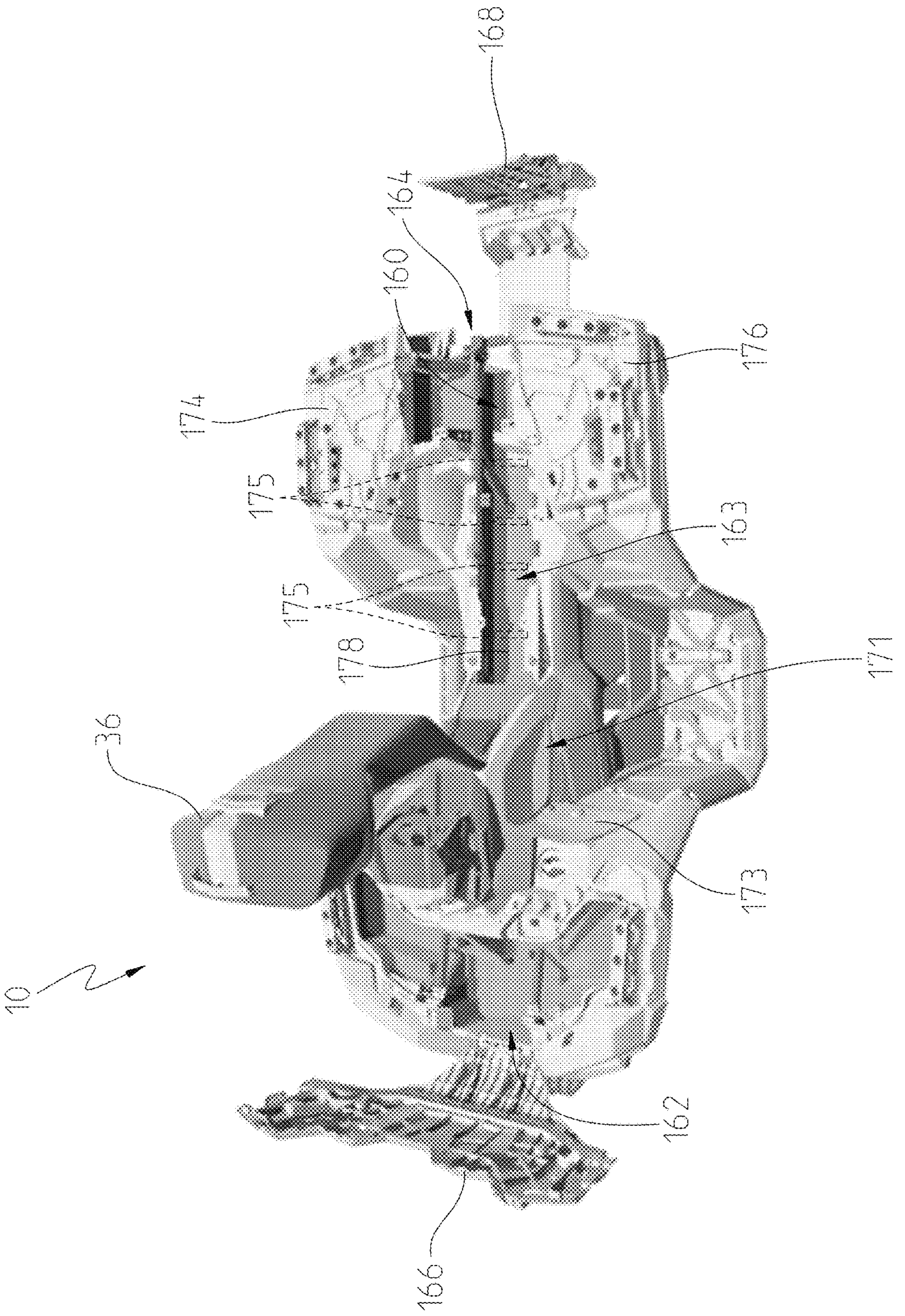
FIG. 29 is a front left perspective view of the vehicle of FIG. 28 showing the second embodiment of the storage assembly with the vehicle seat in an open position to expose a portion of the storage assembly.
Figure 29A:
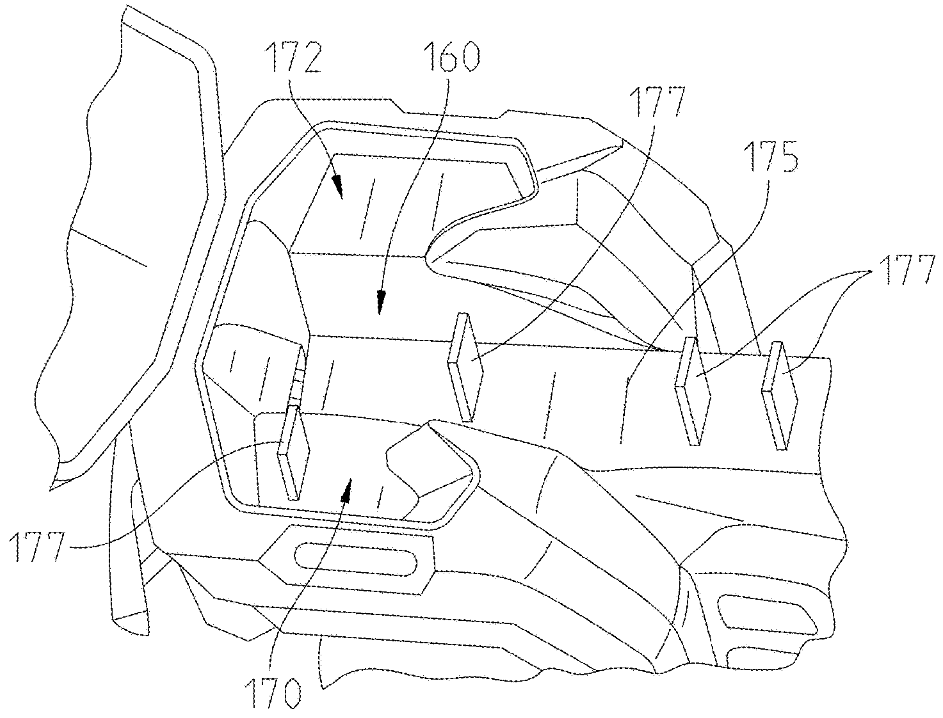
FIG. 29A is a left side perspective view of a portion of the vehicle of FIG. 28 showing the second embodiment of the storage assembly of FIG. 29.

FIG. 28 illustrates an additional embodiment of a storage assembly which may be used in combination with main storage compartment 163 of FIG. 27 or may be used instead of storage assembly 160. As illustrated, storage assembly 160 extends longitudinally along the length of vehicle 10 and comprises front and rear openings 162, 164. As illustrated, front opening 162 is accessible by opening a front door, cover, or panel 166, and rear opening 164 is accessible by opening a rear door, cover, or panel 168. Storage assembly 160 may comprise a right rear portion 170 and a left rear portion 172 positioned generally above rear ground engaging members 14 that may be accessible through the pivoting or removal of right a rear door 174 and a left rear door 176. This provides additional accessibility to storage assembly 160. Similar right and left compartments or portions may be provided adjacent front opening 162 and concealed by door 166. Any portion of storage assembly 160 may be configured with in-mold slots extending therewithin in order to accommodate dividers to separate storage assembly 160 into individual compartments. For example, FIG. 29 illustrates slots 175 shown in phantom where dividers may be incorporated into storage assembly 160. While illustrated as having four slots 175, storage assembly 160 may have any number of slots 175 for separating storage assembly 160 into a variety of components. Further, slots 175 may be distributed along only a portion of storage assembly 160 or the entirety of storage assembly 160. In some embodiments, the dividers for engagement with slots 175 may be removable such that the dividers may be easily customized by the operator to optimize the spacing within storage assembly 160. For example, FIG. 29A illustrates a portion of storage assembly 160 having slots 175 molded into storage assembly 160 which may receive removable dividers 177 for separating storage assembly 160 into a variety of compartments.

Further, at least a portion of storage assembly 160 extends below seat 36. In some embodiments, storage assembly 160 includes an operator area storage 171 positioned forward of at least a portion of seat 36 and below steering 38. In particular, at least a forwardmost portion of operator area storage 171 is positioned forward of a forward extent of seat 36 while a rearwardmost portion of operator area storage 171 may be positioned rearward of the forward extent of seat 36. In this way, a portion of operator area storage 171 may be vertically aligned with a portion of seat 36 which is similar to a portion of storage assembly 160 which also is vertically aligned with a portion of seat 36. Operator storage 171 may be open or be secured with a hinged door 173 for ensuring retention of items inside. Operator storage 171 provides the benefit of being easily accessible to the operator of vehicle 10 from seat 36 since it is positioned at least partially forward of seat 36, and thus may be an ideal dry storage location for electronics, personal devices, etc. Further, operator storage 171 may be provided with a fluid tight seal such that accessories, including for example USB ports and/or a securement mechanism for retaining an electronic or personal device within operator storage 171, may be incorporated. In this way, operator storage 171 may be waterproof. However, any compartments of storage assembly 160 may be sealed and/or waterproof to ensure protection of the items stored there within.

Figure 29B:
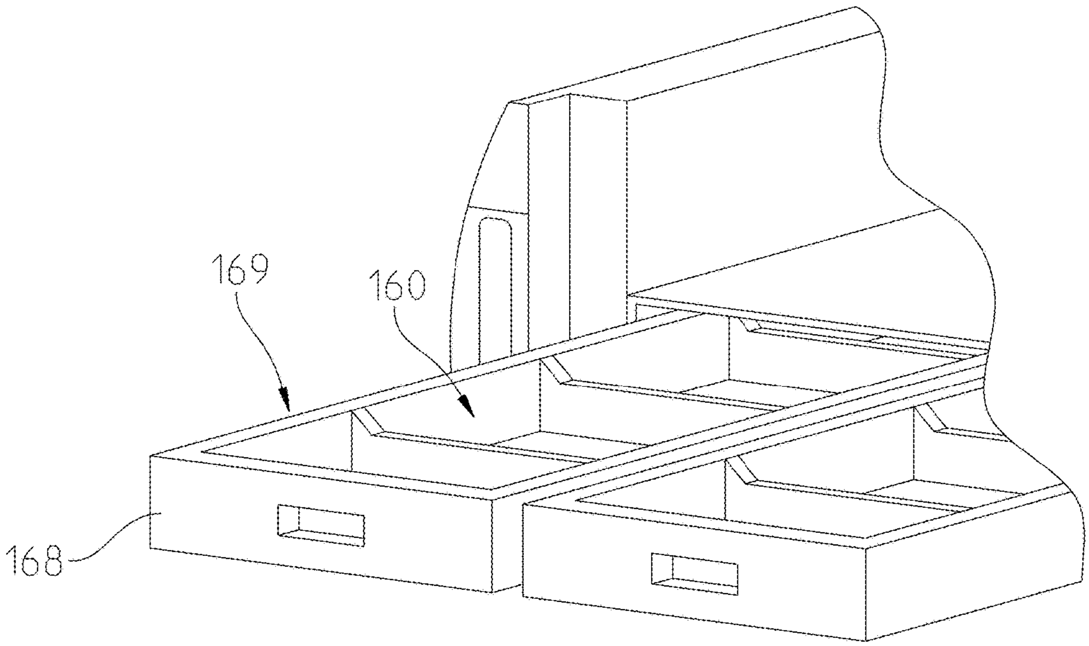
FIG. 29B is a rear perspective view of a portion of the second embodiment of the storage assembly of FIG. 29.

FIG. 29 illustrates further access to storage assembly 160 by pivoting seat 36 upwardly and forwardly. As shown, seat 36 is pulled generally upwards and towards the front of vehicle 10 to be placed in an upward or raised position. Seat 36 may be pivoted through an attachment mechanism on the backside of seat 36. The operator may then easily access a latch or similar mechanism for releasing seat 36 from a locked position (which ensures seat 36 remains stationary while the operator is seated) which allows seat 36 to then be pivoted forwardly to access a center (body) portion 178 of main storage compartment 163. The plurality of access points or doors associated with selected portions of storage assembly 160 allows for the operator to access only the required portions of storage assembly 160 without needing to open the entirety of storage assembly 160. For example, an operator may place desired accessories into right rear portion 170 of storage assembly 160 and access those accessories by only opening right rear door 172 without requiring the removal of front door 166, rear door 168, left rear door 174 or seat 36. Additionally, as may be apparent from FIG. 29, door 168 may act as a cargo extender and, more particularly, a storage bed extender, to support tools and/or accessories that extend outside of storage assembly 160. Additionally, in some embodiments, storage assembly 160 may be configured with additional storage or accessories for supporting cargo within storage assembly 160. For example, storage assembly 160 may be supplemented with soft bags, dividers, cooler sleeves, and/or coolers. Further, portions of storage assembly 160 may have drawers disposed therewithin and any of the doors described above may be drawer doors, such that the operator can pull out the one or more drawers within storage assembly 160. For example, as illustrated in FIG. 29B, storage assembly 160 may include a drawer 169 positioned at a rear portion of storage assembly 160 and rear door 168 may act as a drawer door that may be pulled out by an operator for access into drawer 169 of storage assembly 160. As illustrated, drawer 169 may include a plurality of dividers received within slots 175 (FIG. 29A) for further separating drawer 169 of storage assembly 160 into a plurality of compartments. Further, it is within the scope of the present disclosure to include only some of the above-mentioned portions of storage assembly 160 and doors, or to incorporate more storage portions and associated doors and/or panels, for storing accessories and providing access.

Figure 30:
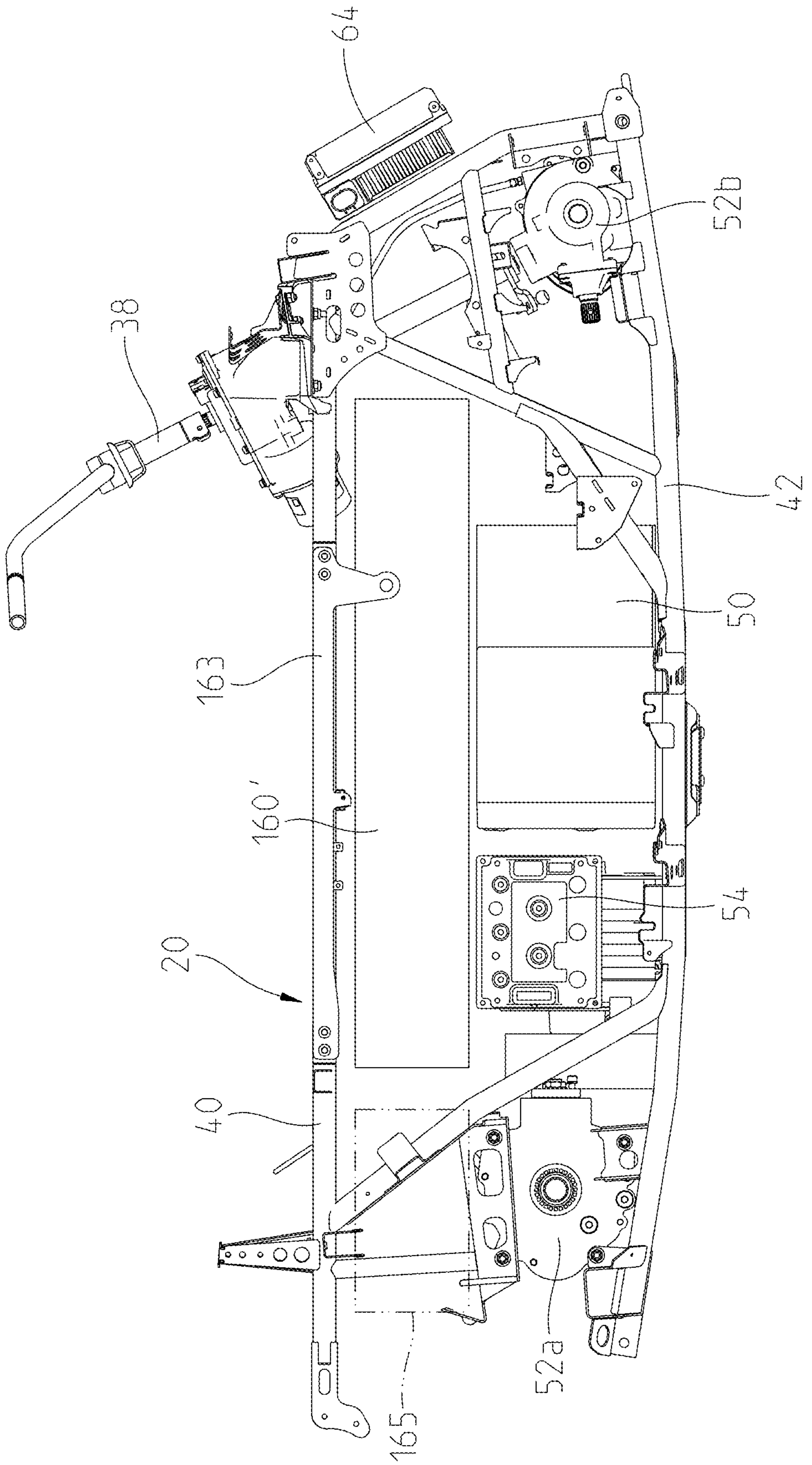
FIG. 30 is a side view of a schematic of the vehicle of FIG. 1 showing a third embodiment of the storage assembly.

FIG. 30 illustrates an alternative embodiment for accommodating a storage assembly 160'. Storage assembly 160' extends under upper longitudinal members 40 of frame assembly 20 and above various powertrain assembly 15 members such as battery 50, motors 52, and inverter 54. As illustrated, frame assembly 20 comprises a hinged portion 161 that may be pivoted upward to provide access to storage assembly 160'. In contrast to storage assembly 160 of FIG. 29, storage assembly 160 does not extend through the entirety of front and rear portions 28, 26 of frame assembly 20 and may only extend within middle portion 302 of vehicle 10. In this way, openings from storage assembly 160' to the exterior of vehicle 10 are not necessary. Although, in various embodiments, there may be optional rear pass through member 165 to accommodate larger tools and/or accessories. Variations of storage assembly 160' positioning are additionally possible. Additionally, separate storage portions may be added to vehicle 10 for additional front and/or rear storage options, examples of which will be described further with reference to FIGS. 31-49.

Figure 31:
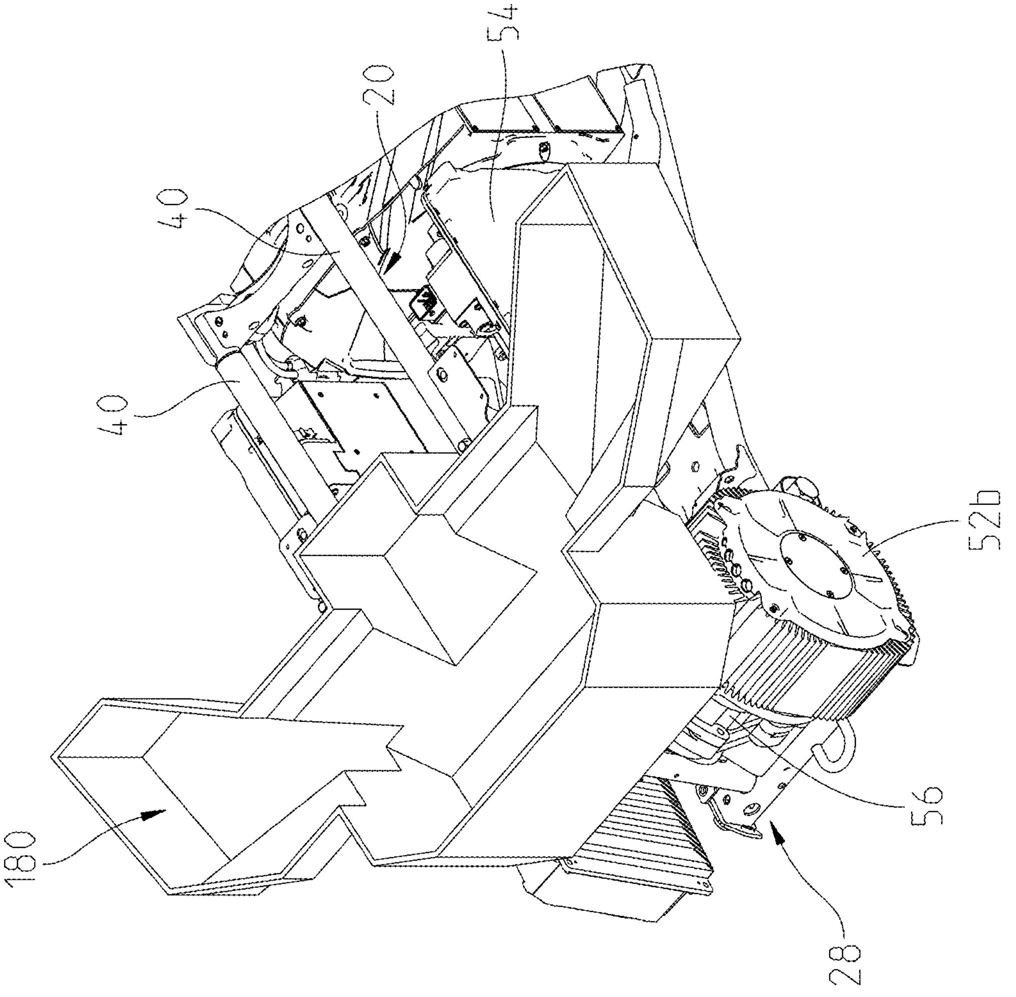
FIG. 31 is a front left perspective view of a front storage compartment of the vehicle of FIG. 1.

FIG. 31 illustrates a portion of vehicle 10 and powertrain assembly 15 with a front storage bin 180. Front storage bin 180 may be positioned at front end 300 of vehicle 10. In various embodiments, vehicle 10 may not require a front radiator, which may leave space available for front storage bin 180. Omission or varying the position of other powertrain assembly components, such as charger 64 and front motor 52*b*, may also leave space available for positioning front storage bin 180, as shown in FIG. 31. Front storage bin 180 is supported by front portion 28 of frame 20 of vehicle 10 and positioned vertically above front motor 52*b* and inverter 54. The operator of vehicle 10 may use front storage bin 180 for various accessories, including but not limited to, coolers, tools, and equipment.

Figure 32:
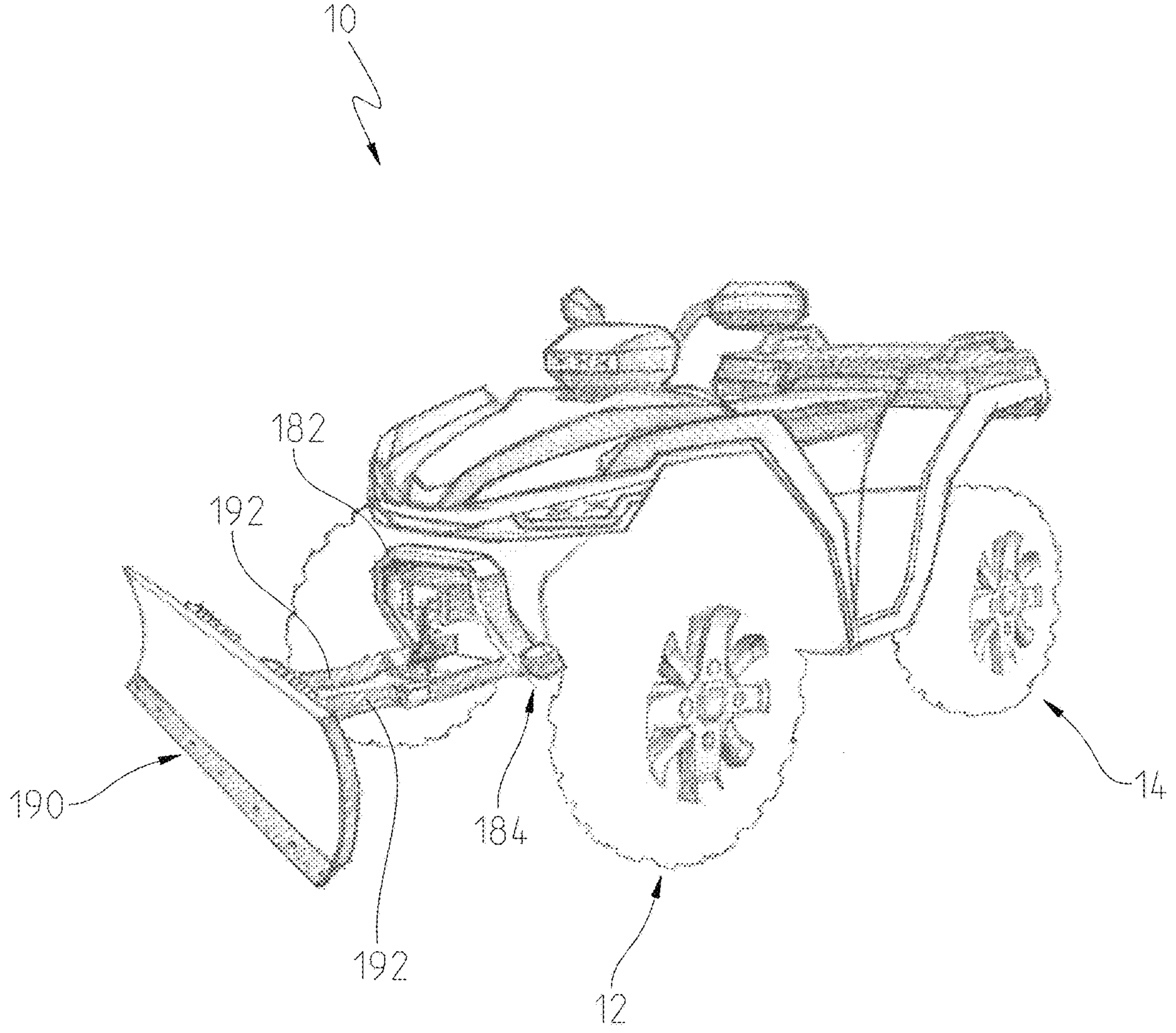
FIG. 32 is a front left perspective view of the vehicle of FIG. 1 and an accessory coupled thereto, illustratively a snow plow.
Figure 33:
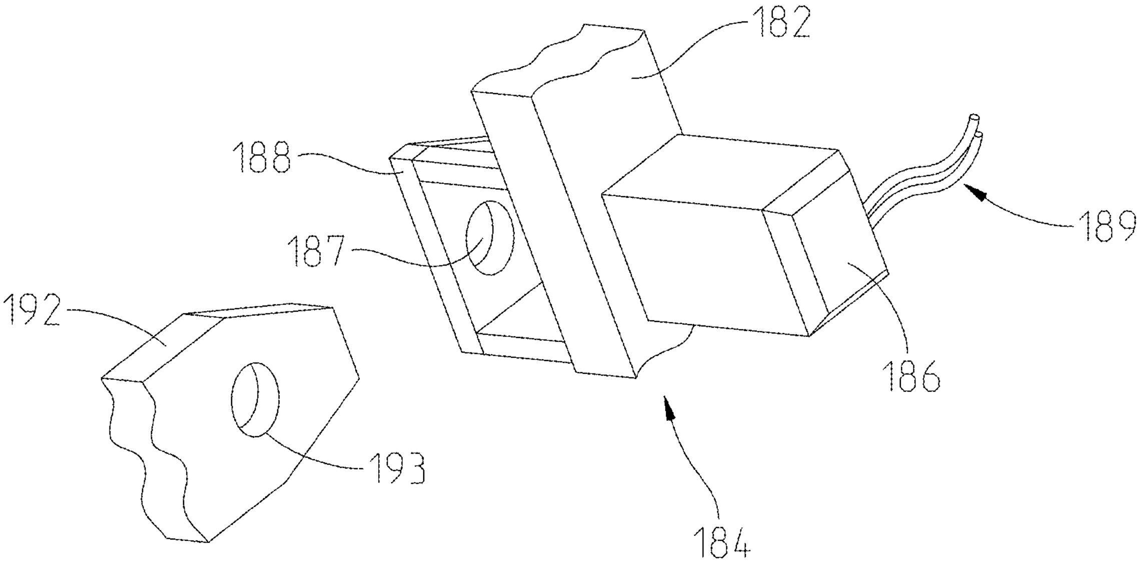
FIG. 33 is an exploded view of a connector assembly for attaching the accessory to the vehicle of FIG. 32.
Figure 34:
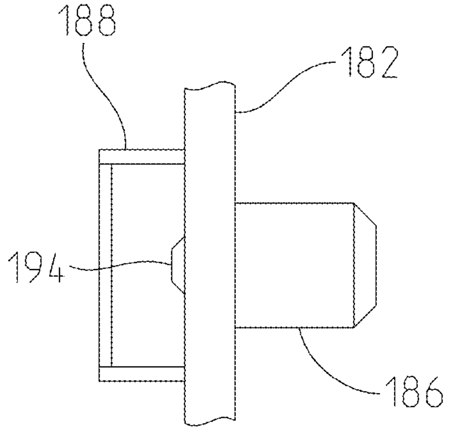
FIG. 34 is an elevational view of a portion of the connector assembly of FIG. 33.
Figure 35:
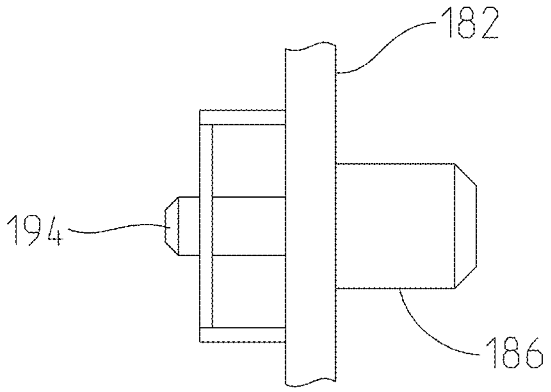
FIG. 35 is a further elevational view of the portion of the connector assembly of FIG. 33.

FIGS. 32-34 illustrate additional storage and/or accessory solutions for vehicle 10. Specifically, FIG. 32 illustrates vehicle 10 with an electromagnet assembly 184 attached to the right side and left side of front bumper 182. Electromagnet assembly 184 is used for connecting at least one accessory 190 to the front of vehicle 10 and is powered through battery 50 of vehicle 10. In the illustrative embodiment of FIG. 32, the accessory 190 is a snowplow. As illustrated best in FIGS. 33-35, electromagnet assembly 184 comprises an actuator 186 that couples to a first side of front bumper 182, a wire harness 189 extending rearwardly from actuator 186, and a pocket 188 coupled to a second side of front bumper 182. Actuator 186 receives a lock pin 194 which is spring loaded within actuator 186. Front bumper 182 has an opening (not shown) that is configured to align with an opening 187 of pocket 188. The opening of front bumper 182 and opening 187 of pocket 188 are configured for receiving lock pin 194 when in an extended position, as illustrated in FIG. 35. The embodiment of FIG. 35 illustrates the positioning of electromagnet assembly 184 prior to any actuation. When actuated, electromagnets within actuator are activated (turned on) through an operator actuation. This may be through an operational key or input on steering 38 or gauge 90 or activation through a remote device such as a remote or control fob. When electromagnets within actuator 186 are turned on, the electromagnets pull lock pin 194 into actuator 186 such that lock pin 194 does not extend from front bumper into opening 197 of pocket 188, into a released position. This released position is illustrated in the embodiment of FIG. 34. When operated in combination with accessory 190, for example a snowplow, electromagnet assembly 184 begins in the extended position of FIG. 35. Accessory 190 comprises an extending portion 192 that includes an opening 193. Opening 193 is configured for being aligned with opening 187 of pocket 188 and the opening (not shown) of front bumper 182. Once the operator actuates actuator 186 to activate the various electromagnets, lock pin 194 retracts. Extended portion of snowplow 192 is then inserted within pocket 188 such that opening 193 of accessory 190 aligns with opening 187. Once aligned, electromagnets can be deactivated to release lock pin 194, such that spring bias extends lock pin 184 through opening 193 of accessory 190 and through opening 187 of pocket 188. The deactivation of electromagnets may be done through releasing the operational key or input, actuating a separate operational key or input, or automatically, if a predetermined activation time is programmed. While described with reference to the electromagnet assembly 184 positioned on front bumper 182, electromagnet assembly 184 may be positioned elsewhere on front bumper 182 and/or other portions of vehicle 10. In this way, the accessory 190, such as snowplow 190, can be secured on front bumper 182 and be securely supported by vehicle 10. While described with reference to a snowplow, accessory 190 may be any suitable extension that operator supports on front of vehicle 10, such as a vehicle guard or a storage assembly.

Figure 36:
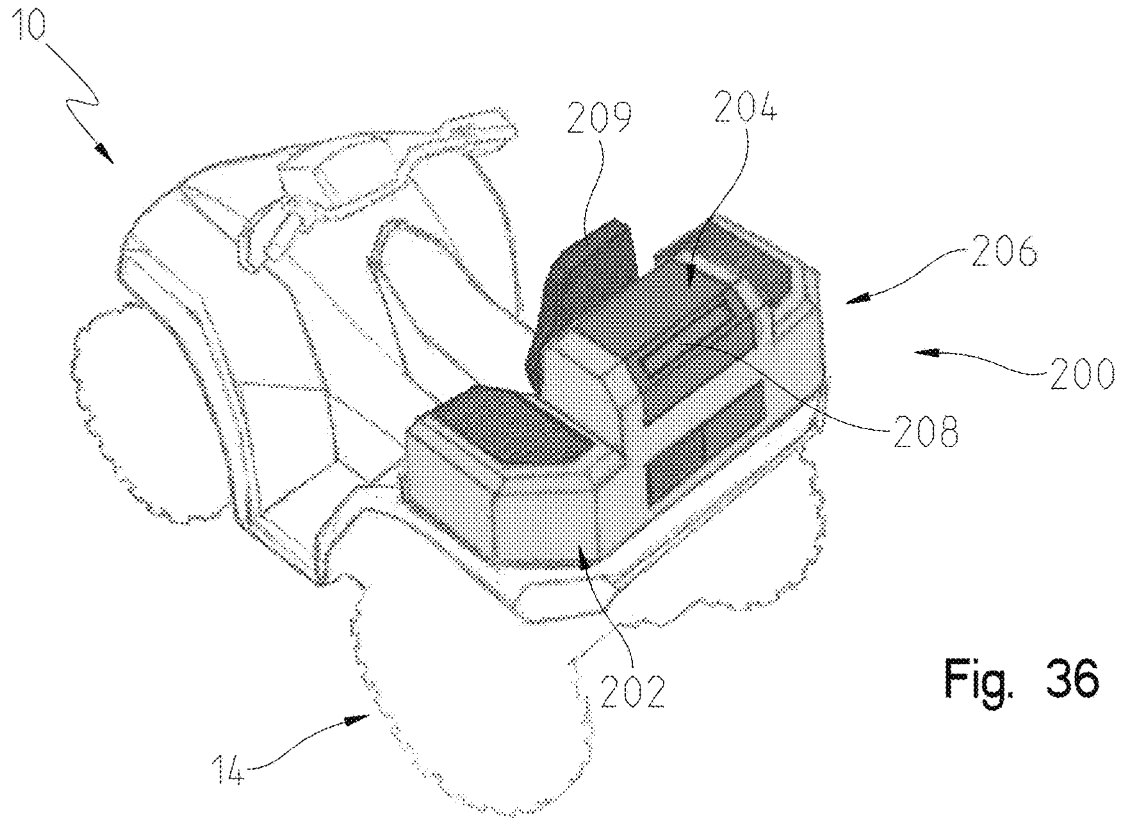
FIG. 36 is a rear left perspective view of a rear storage compartment of the vehicle of FIG. 1.
Figure 37:
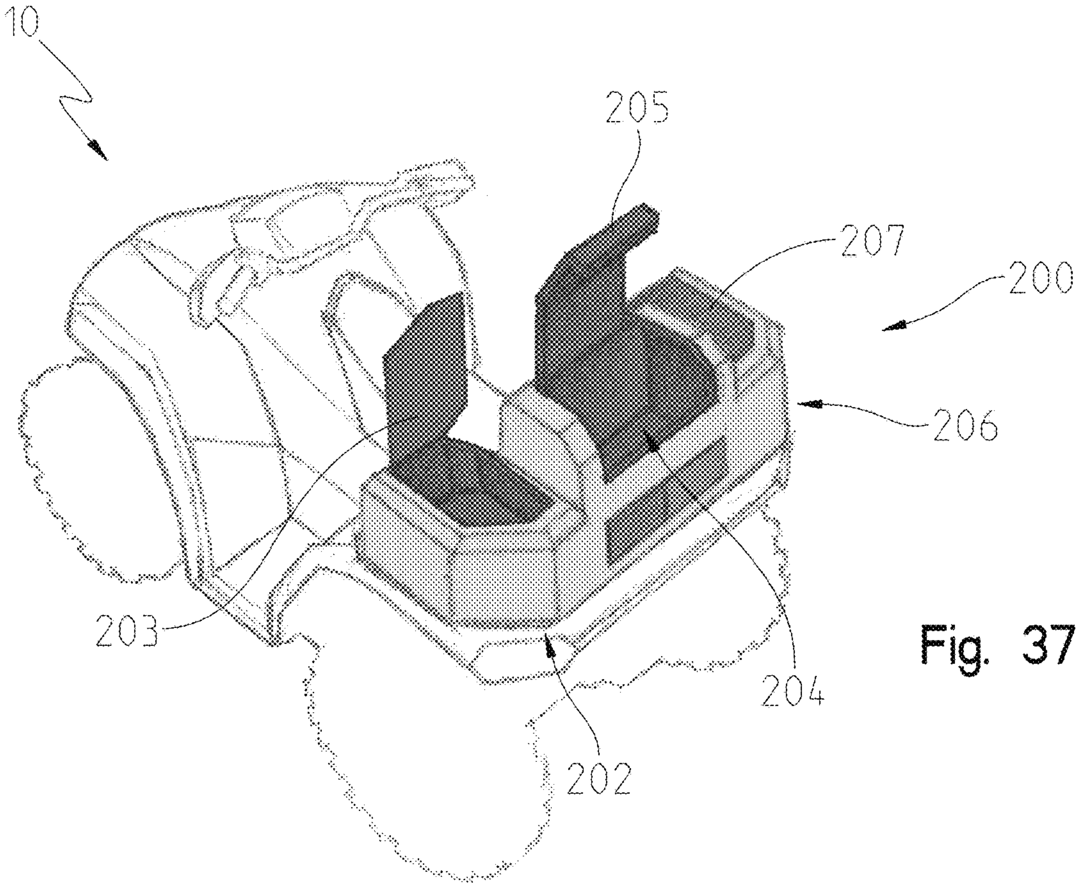
FIG. 37 is a further rear left perspective view of the rear storage compartment of FIG. 36.
Figure 38:
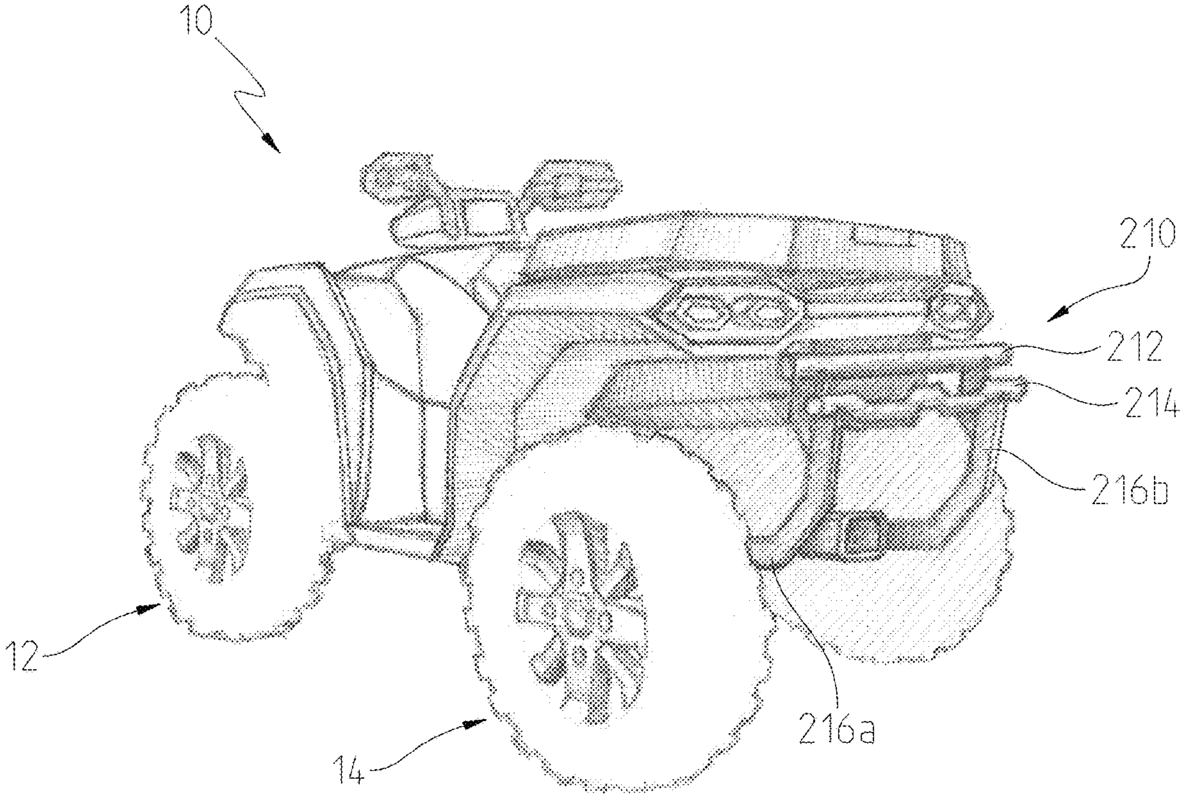
FIG. 38 is a rear left perspective view of the vehicle of FIG. 1 with support structure for accessories and tools.

Now turning to the rear of vehicle 10, additional embodiments are illustrated for additional storage at rear of vehicle 10 in FIGS. 36-49. First turning to FIGS. 36-37, an embodiment of a rear storage assembly 200 is provided. Rear storage assembly 200 may be positioned at rear end 304 of vehicle 10. In various embodiments, rear storage assembly 200 is attached to vehicle 10 through the Lock & Ride® system available from Polaris, Inc., located at 2100 Hwy. 55, Medina, MN 55340 such as that shown in U.S. Patent Application Publication No. 63/056,201, filed Jul. 24, 2020, and entitled "ARTICLE MOUNTING SYSTEM FOR A VEHICLE," the complete disclosure of which is expressly incorporated herein by reference. Although, other latch or attachment mechanisms for securing rear storage assembly 200 are possible. Rear storage assembly 200 comprises a left portion 202, a center portion 204, and a right portion 206 for storage of tools or accessories. As illustrated in FIG. 37, left portion 202 has a cover or door 203, center portion 204 has a cover or door 205, and right portion 206 has a cover or door 207. Each cover 203, 205, 207 may be hinged such that each cover 203, 205, 207 may be opened for independent access to left, center, and right portions 202, 204, 206 of rear storage assembly 200, respectively. Additionally, in various embodiments, rear storage assembly 200, or left, center or right portions 202, 204, 206 may be a thermoelectric cooler and function as a portable refrigerator or food warmer. In various embodiments, center portion 204 acts as a cooler. Center portion 204 may have a programmed temperature based on operator preferences. This temperature is programmed through a control panel 208 positioned on an external surface of rear storage assembly 200 or may be operably coupled to gauge 90 such that the operator can control temperature from operator area 34. In other embodiments, left portion 202 and/or right portion 206 may act as a cooler or a warmer. Control panel 208 comprises inputs that are weather and water resistant for controlling parameters, including but not limited to, the temperature of center portion 204. This provides additional protection for the accessories stored within rear storage assembly 200 which may be particularly advantageous when food or beverages are stored. In various embodiments, each of the left, center and right portion 202, 204, 206, respectively, are capable of being locked and unlocked. This may be configured with Bluetooth locking, as will be described further with reference to FIG. 52. When center portion 204 operates as a cooler, center portion 204 comprises an electric plug for coupling to a power outlet of vehicle 10 to power the cooler. In some embodiments, center portion 204 comprises a power strip, as will be described further with reference to FIGS. 50 and 51. In various embodiments, rear storage assembly 200 comprise an optional seatback 209 for increased comfort for passengers of vehicle 10. While the embodiments of FIGS. 36 and 37 are described with reference to rear of vehicle 10, similar embodiments to that of rear storage assembly 200 may be positioned at front end 300 of vehicle 10 and be used in combination with or instead of front storage bin 180 illustrated and described with reference to FIG. 31.

The storage portions described herein may be used with vehicle 10 such that front end 300 comprises storage portions that are separate and distinct from storage portions of middle portion 302 and storage portions of rear end 304. In other embodiments, any of the various storage portions described, such as storage assembly 160, may extend between one, two or all three of the front end 300, middle portion 302, and rear end 304. For example, storage assembly 160 may be continuous only between rear end 304 and middle portion 302 and vehicle 10 may comprise a separate storage portion at front end 300.

Figure 39:
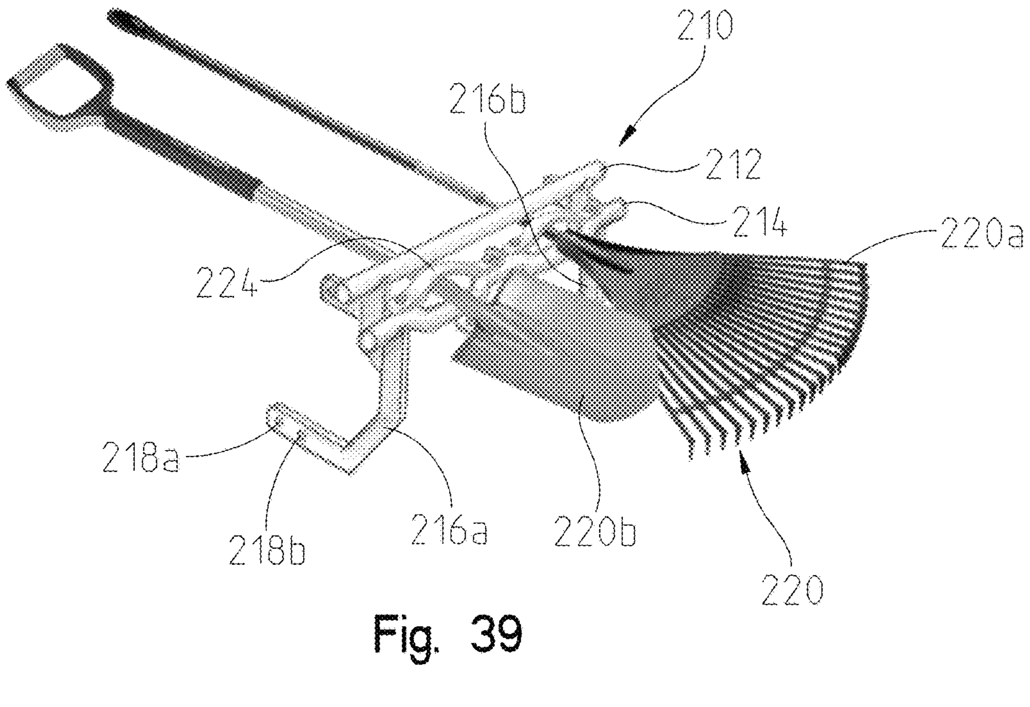
FIG. 39 is a rear left perspective view of the support structure of FIG. 38.
Figure 40:
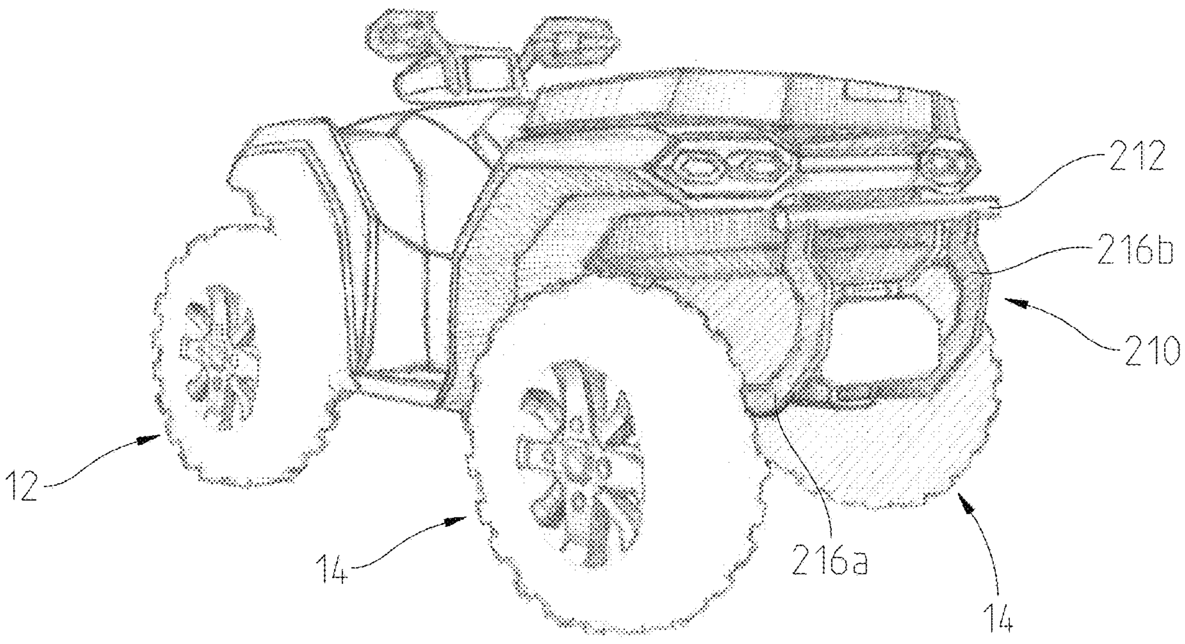
FIG. 40 is a rear left perspective view of the vehicle of FIG. 1 with the support structure of FIG. 38 with a portion removed.
Figure 41:
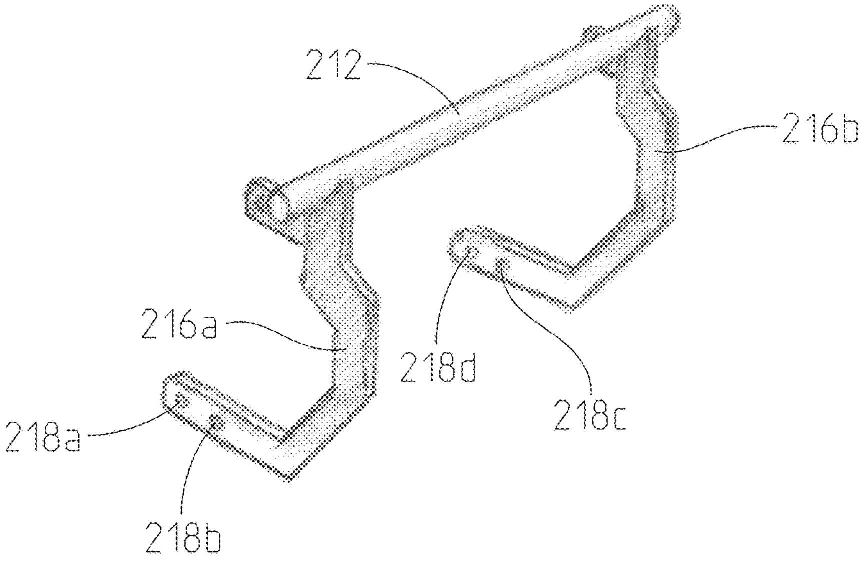
FIG. 41 is a rear left perspective view of the support structure of FIG. 40.
Figure 42:
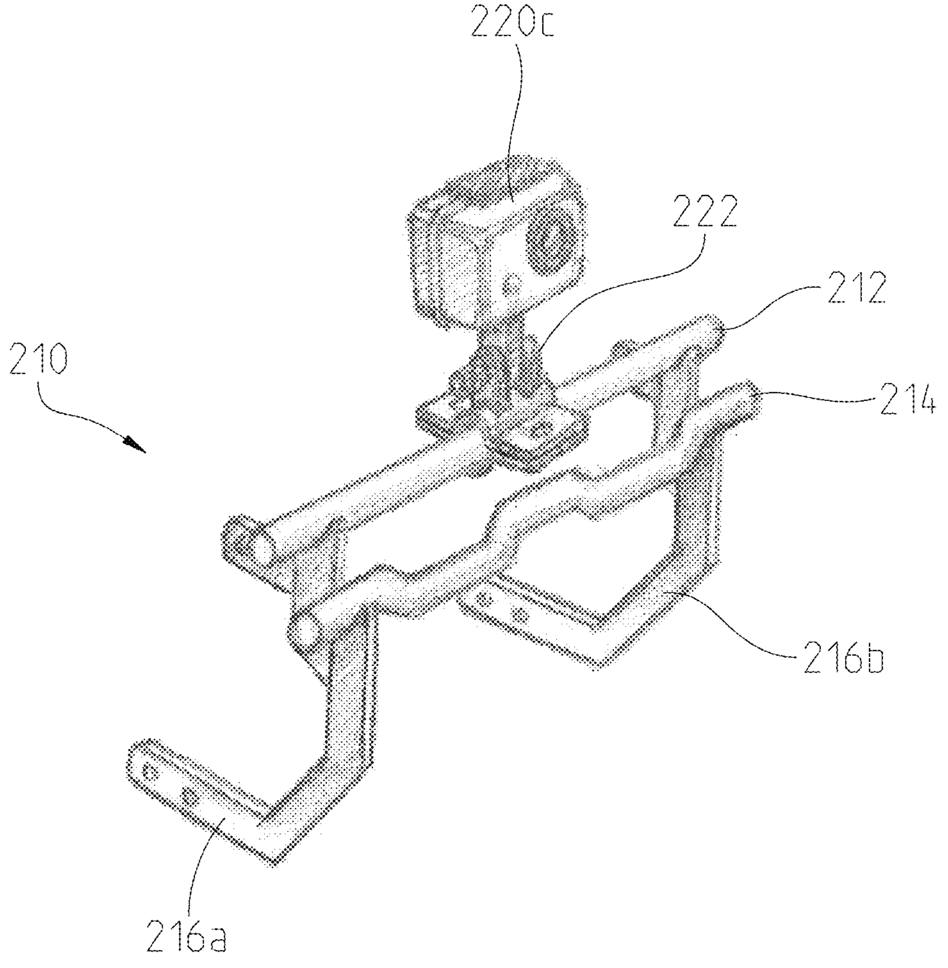
FIG. 42 is a rear left perspective view of the support structure of FIG. 41 with an accessory supported thereon.

FIGS. 38-42 illustrate an additional embodiment for providing storage and attachment options for carrying accessories on rear of vehicle 10. Specifically, vehicle 10 may comprise a rear bumper 210 attached to rear of vehicle 10. Rear bumper 210 includes a first bracket 216*a* and a second bracket 216*b* for attaching rear bumper 210 to frame 20 of vehicle 10. First and second brackets 216*a*, 216*b* each comprise two openings 218 to secure rear bumper 210 to vehicle 10. Rear bumper 210 further includes a rod 212 and a tube 214 configured for supporting various accessories 220, such as but not limited to a rake 220*a* and a shovel 220*b*. In various embodiments, and as best illustrated in FIG. 39, rear bumper 210 further includes a removable strap 224 for securing accessories 220. As best illustrated in FIG. 42, a support bracket 222 may be mounted to rod 212 for supporting additional accessories 220. In the illustrative embodiment, a camera 220*c* may be supported. In various other embodiments, support bracket 222 may support a light fixture. Additionally, as best illustrated in FIG. 40, rear bumper 210 may be used in combination with any of the previously-described storage assemblies. For example, storage assembly 160 may be positioned within vehicle 10 longitudinally. When using storage assembly 160 in combination with rear bumper 210, it may be beneficial to remove tube 214 and removable strap 224 to provide access to an opening of storage assembly 160, such as rear opening 162 of storage assembly 160 (FIG. 27). In various other embodiments, storage assembly 160' may be used in conjunction with rear bumper 210. It is also within the scope of the present disclosure for variations of support bracket 222, rod 212, and tube 214 to be used in rear bumper 210 based on the desired operator use. While the embodiments of FIGS. 38-42 are described with reference to the rear of vehicle 10, front bumper 182 of FIGS. 32-34 may be configured for similar use to that of rear bumper 210 at front end 300 of vehicle 10.

Figure 43:
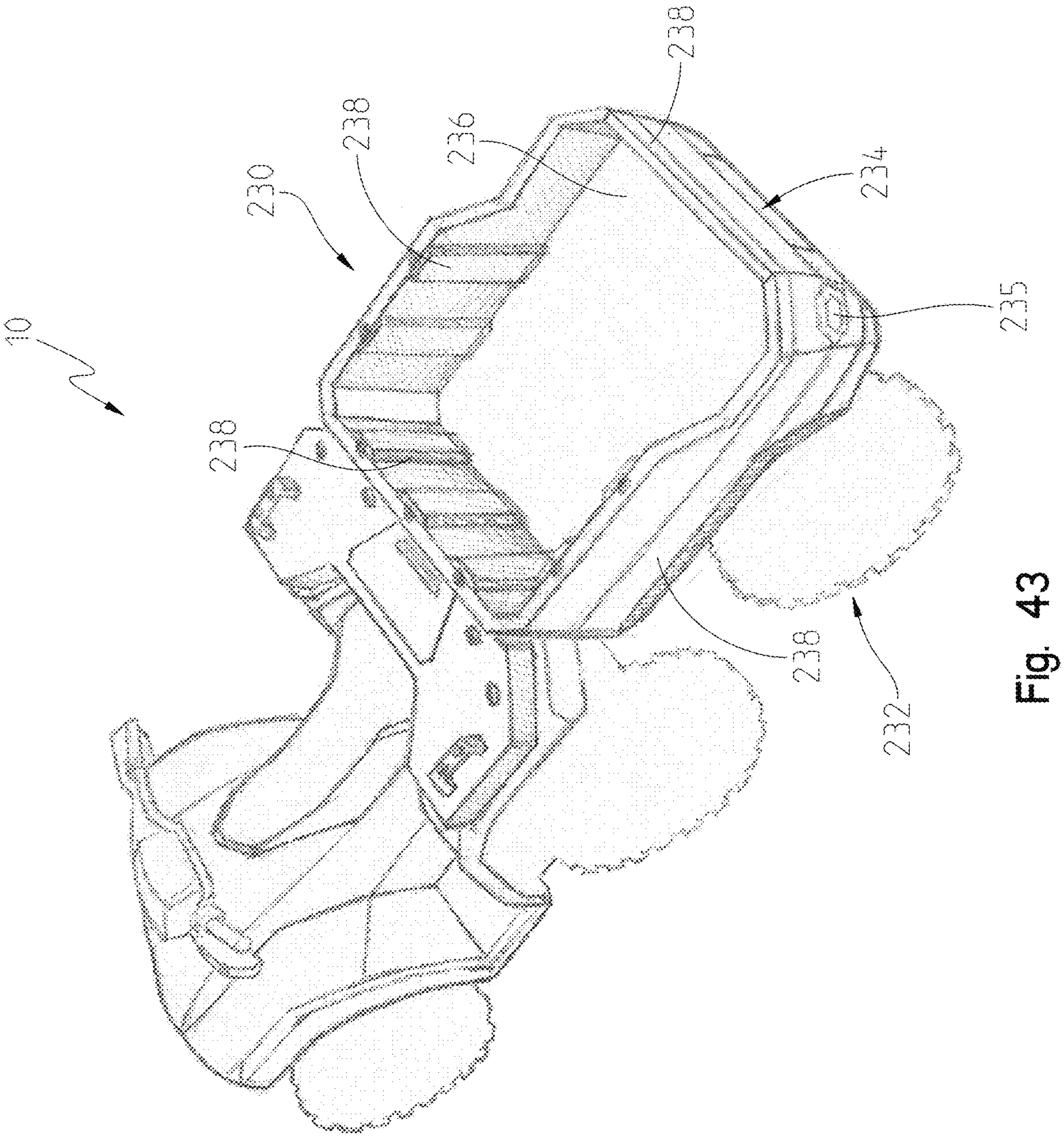
FIG. 43 is s left top perspective view of the vehicle of FIG. 1 including an extended cargo portion.
Figure 44:
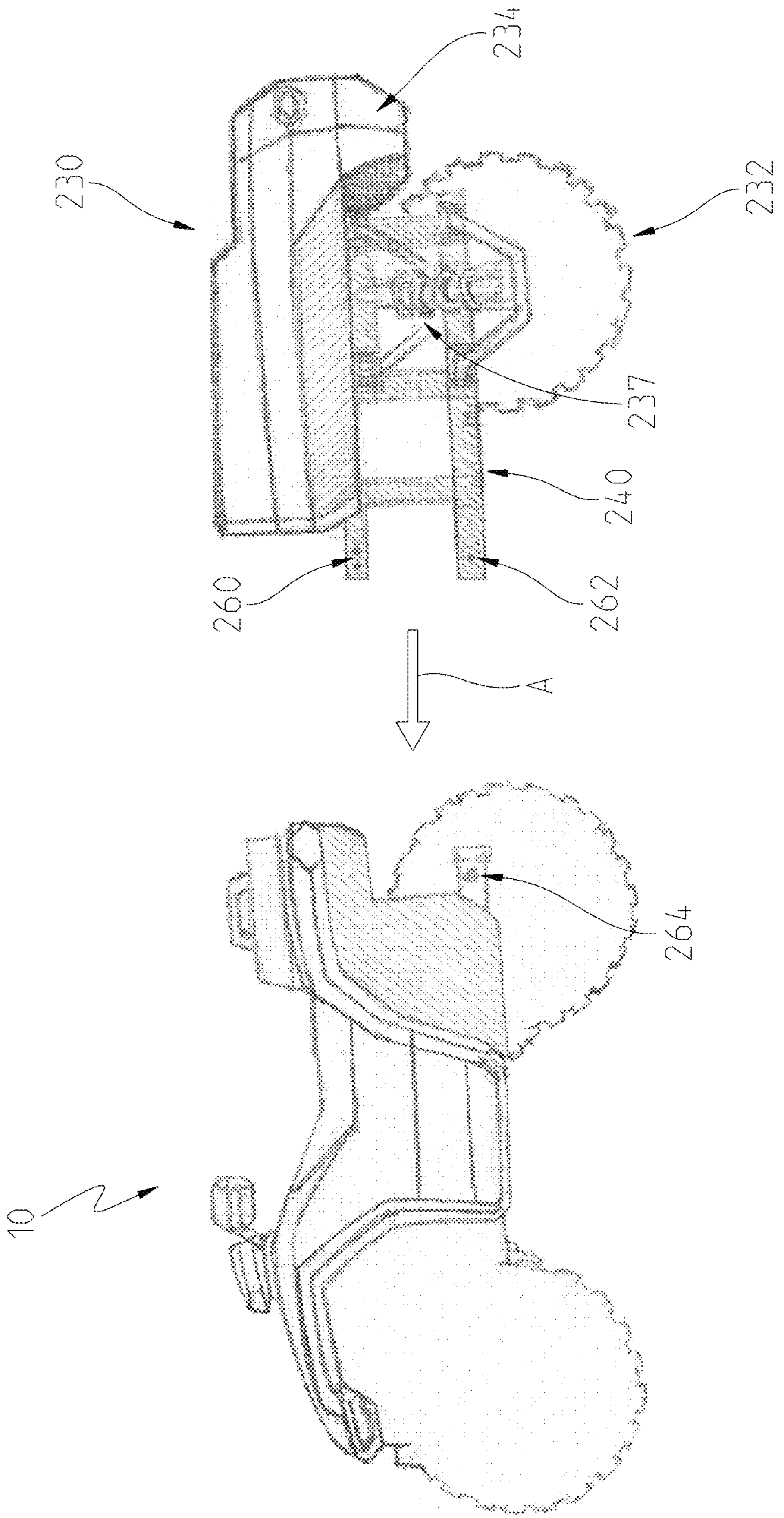
FIG. 44 is an exploded view of the vehicle and extended cargo portion of FIG. 43.

FIGS. 43-49 illustrate additional embodiments for increasing the storage of vehicle 10. Specifically, vehicle 10 is illustrated with a cargo or trailer assembly 230 having ground engaging members 232 for supporting cargo assembly 230 at rear end 304 of vehicle 10. Cargo assembly 230 is a separate extension of vehicle 10 that is attached to rear of vehicle 10, as illustrated in FIG. 44 where cargo assembly 230 is attached in the direction of arrow A for attachment to rear of vehicle 10. Specifically, cargo assembly 230 comprises cargo assembly frame 240 having a plurality of attachment points 260 wherein cargo assembly 230 may be removably coupled (e.g., bolted) to frame 20 of vehicle 10. Cargo assembly 230 may also include an extension 262 for being received by a tow hitch receiver 264 of vehicle 10. It is further within the scope of the present embodiment to use various other attachment methods for attaching cargo assembly 230 to frame 20 of vehicle 10. In this way, vehicle 10 does not require any modifications to the configuration of powertrain assembly 15 to support and incorporate an increased storage space attached to vehicle 10.

As illustrated in FIG. 43, cargo assembly 230 comprises an underfloor storage 234 positioned below a floor 236 of cargo assembly 230. Underfloor storage 234 may be sealed such that any leaks or spills within storage are contained, and/or any ambient or vehicle-related dirt or debris do not flow into underfloor storage 234. Additionally, storage assembly 230 comprises rear taillights 235 of vehicle 10. Cargo assembly 230 further comprises a cargo assembly suspension assembly 237 positioned below underfloor storage 234. Further, cargo assembly 230 comprises side wall members 238 which comprise attachment members for supporting various accessories and tools. In some embodiments, the attachment members may be Lock & Ride® system available from Polaris, Inc., located at 2100 Hwy. 55, Medina, MN 55340 such as that shown in U.S. Patent Application Publication No. 63/056,201, filed Jul. 24, 2020, and entitled "ARTICLE MOUNTING SYSTEM FOR A VEHICLE," the complete disclosure of which is expressly incorporated herein by reference.

Figure 45:
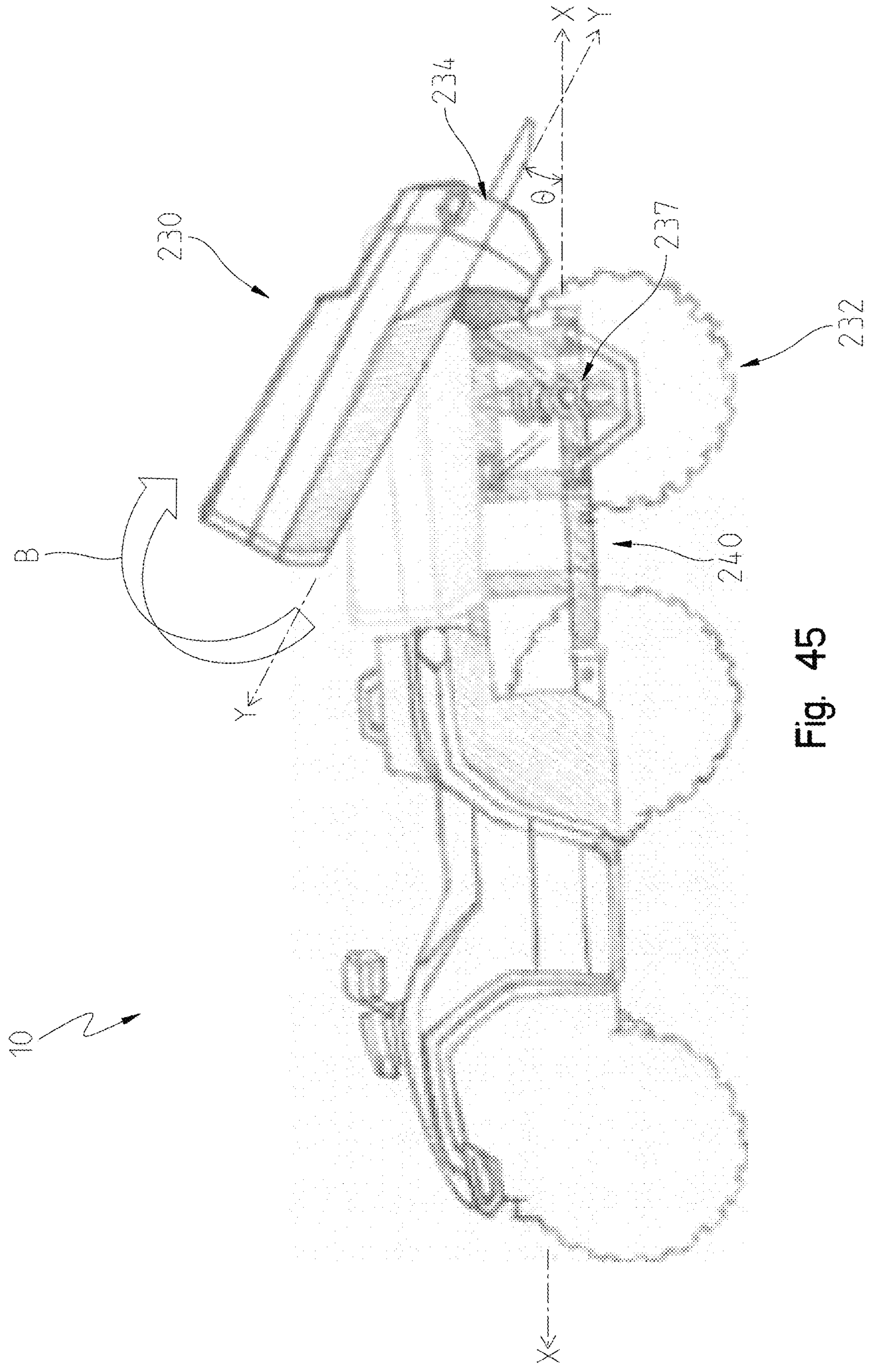
FIG. 45 is a side view of the vehicle and the cargo portion of FIG. 43 with the cargo portion shown in a tilted position.

In operation, cargo assembly 230 is additionally configured for tilting as illustrated in FIG. 45. This allows for ease in removal of items collected in cargo assembly 230. For example, dirt, sand or rocks may be collected in cargo assembly 230 and easily removed through tilting cargo assembly 230. Cargo assembly 230 tilts along direction change of arrow B. In an upward most position, cargo assembly 230 may be aligned with an axis Y that forms an angle θ relative to longitudinal axis X of vehicle ranging from 15 degrees to 75 degrees. In some examples, angle θ is 45 degrees.

Figure 46:
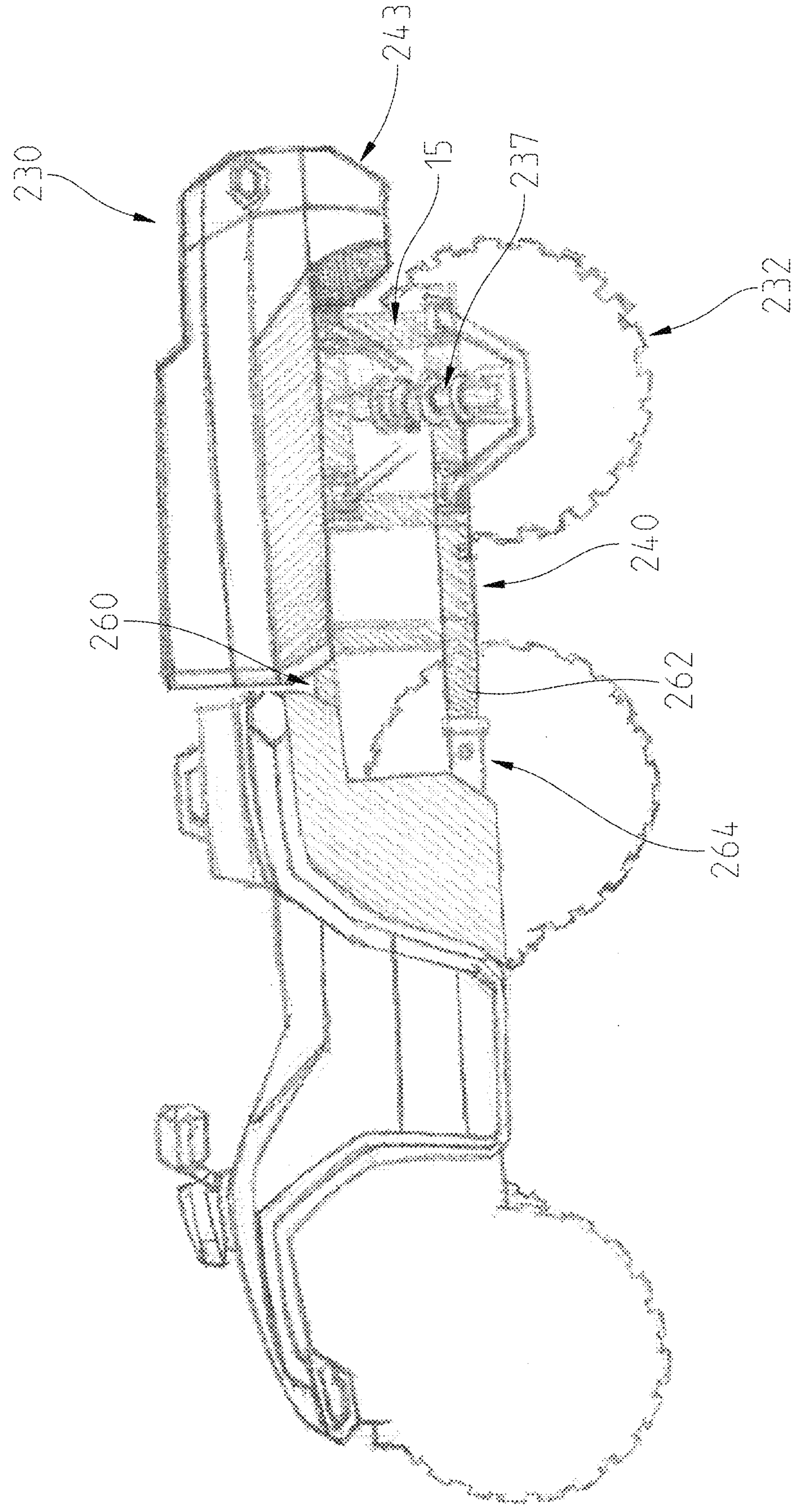
FIG. 46 is a side view of the vehicle and the cargo portion of FIG. 45 with the cargo portion shown in an extended or downward position.
Figure 47:
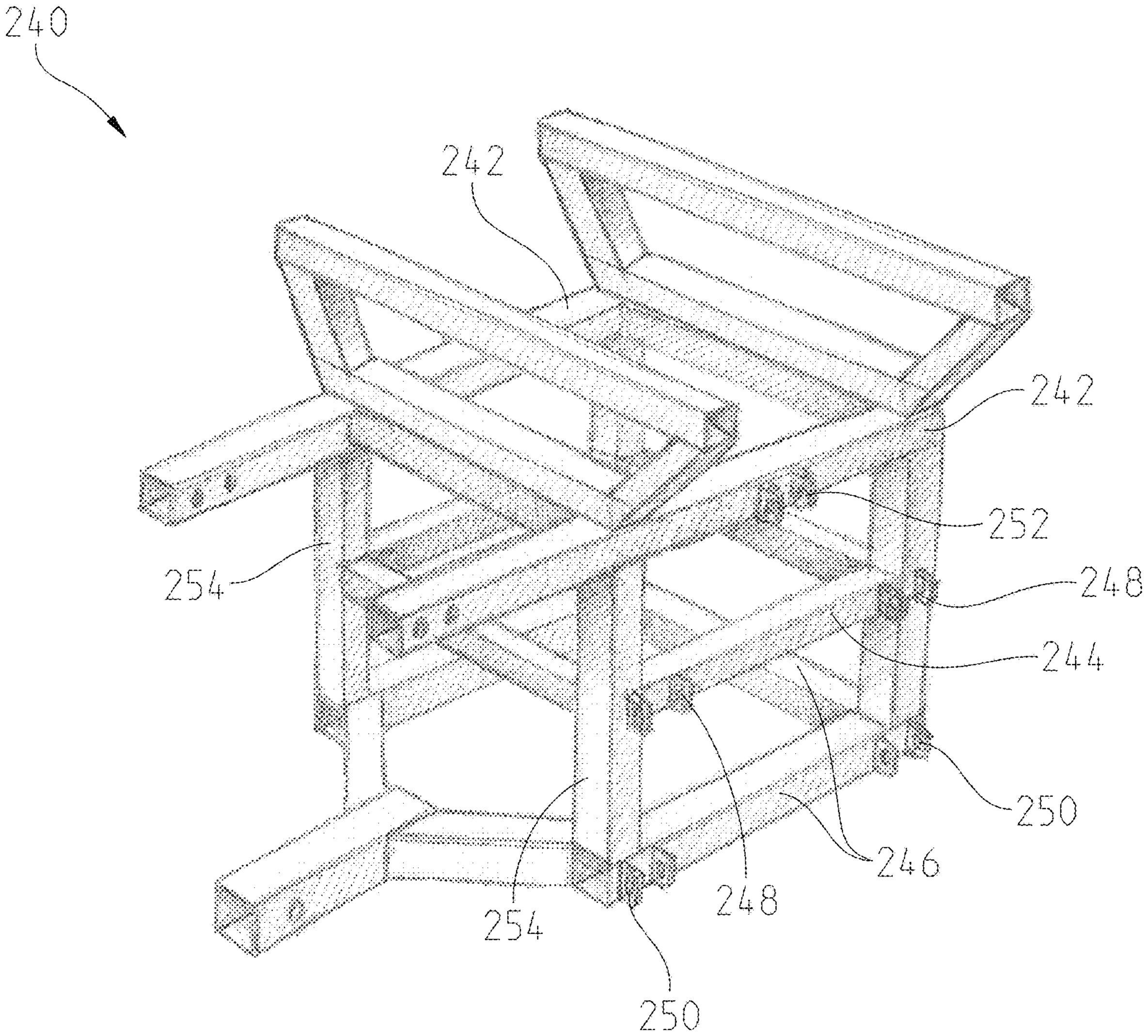
FIG. 47 is a frame assembly for supporting the cargo portion of FIG. 46.

Cargo assembly 230 is capable of tilting due to configuration of cargo assembly frame 240, which is illustrated in FIG. 45. With reference to FIGS. 46 and 47, cargo assembly 230 is supported by cargo assembly frame 240 and couples to ground-engaging members 232 through cargo assembly frame 240. Cargo assembly frame 240 includes upper frame members 242 having shock mounts 252, mid frame members 244 having upper alignment or control arm mounts 248, and lower frame members 246 having lower alignment or control arm mounts 250. Upper frame members 242 are positioned vertically above mid frame members 244 which are positioned vertically above lower frame members 246. Upper frame members 242, mid frame members 244 and lower frame members 246 are operatively coupled through upstanding members 254 and secured through various attachment methods, which may include bolting or welding the members with one another. Other attachment and securing methods may be used to ensure stability of cargo assembly frame 240, such that it can support weight of cargo storage assembly 230 and the items that are supported therein during operation.

Figure 48:
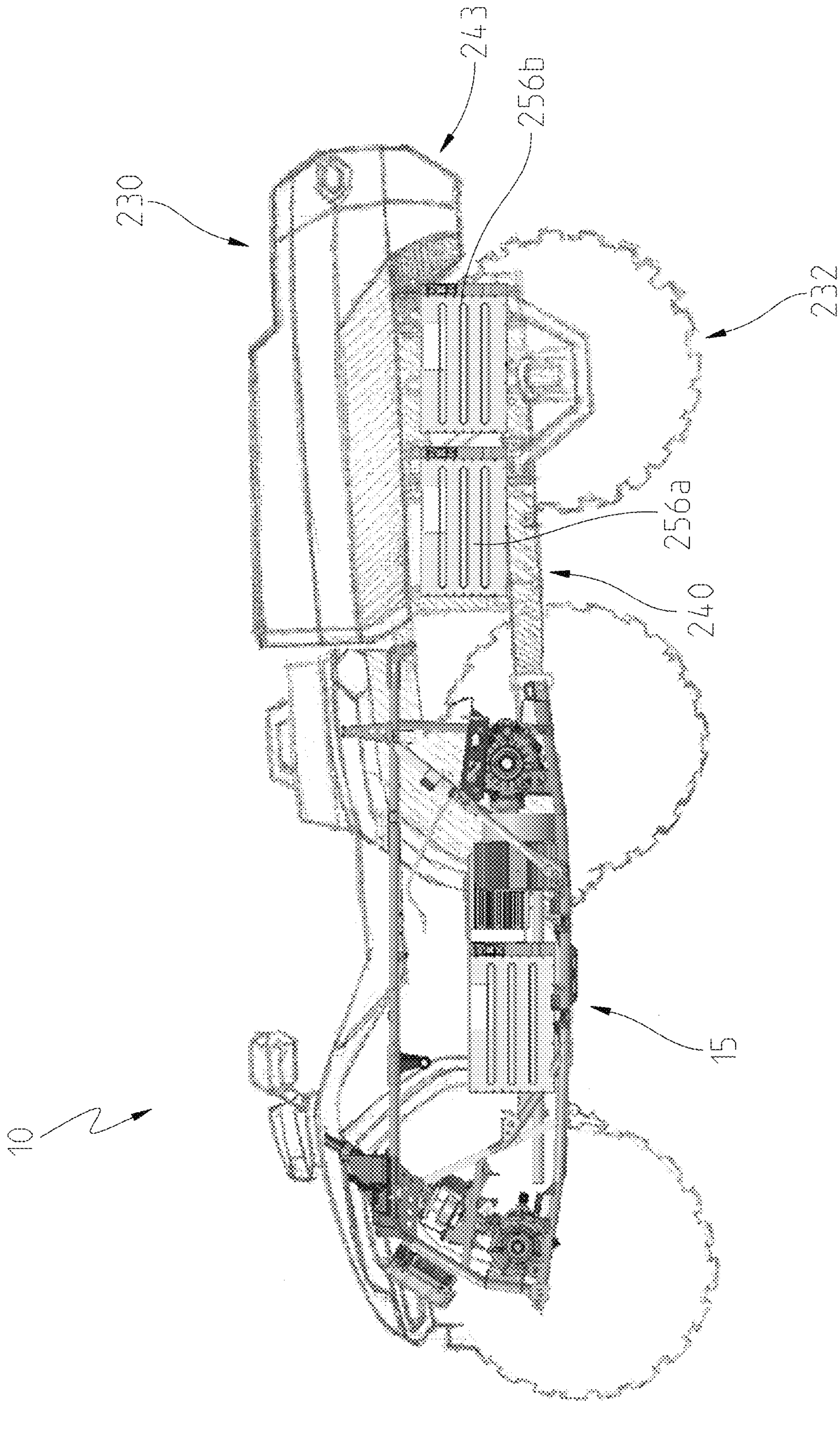
FIG. 48 is a side view of the vehicle and extended cargo portion of FIG. 46 with additional batteries shown supported at the extended cargo portion.
Figure 49:
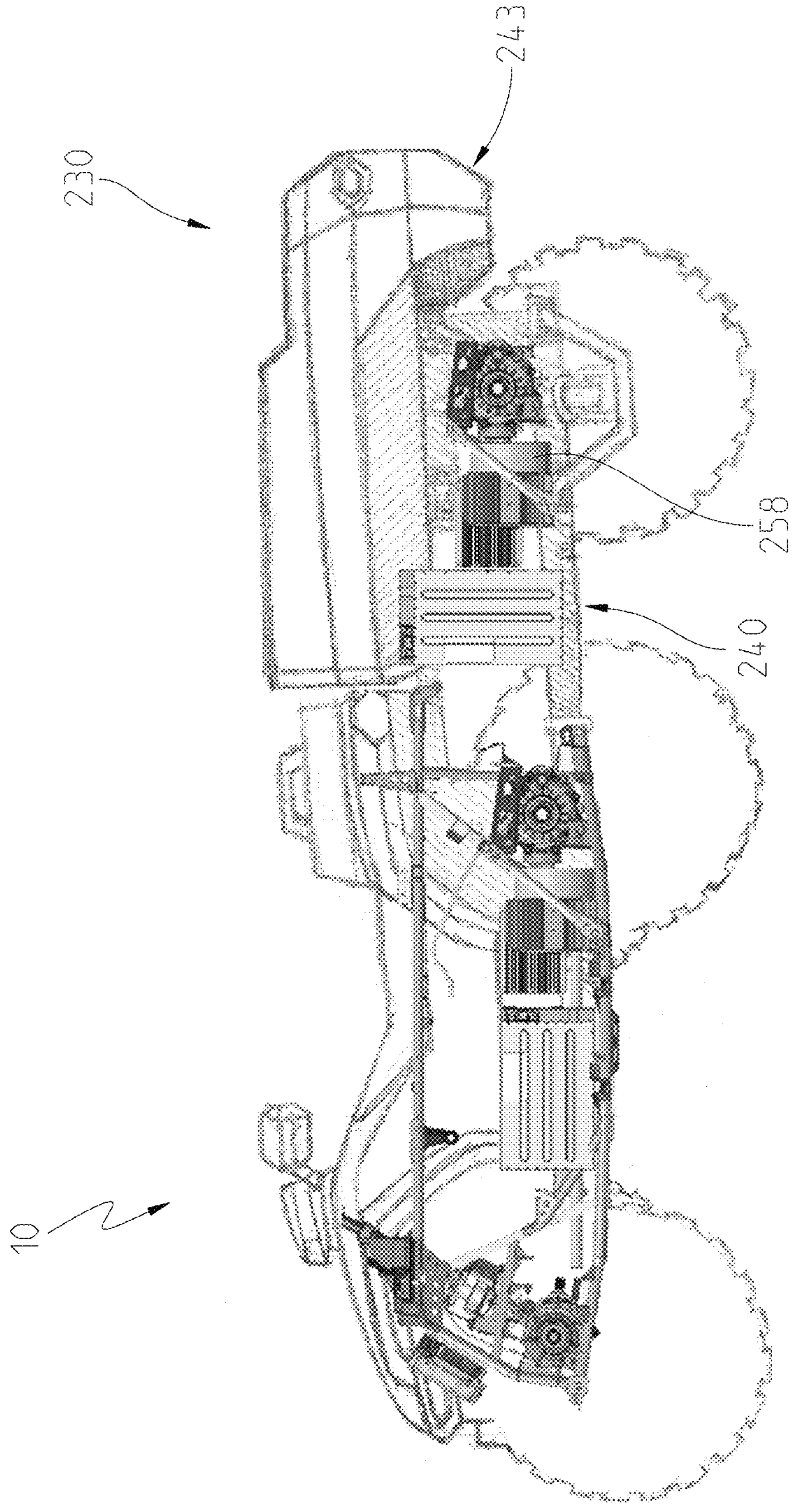
FIG. 49 is a further side view of the vehicle and extended cargo portion of FIG. 46 with additional batteries shown supported at the extended cargo portion.

FIGS. 48 and 49 illustrate further embodiments of vehicle 10 in operation with cargo assembly 230. While cargo assembly 230 provides the additional storage space for tools, accessories and any desired items to be used in operation with vehicle 10, it may also include additional components underneath floor 236 and underfloor storage 234 of cargo assembly 230. For example, as illustrated in FIG. 48, cargo assembly 230 includes a first battery 256*a* and a second battery 256*b*. Batteries 256*a*, 256*b* may be used for increasing the charge and power capacity of vehicle 10 for operation of vehicle 10 or for providing power and/or charging means for tools and accessories being stored in cargo assembly 230, such as through use of a power strip as will be described further with reference to FIGS. 50 and 51. While shown with two batteries 256*a*, 256*b*, any number of batteries may be implemented into cargo assembly 230.

In various other embodiments, for example the illustrative embodiment of FIG. 49, a motor 258 may be provided with cargo assembly 230 for use with vehicle 10. In this embodiment, cargo assembly is also provided with battery 256*a*. The additional components such as batteries 256 and motor 258 may be supported by cargo assembly frame 240. The addition of motor 258 to cargo assembly 230 converts vehicle 10 to a 6×6 or 6WD vehicle.

Figure 50:
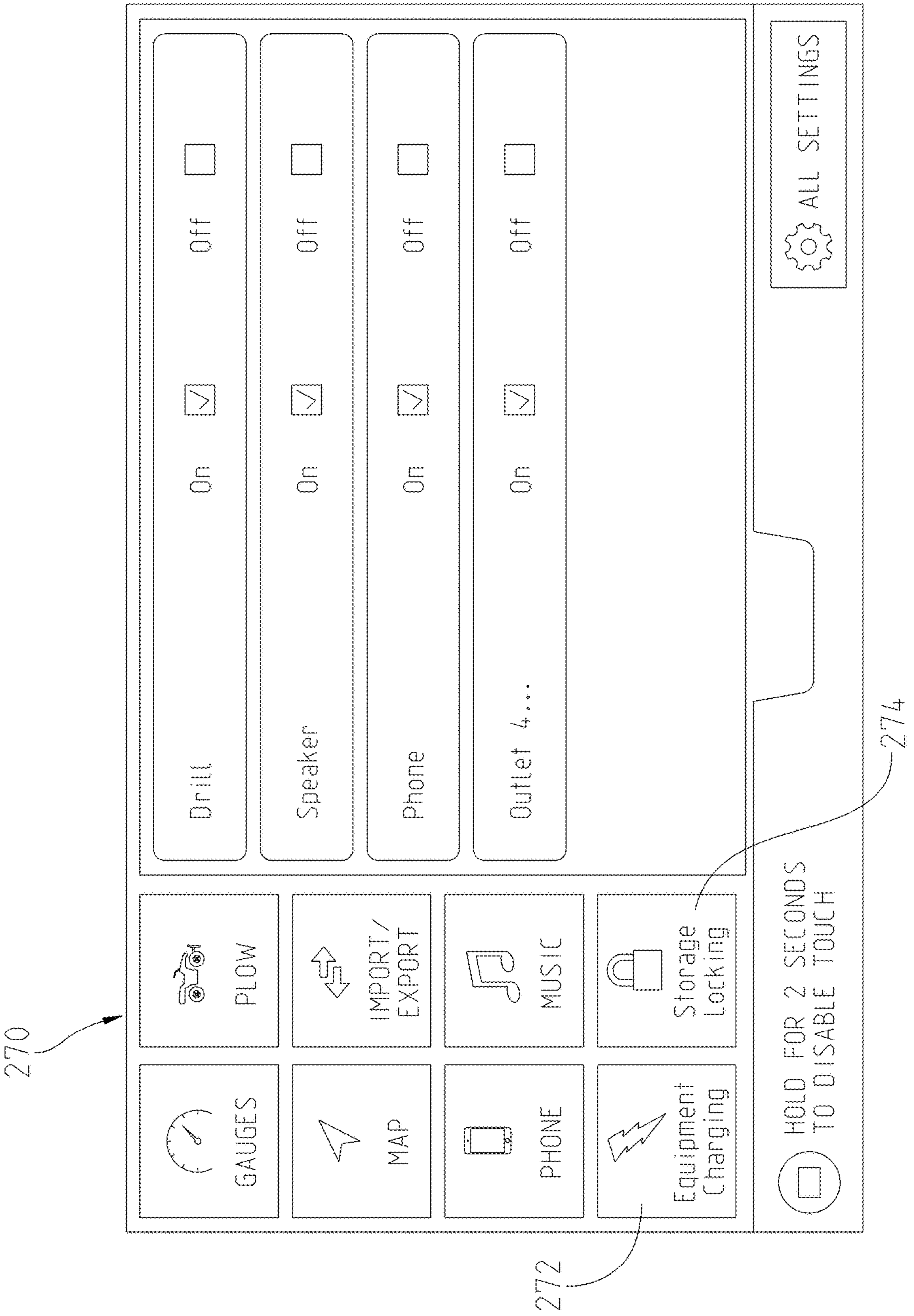
Figure 51:
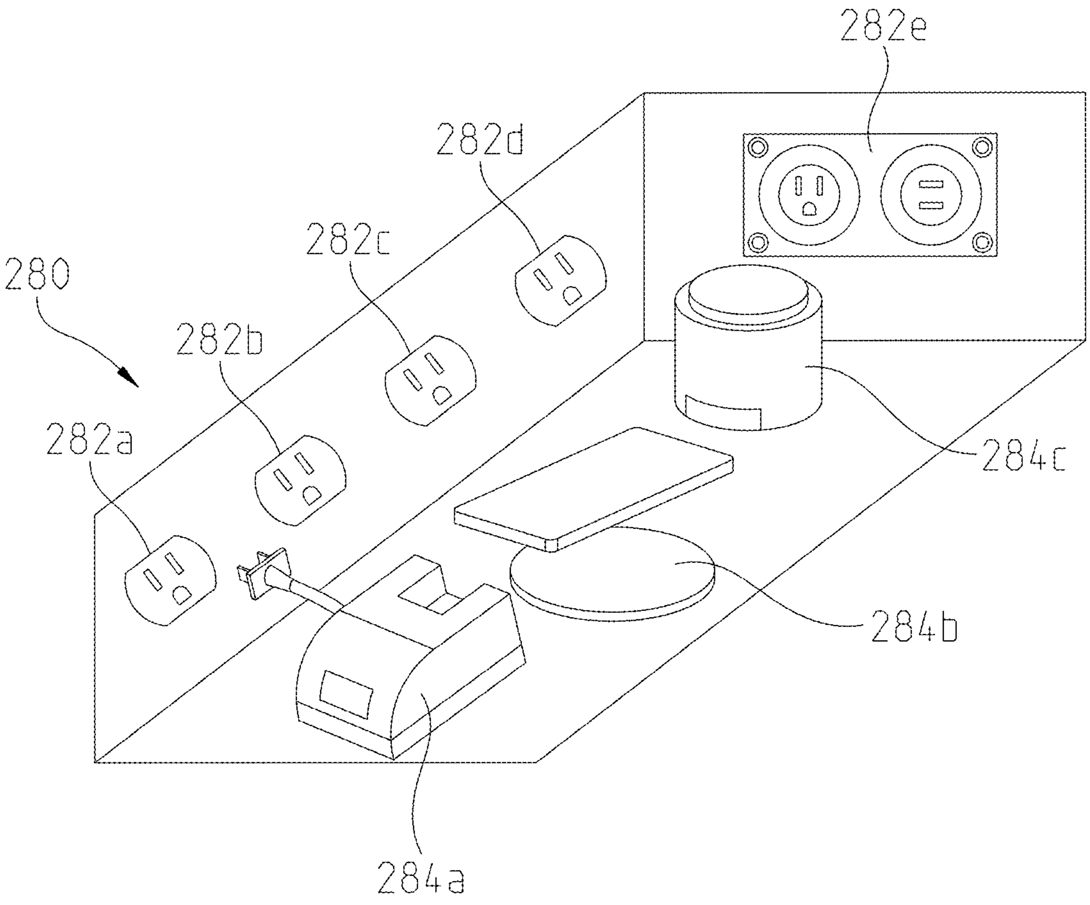
FIG. 51 is a schematic view of a power strip for accessories and tools for the vehicle of FIG. 1.
Figure 52:
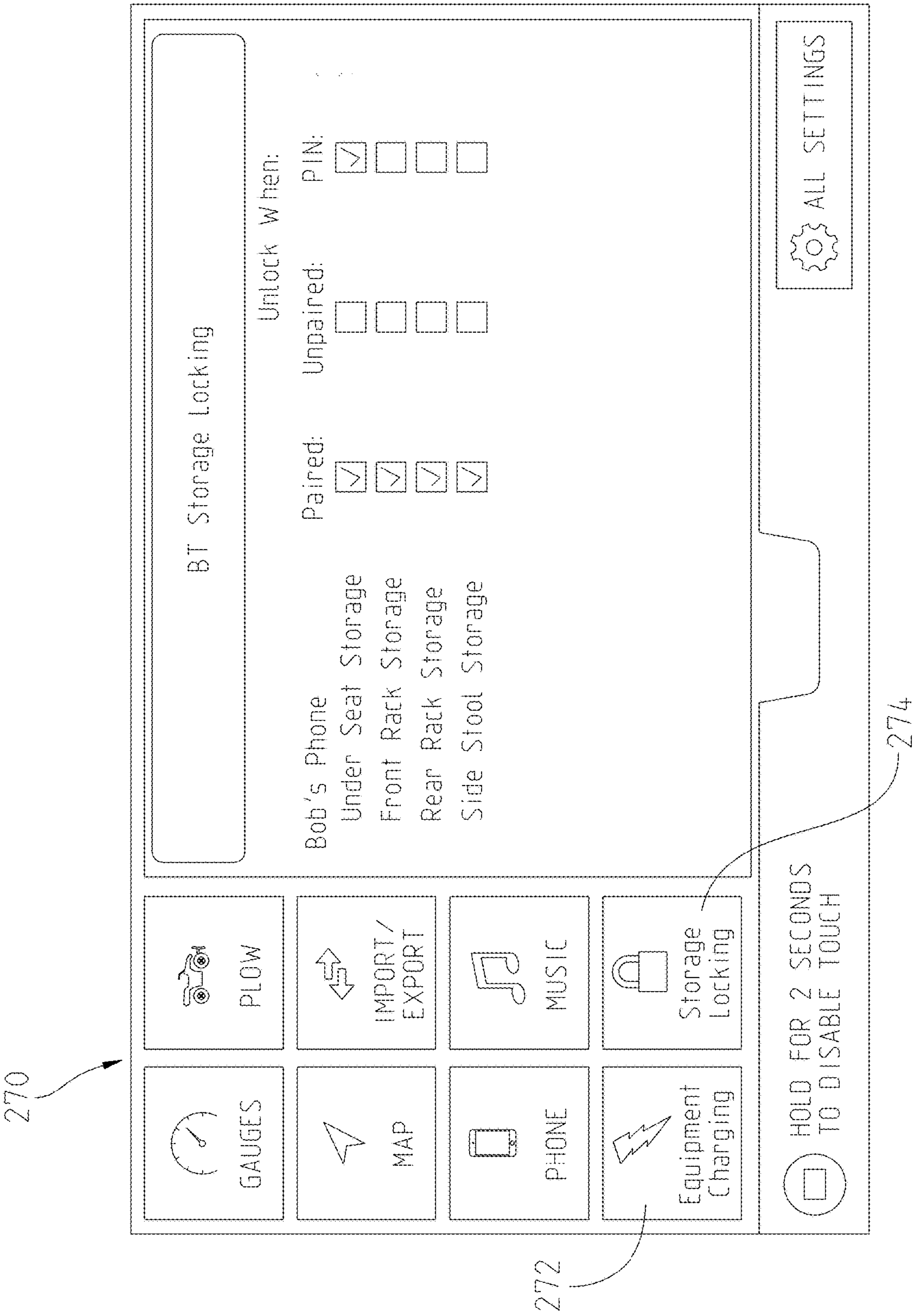
FIG. 52 is a schematic view of an interface associated with locking various storage compartments of the vehicle of FIG. 1.

As previously described, vehicle 10 may comprise various storage assemblies for incorporating additional storage space on vehicle 10. Some tools and/or accessories that may be stored and transported in vehicle 10 may require power and/or charging to operate. As such, any of the previously mentioned storage assemblies could be used in combination with a power strip or plugin and a display for controlling charge of the various accessories and tools. For example, FIGS. 50 and 51 illustrate an interface 270 on gauge 90 that may be used in combination with a power strip 280 for charging various accessories 284 through outlets 282. Interface 270 includes various icons for operator to choose for controlling power to specific outlets of power strip 280. Among the icons, interface 270 includes an equipment charging icon 272 for displaying individual devices that are being used with outlets 282 of power strip 280. For example, a drill 284*a*, a phone 284*b*, and a speaker 284*c* are all example devices that are capable of being charged through power strip 280. In some embodiments, interface 270 will include an "On" actuator and an "Off" actuator for controlling the power delivered to the power strip 280. For example, actuation of the "On" actuator may cause power to be delivered to power strip 280 and facilitate charging of all accessories that are coupled with power strip 280. Actuation of the "Off" actuator may cause power to no longer be delivered to power strip 280 such that all accessories coupled with power strip 28 are no longer being charged. While power strip 280 does not require labeling of specific outlets, if the operator wishes to link a particular tool or accessory with a specific outlet of power strip 280, such identifications may be captured on interface 270, as well, so that the operator can easily turn on and off the power to that particular outlet merely from gauge 90. More particularly, and as shown in FIG. 50, adjacent the individual devices, interface 270 comprises "On" and "Off" options that may be selected by operator. In this way, operator can manually turn on or off the individual outlets 282 of power strip based on which devices are desired to be charged. This provides the benefit to operator of controlling which devices receive charge to best optimize the charge provided and in view of the remaining state of charge of the battery. In this way, if batteries are low on charge, the operator can allocate the remaining charge to the devices that are most desired for use, giving priority to what is needed. Additionally, in some embodiments, control system 60 (FIG. 13) may be configured to predict the amount of charge that will last the remainder of a trip through inputs regarding vehicle 10 speed, positioning and length of trip left. In these embodiments, this information may be provided to interface 270 such that an operator can prioritize charging with an accurate estimate of how much charge is available. Interface 270 may be configured for display on gauge 90 or a panel of the various storage assembly that it is used in combination with, for example a control panel of storage assembly 160 (FIG. 27), or the interface 270 may be configured for use on a mobile or personal device of the operator, such as but not limited to, a cell phone, tablet or computer.

Further, as previously mentioned with reference to FIGS. 27-49, the various storage spaces provided for vehicle 10 may be configured for locking and unlocking using various electronic locks on the storage compartments. It may be desired for the locking and unlocking of the various storage areas to be controlled through a Bluetooth capability. This may be beneficial for locking or unlocking storage spaces while outside or away from vehicle 10. For example, the embodiment of FIG. 50 illustrates various storage assemblies being controlled through Bluetooth locking and controlled in conjunction with interface 270. Among various other icons, interface 270 includes storage locking icon 274. Operator may select storage locking icon 274 to cause interface 270 to display the various storage areas in use with vehicle 10. Adjacent to the listing of the various storage devices, interface 270 displays "Unlock When" and three options including "paired", "unpaired", and "pin." Additionally, adjacent each storage device and under each of the three options, are check boxes for being customized by the operator. Operator is thus able to decide which conditions(s) are required to be true for unlocking each storage device. As previously described, interface 270 may be used on a mobile device such as a cell phone, a laptop or tablet, or on gauge 90. It additionally may be positioned within a control panel on the interior or exterior of vehicle 10. For example, interface 270 may be positioned on control panel 208 of rear storage assembly 200 illustrated in FIGS. 36 and 37. The conditions displayed and used with interface 270 and storage assemblies of the present disclosure may be varied. For example, operator may use interface 270 and Bluetooth connections with electronic locks such that when a phone is paired to an electronic lock of a storage assembly, for example storage assembly 160 (FIG. 27), the storage assembly 160 is unlocked, but if the phone and the electronic lock are in the unpaired configuration for more than a specified time limit, such as 5 seconds, the electronic lock returns to a locked state and storage assembly 160 can no longer be accessed.

While described with reference to use of a phone with storage assembly 160, any of a variety personal device or control panel may be used in conjunction with any of the storage assemblies or cargo assemblies described throughout.

Figure 53:
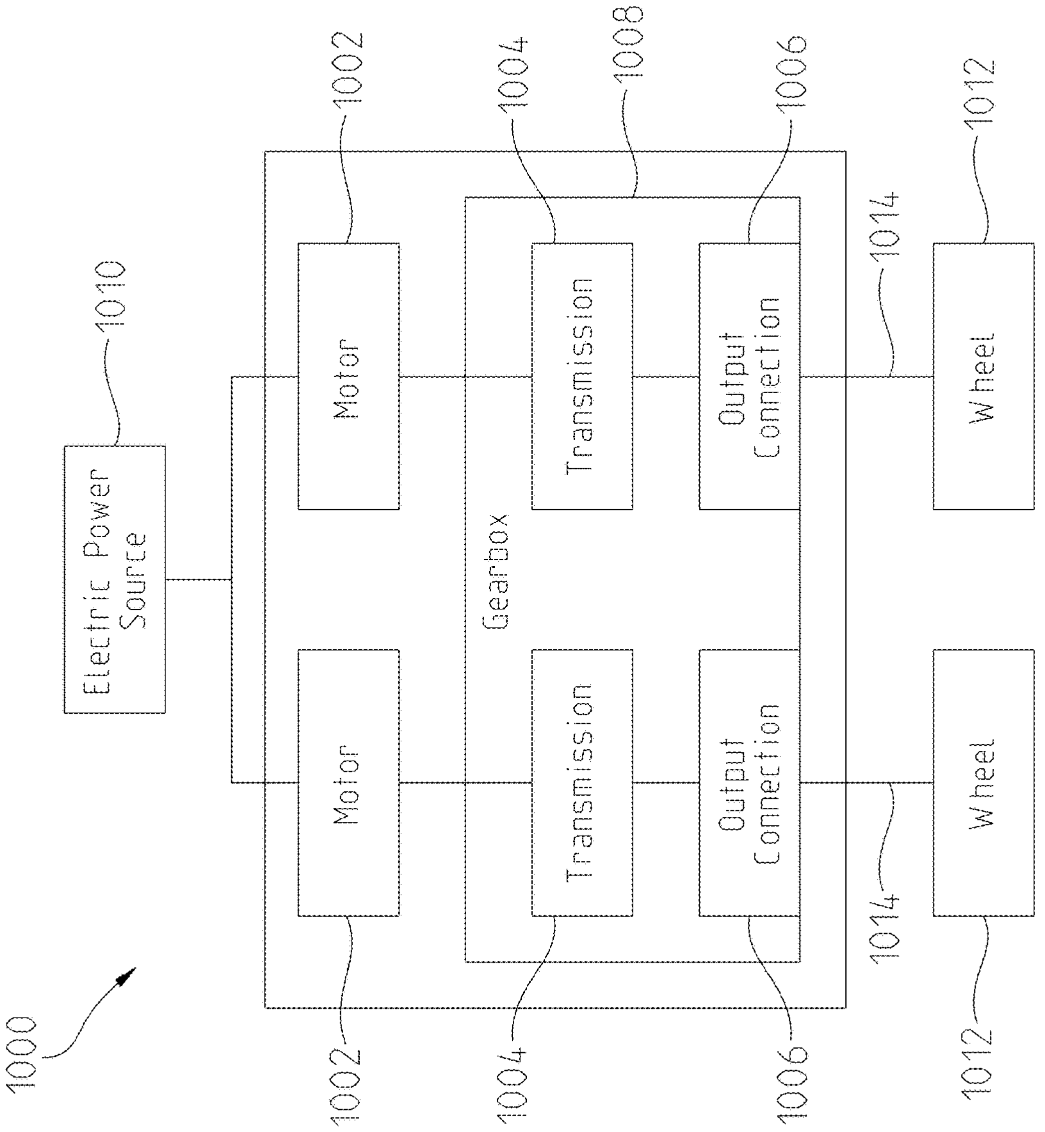
FIG. 53 illustrates a representative view of a compact transmission system of the present disclosure.

Referring to FIGS. 53-58, various embodiments of transmission or gearcase 70 are shown. It may be appreciated that transmission 70 may be any type of transmission or gearcase and the following embodiments are illustrative examples of the configuration, orientation, and type of transmissions that may be possible with the vehicle of the present disclosure. Referring now to FIG. 53, transmission 70 may be configured as a compact transmission system 1000 comprising a plurality of transmissions and a plurality of corresponding motors. Illustratively, a simplified block diagram of a compact transmission system 1000 of an electric vehicle for providing two independent gear reductions is shown. The compact transmission system 1000 includes two electric motors 1002, two transmissions 1004, and two output connections 1006. Transmissions 1004 and output connections 1006 are provided within a common gearbox housing 1008. Each output connection 1006 is operatively coupled to a wheel 1012 via an output shaft 1014 (e.g., a half shaft). It should be appreciated that the compact transmission system 1000 may be operatively coupled to a front drive unit or a rear drive unit. In some embodiments, the electric vehicle may include a first compact transmission system coupled to a front drive unit and a second compact transmission system coupled to a rear drive unit.

For example, if the compact transmission system 1000 is coupled to the front drive unit, each output connection 1006 is operatively coupled to left and right front wheels. Additionally, or alternatively, if the compact transmission system 1000 is coupled to the rear drive unit, each output connection 1006 is operatively coupled to left and right rear wheels. Each electric motor 1002 is coupled to respective transmission 1004 to control a rotational speed of respective transmission 1004 and provide power to wheel 1012 via output shaft 1014 through output connection 1006. By doing so, the transmission system 1000 may control torque independently at each wheel 1012 for increased handling, stability, and/or assistance with steering. For example, by controlling torque between the left-side and right-side wheels (also referred to as torque vectoring), yaw may be controlled for increased handling and control of vehicle. Additionally, by controlling torque between front and rear wheels (also referred to as torque biasing), traction control and stability may be enhanced in both a straight line and in corners. It may be appreciated that such torque distribution promotes handling, faster turning, reduces understeer, increases stability, and limits to torque flowing into driveline assembly 16 to protect driveline components from torque spikes seen in various driving conditions or overload situations.

Figure 54:
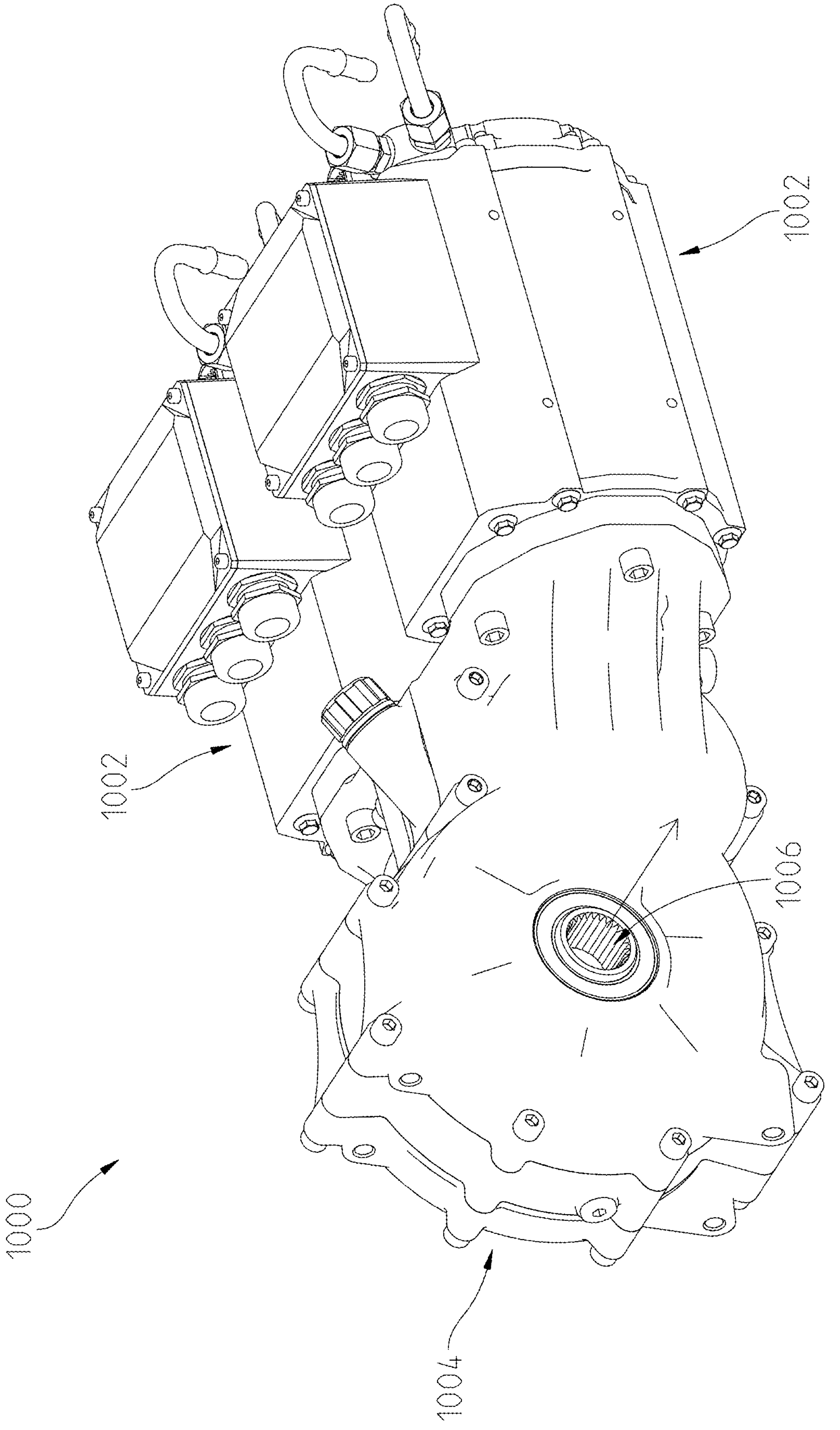
FIG. 54 illustrates a left perspective view of the compact transmission system of FIG. 53.
Figure 55:
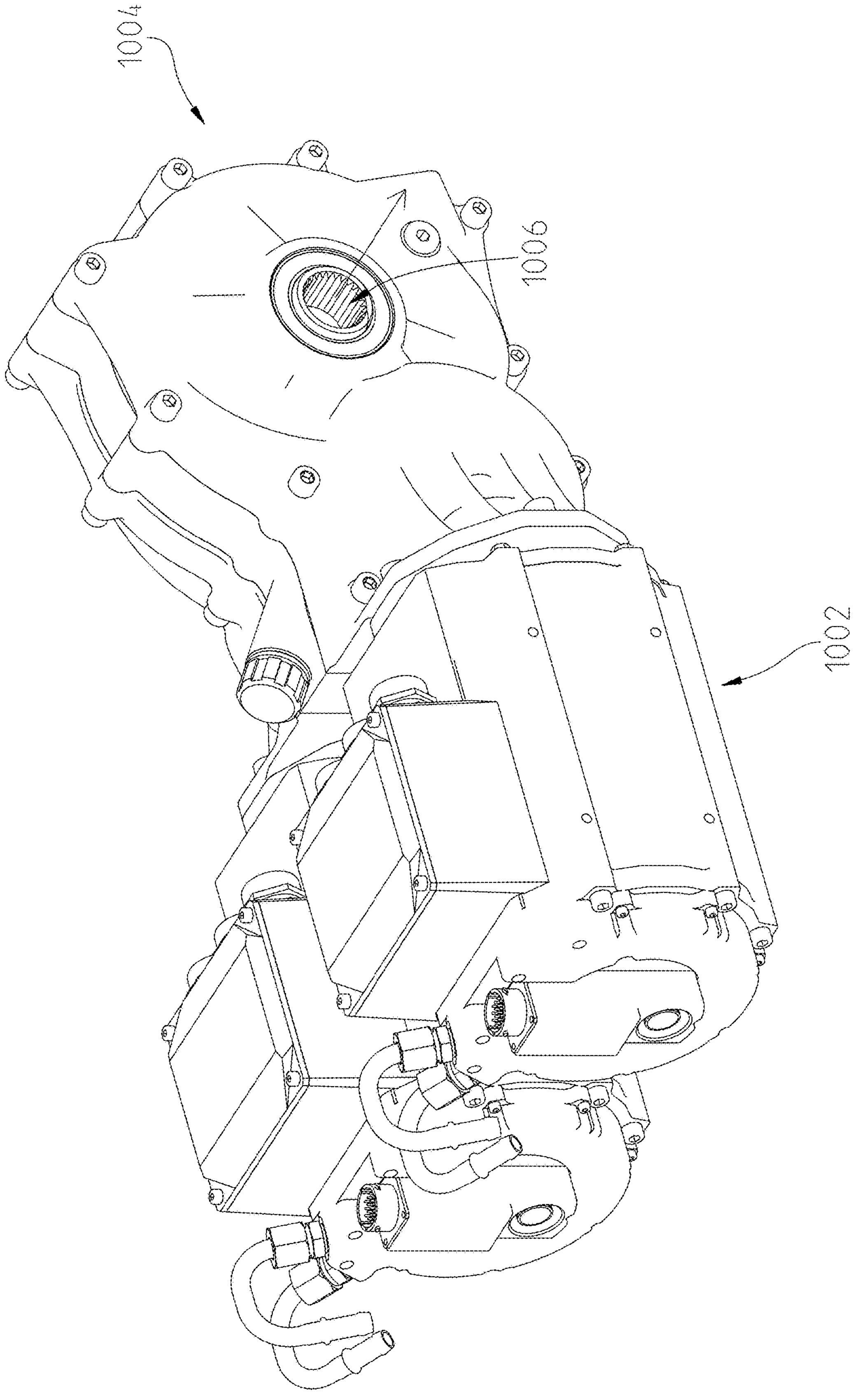
FIG. 55 illustrates a right perspective view of the compact transmission system of FIG. 53.

As illustrated in FIGS. 54 and 55, incorporating two transmissions 1004 into common gearbox housing 1008 provides a compact design of transmission system 1000 for optimal integration with flexible mounting orientation of electric motors 1002, which is described further below. It should be appreciated that, in some embodiments, the gearbox 1006 may also be used with, or include, a differential.

In use, the electric motor 1002 receives power from an electric power source 1010. Electric power source 1010 may include one or more batteries or other energy storage systems capable of providing electrical power to electric motors 1002. Each electric motor 1002 is configured to control a rotational speed of respective transmission 1004. Two electric motors 1002 connected to common gearbox housing 1008 with two output connections 1006 allow the transmission system 1000 to provide an independent gear reduction for each wheel 1012. As an example, a maximum overall gear reduction ratio may be 1 to 10.17 with a maximum input speed of 10,000 revolutions per minute (rpm) and up to 70 Newton-meter (N-m) input torque.

Figure 57:
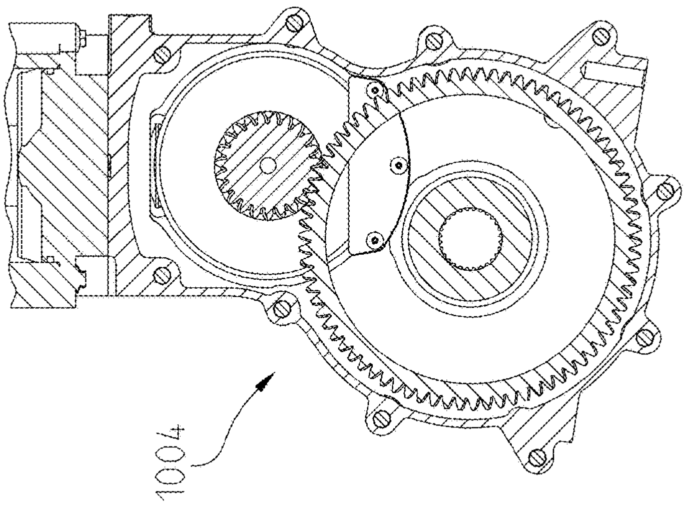
FIG. 57 illustrates a cross-sectional view of the compact transmission of FIG. 56.

In the illustrative embodiment of FIGS. 56 and 57, gearbox housing 1008 implements a two-step reduction which allows for a flexible orientation of electric motors 1002, such that motors 1002 and housing 1008 may be in a vertical or upright position relative to a longitudinal axis of the vehicle, may be in a generally horizontal position generally parallel the longitudinal axis of the vehicle, or may be at any angled position therebetween. A first stage of the two-step reduction may be a bevel gear set or another gear set and a second stage may be a helical gear set or other gear set. It should be appreciated that, in some embodiments, a gear tooth design with a high contact ratio may be used for improving noise, vibration, and harshness (NVH) behavior.

Utilizing common gearbox housing 1008 for two independent gear reduction may create synergies in integration space, lubrication, and/or cooling. Incorporating two transmissions 1004 into common gearbox housing 1008 provides a compact design of transmission system 1000 for optimal integration with flexible mounting orientation of electric motors 1002. Additionally, the compact design of transmission system 1000 provides a flexible mounting orientation (e.g., vertically or horizontally) to accommodate various vehicle restrictions. It may be appreciated that transmission system 1000 may be arranged vertically such that motors 1002 are positioned vertically above or aligned with at least a portion of transmissions 1004 or may be arranged horizontally such that motors 1002 are longitudinally or laterally aligned with at least a portion of transmissions 1004.

Figure 58:
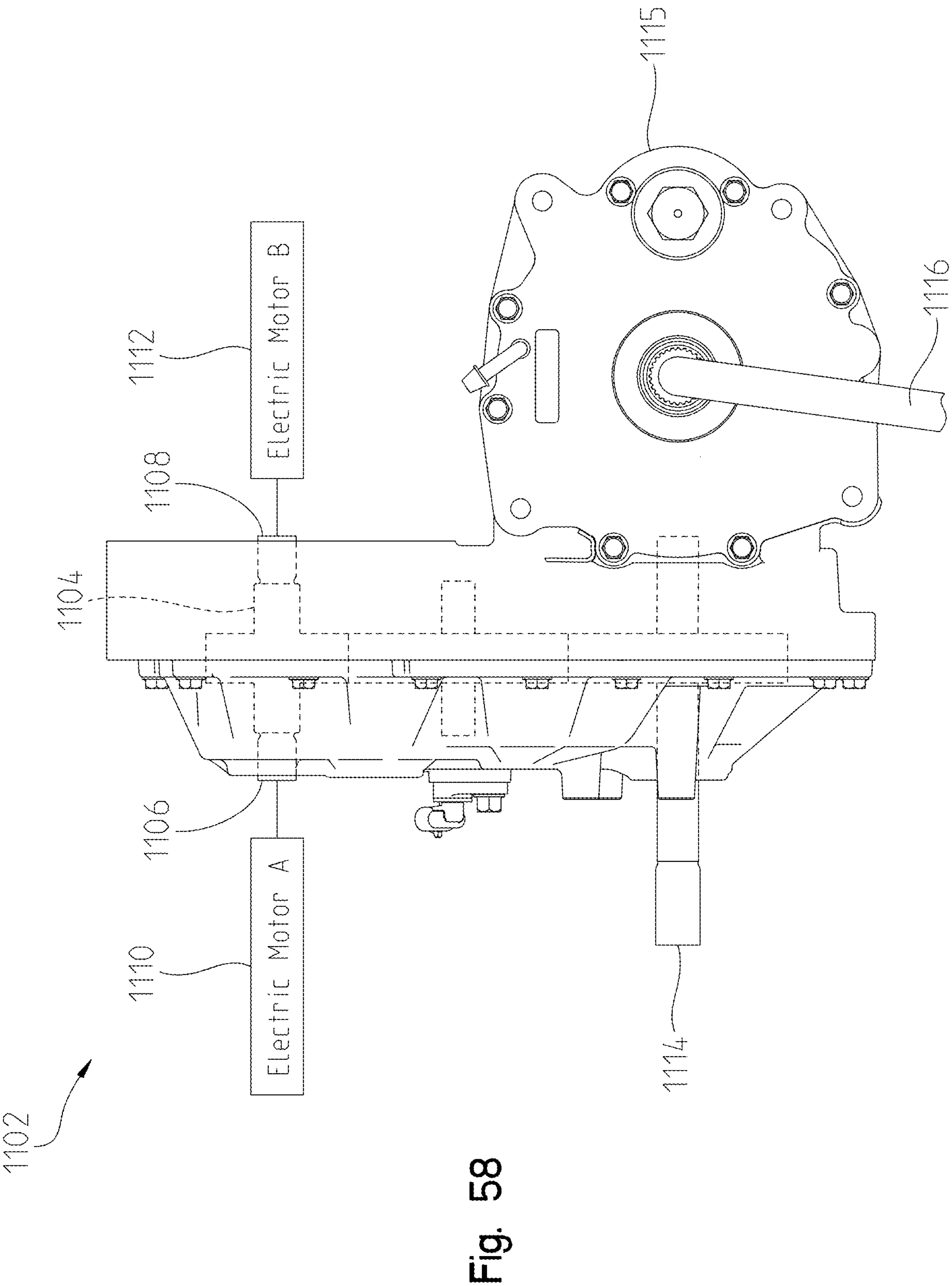
FIG. 58 illustrates a gearbox of the exemplary electric vehicle of FIG. 1 connected to two electric motors to drive a common gear reduction.
Figure 59:
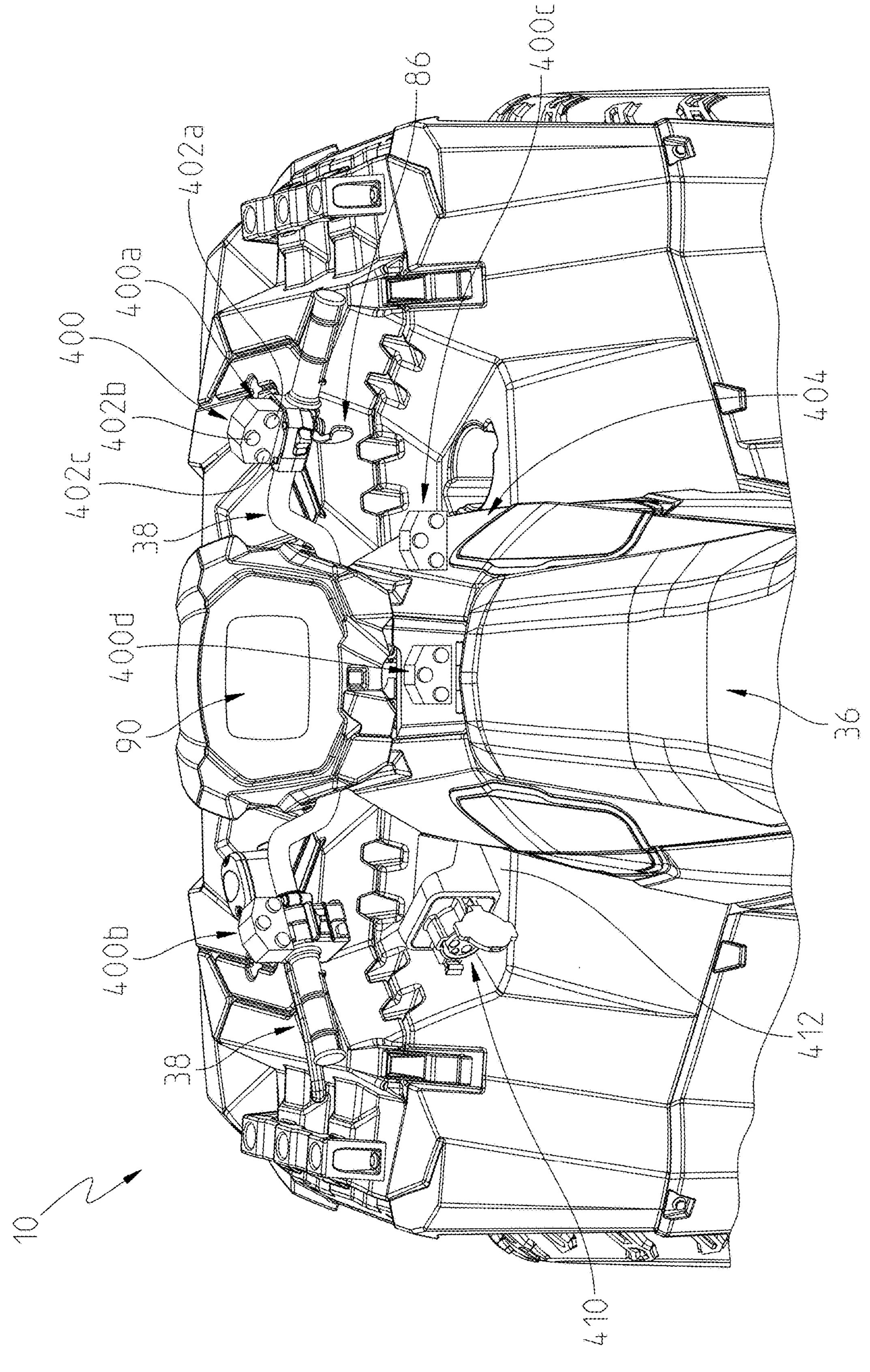
FIG. 59 illustrates a rear view of a portion of the exemplary electric vehicle of FIG. 1.

Referring now to FIG. 58, a further alternative of transmission 70 of the present application is shown as a gearbox housing 1102 supporting two electric motors 1110, 1112, a locking or fixed rear drive 1115, and a prop shaft 1114. Gearbox housing 1102 includes a single input shaft 1104 extending between the two electric motors 1110, 1112. More particularly, a first end 1106 of input shaft 1104 defines an input shaft operably coupled to electric motor 1110 while a second end 1108 of input shaft 1104 defines an input shaft operably coupled to electric motor 1112. In this way, motors 1110, 1112 operate together through a gear reduction to drive rear axle or half shaft 1116 and prop shaft 1114. Rear axle 1116 extends from the rear drive to the rear wheel. Prop shaft 1114 also extends from gearbox housing 1102 and is operably coupled to the front wheels to drive the front wheels. As such, prop shaft 1114 extends longitudinally forward from the rear drive along a length of the vehicle in order to drive the front wheels (e.g., via a front differential, drive, or gearbox). The opposite configuration is possible, as well, where gearbox housing 1102 is supported on the front frame section and prop shaft 1114 instead extends rearwardly from the drive to drive the rear wheels. In various embodiments, any of the motors described herein may be positioned at any position along longitudinal axis L (FIG. 1) of vehicle 10. For example, motors 52 (FIG. 2), 1100, 1112 may be supported by front end 300, middle portion 302 or rear end 304 (FIG. 27) of vehicle 10 (FIG. 1).

In a traction-limited condition, both electric motors 1110, 1112 are able to deliver power to the wheels with traction. It should be appreciated that, in the illustrative embodiment, torque, power, and cooling surface area are doubled with the gearbox 1102 with two electric motors 1110 compared to a gearbox with a single motor. This may eliminate the need for a variable-ratio gearbox. Additionally, in some embodiments, one or more electric motors 1110, 1112 may be embodied as a permanent magnet AC or brushless DC motor or may be used with a permanent magnet AC or brushless DC motor. In such embodiments, the motor losses may be minimized by operating both electric motors 1110, 1112 at the same output torque.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A storage assembly for a utility vehicle, the utility vehicle comprising a longitudinally extending frame and front and rear ground engaging members coupled to and supporting the frame, the storage assembly comprising:
- a main compartment; and
- a rear portion having a right rear compartment positioned to the right of the main compartment, a left rear compartment positioned to the left of the main compartment, and at least one door at a rear of the utility vehicle for accessing a compartment of the storage assembly from among the main compartment, the right rear compartment, and the left rear compartment.

2. The storage assembly of claim 1, wherein the main compartment is accessible through an opening of a seat of the utility vehicle.

3. The storage assembly of claim 1, wherein the storage assembly further comprises an operator area storage positioned forward of a seat of the utility vehicle.

4. The storage assembly of claim 1, wherein the main compartment extends under a seat of the utility vehicle from a position forward of the seat to a position rearward of the seat.

5. The storage assembly of claim 4, wherein the at least one door includes a rear door providing access to the main compartment at a rear of the utility vehicle and a front door providing access to the main compartment at a front of the vehicle.

6. The storage assembly of claim 1, wherein the main compartment is accessible via the at least one door and in response to pivotal movement of a seat of the utility vehicle.

7. The storage assembly of claim 6, wherein the at least one door is on a rear of the utility vehicle.

8. The storage assembly of claim 1, wherein the at least one door provides access to the compartment without exposing remaining ones of the main compartment, the right rear compartment, and the left rear compartment.

9. The storage assembly of claim 1, wherein the at least one door is movable between a closed position and an open position, and wherein, in an open position, the at least one door forms a storage bed extension.

10. A utility vehicle comprising:
- a longitudinally extending frame;
- front and rear ground engaging members coupled to and supporting the frame; and
- a storage assembly comprising:
  - a main compartment; and
  - a rear portion having a first rear compartment positioned to a first side of the main compartment, a second rear compartment positioned to a second side of the main compartment opposite the first side, and at least one door at a rear of the utility vehicle for accessing a compartment of the storage assembly from among the main compartment, the first rear compartment, and the second rear compartment.

11. The utility vehicle of claim 10, further comprising an electric powertrain assembly supported by the frame.

12. The utility vehicle of claim 11, further comprising a battery supported by the frame.

13. The utility vehicle of claim 10, wherein the main compartment is positioned, at least in part, below an operator area of the utility vehicle.

14. The utility vehicle of claim 10, wherein the at least one door provides access to the compartment without exposing remaining ones of the main compartment, the first rear compartment, and the second rear compartment.

15. The utility vehicle of claim 10, wherein the storage assembly further comprises an operator area storage positioned forward of a seat of the utility vehicle.

16. The utility vehicle of claim 10, wherein the main compartment extends forward of the first rear compartment and the second rear compartment.

17. The utility vehicle of claim 16, wherein the main compartment includes one or more removable dividers positionable within the main compartment to form a plurality of compartments.

18. A utility vehicle comprising:
- a longitudinally extending frame;
- front and rear ground engaging members coupled to and supporting the frame;
- an electric powertrain assembly supported by the frame;
- a battery supported by the frame; and
- a storage assembly comprising:
  - a main compartment positioned, at least in part, below an operator area of the utility vehicle;
  - a rear portion having a first rear compartment positioned to a first side of the main compartment, a second rear compartment positioned to a second side of the main compartment opposite the first side, and at least one door at a rear of the utility vehicle for accessing a compartment of the storage assembly from among the main compartment, the first rear compartment, and the second rear compartment; and
  - one or more removable dividers positionable within at least one of the main compartment, the first rear compartment, or the second rear compartment to form a plurality of compartments.

19. The utility vehicle of claim 18, wherein the first rear compartment comprises a left rear compartment and the second rear compartment comprises a right rear compartment.

20. The utility vehicle of claim 18, wherein the at least one door provides access to the compartment without exposing remaining ones of the main compartment, the first rear compartment, and the second rear compartment.

* * * * *